(12) United States Patent
Ke

(10) Patent No.: US 10,073,769 B2
(45) Date of Patent: Sep. 11, 2018

(54) DATA STORAGE DEVICE AND DATA MAINTENANCE METHOD THEREOF

(71) Applicant: Silicon Motion, Inc., Jhubei, Hsinchi County (TW)

(72) Inventor: Kuan-Yu Ke, Zhubei (TW)

(73) Assignee: SILICON MOTION, INC., Jhubei, Hsinchu County (TW)

( * ) Notice: Subject to any disclaimer, the term of this patent is extended or adjusted under 35 U.S.C. 154(b) by 0 days.

(21) Appl. No.: 15/613,342

(22) Filed: Jun. 5, 2017

(65) Prior Publication Data

US 2017/0270047 A1    Sep. 21, 2017

Related U.S. Application Data

(63) Continuation-in-part of application No. 15/286,925, filed on Oct. 6, 2016.

(30) Foreign Application Priority Data

Oct. 15, 2015 (TW) ............................... 104133817 A
Oct. 12, 2016 (TW) ............................... 105132831 A

(51) Int. Cl.
*G06F 12/02* (2006.01)
*G06F 12/0875* (2016.01)
*G06F 3/06* (2006.01)

(52) U.S. Cl.
CPC .......... *G06F 12/0246* (2013.01); *G06F 3/061* (2013.01); *G06F 3/064* (2013.01); *G06F 3/0679* (2013.01); *G06F 3/0688* (2013.01); *G06F 12/0875* (2013.01); *G06F 2212/214* (2013.01)

(58) Field of Classification Search
CPC .. G06F 3/0659; G06F 3/0679; G06F 12/0246; G06F 3/061; G06F 3/0688; G06F 11/1068; G06F 3/0656; G06F 3/0613; G06F 3/064; G06F 12/00; G06F 2212/214
See application file for complete search history.

(56) References Cited

U.S. PATENT DOCUMENTS

| | | | |
|---|---|---|---|
| 6,067,608 A * | 5/2000 | Perry | G06F 12/127 345/536 |
| 6,993,627 B2 | 1/2006 | Butterworth et al. | |
| 7,017,024 B2 | 3/2006 | Arimilli et al. | |
| 7,020,749 B2 | 3/2006 | Azuma | |

(Continued)

FOREIGN PATENT DOCUMENTS

| TW | 200426674 | | 12/2004 |
|---|---|---|---|
| TW | 200844840 | A | 11/2008 |

(Continued)

*Primary Examiner* — Reginald G Bragdon
*Assistant Examiner* — Thanh D Vo
(74) *Attorney, Agent, or Firm* — McClure, Qualey & Rodack, LLP

(57) ABSTRACT

The present invention provides a data storage device including a random access memory and a controller. The random access memory has a cache area. The controller loads a part of data mapping sets of the data mapping table on a plurality of sectors of the cache area, wherein any of the data mapping sets that has been read less than a predetermined number of times is defined as an infrequent data mapping set, and any of the data mapping sets that has been read more than the predetermined number of times is defined as a frequent data mapping set.

22 Claims, 36 Drawing Sheets

(56) References Cited

U.S. PATENT DOCUMENTS

| | | |
|---|---|---|
| 7,058,784 B2 | 6/2006 | Wang |
| 7,986,229 B2 | 7/2011 | Yeo et al. |
| 2016/0070507 A1* | 3/2016 | Hoshikawa ......... G06F 12/0246 711/149 |
| 2017/0235488 A1* | 8/2017 | Call ....................... G06F 3/061 711/103 |

FOREIGN PATENT DOCUMENTS

| | | |
|---|---|---|
| TW | 201027420 A | 7/2010 |
| TW | 201403451 A | 1/2014 |
| TW | 201523247 A | 6/2015 |
| TW | 201527971 A | 7/2015 |
| TW | 201617876 A | 5/2016 |
| TW | I537729 B | 6/2016 |
| TW | 201631478 A | 9/2016 |

* cited by examiner

| TB1 | TS_0 | TS_1 | ............ | TS_M |
|---|---|---|---|---|
| | MR_P0 MR_P1 MR_P2 ... MR_PX | MR_PX+1 MR_PX+2 MR_PX+3 ... MR_P2X | ............ | MR_P(M-1)X+1 MR_P(M-1)X+2 MR_P(M-1)X+3 ... MR_PMX |

FIG. 2

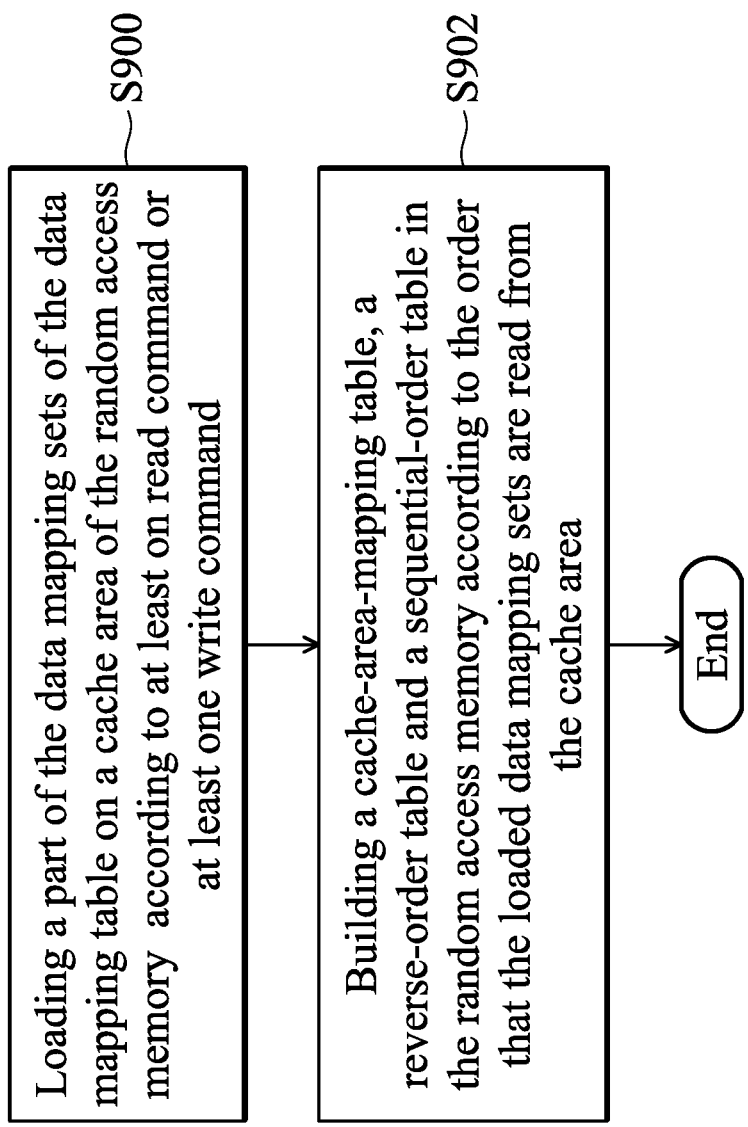

DATA STORAGE DEVICE AND DATA MAINTENANCE METHOD THEREOF

CROSS REFERENCE TO RELATED APPLICATIONS

This application is a Continuation-In-Part of pending U.S. patent application Ser. No. 15/286,925, filed on Oct. 6, 2016, which claims priority of Taiwan Patent Application No. 104133817, filed on Oct. 15, 2015. This application also claims priority of Taiwan Patent Application No. 105132831, filed on Oct. 12, 2016, the entireties of which are incorporated by reference herein.

BACKGROUND OF THE INVENTION

Field of the Invention

The present invention is related to a data storage device, and in particular it is related to a data storage device capable of maintaining a cache area using a specific method.

Description of the Related Art

Flash memory is considered a non-volatile data-storage device, using electrical methods to erase and program itself. NAND Flash, for example, is often used in memory cards, USB flash devices, solid state devices, eMMCs, and other memory devices.

Flash memory such as NAND Flash uses a multiple-block structure to store data, wherein the flash memory uses floating gate transistors. The floating gates of the floating gate transistor may catch electronic charges for storing data. Moreover, the mapping relationships of the physical pages of the flash memory and the logical page assigned by the controller are recorded in a mapping table. However, the mapping table requires a lot of memory space of the random access memory. Therefore, a data maintenance method that can effectively manage the data in the random access memory is needed.

BRIEF SUMMARY OF THE INVENTION

A detailed description is given in the following embodiments with reference to the accompanying drawings.

An exemplary embodiment provides a data storage device including a random access memory and a controller. The random access memory has a cache area. The controller loads a part of data mapping sets of the data mapping table on a plurality of sectors of the cache area, wherein any of the data mapping sets that has been read less than a predetermined number of times is defined as an infrequent data mapping set, and any of the data mapping sets that has been read more than the predetermined number of times is defined as a frequent data mapping set.

Another exemplary embodiment provides a data storage device including a random access memory and a controller. The random access memory has a cache area. The controller loads a part of data mapping sets of a data mapping table on a plurality of sectors of the cache area, wherein when all of the sectors of the cache area are filled and a first data mapping set needs to be loaded on the cache area, the controller selects a first sector from the sectors according to an infrequent index set and loads the first data mapping set on the first sector, wherein when the infrequent index set does not correspond to any of the sectors, the controller transforms a frequent index set to the infrequent index set, and selects the first sector according to the transformed infrequent index set.

Yet another exemplary embodiment provides a data maintenance method, applied to a data storage device having a flash memory, wherein the flash memory has a plurality of pages, each of the pages has a logical address and a physical address. The data maintenance method includes: when the flash memory is turned on, loading a part of data mapping sets of a data mapping table on a plurality of sectors of a cache area in a random access memory according to at least one read command or at least one write command, wherein each of the data mapping sets has at least one mapping relationship between the logical address and the physical address of the page, and each of the data mapping sets corresponds to a set index, wherein any of the data mapping sets that has been read less than a predetermined number of times is defined as an infrequent data mapping set, and any of the data mapping sets that has been read more than the predetermined number of times is defined as a frequent data mapping set.

BRIEF DESCRIPTION OF THE DRAWINGS

The present invention can be more fully understood by reading the subsequent detailed description and examples with references made to the accompanying drawings, wherein:

FIG. 2 is a schematic diagram illustrating a data mapping table, in accordance with an embodiment.

FIG. 9 is a flowchart of a data maintenance method in accordance with some embodiments.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
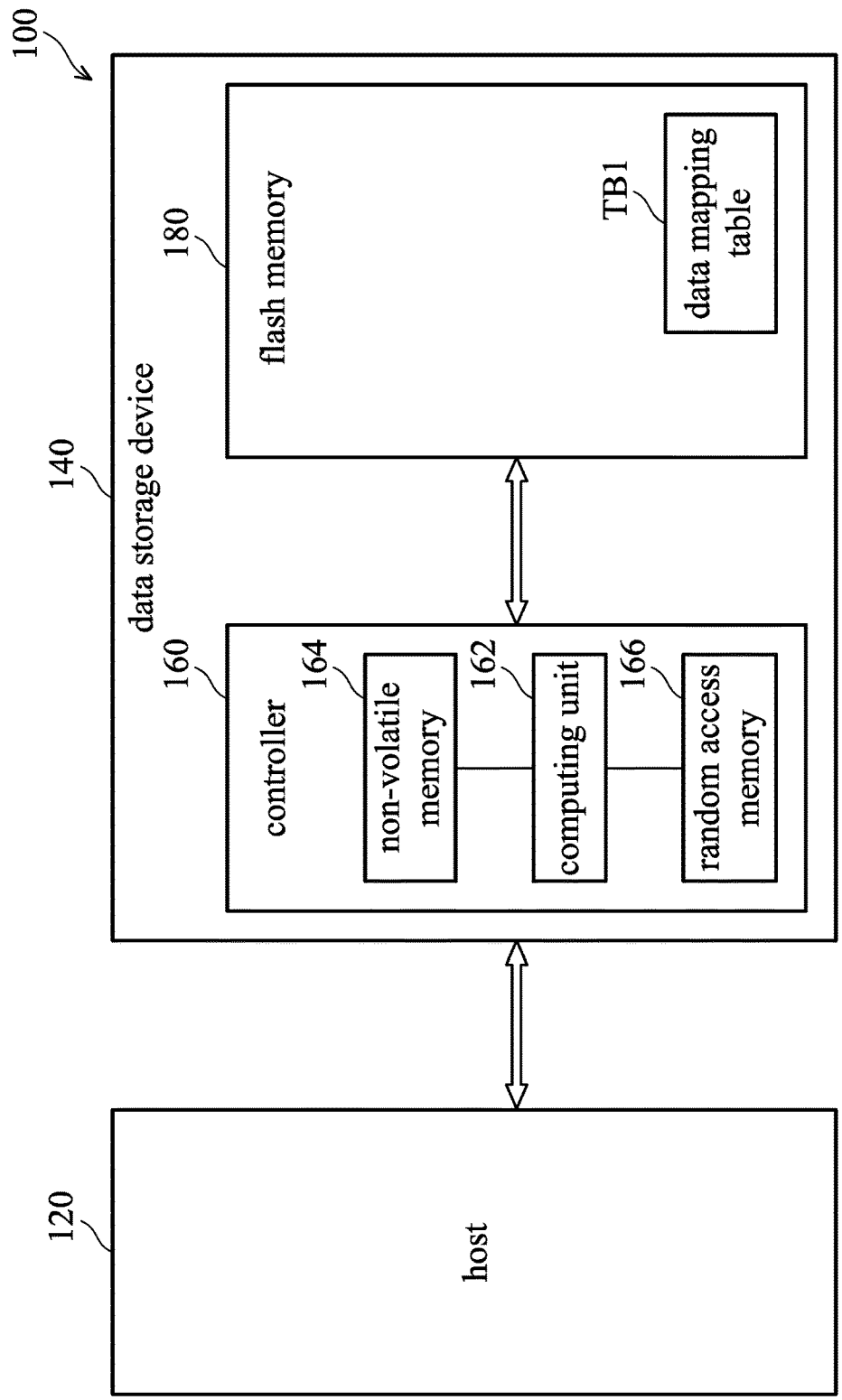
FIG. 1 is a schematic diagram illustrating an electronic system, in accordance with an embodiment.

FIG. 1 is a schematic diagram illustrating an electronic system, in accordance with an embodiment. The electronic system 100 includes a host 120 and a data storage device 140. The data storage device 140 includes a flash memory 180 and a controller 160, and operates in response to the commands of the host 120. The controller 160 includes a computing unit 162, a non-volatile memory 164 (ROM) and a random access memory 166 (RAM). The non-volatile memory 164, the program code stored in the non-volatile memory 164 and data stored in the non-volatile memory 164 constitute firmware executed by the processing unit 162, and the controller 160 is configured to control the flash memory 180 based on the firmware. The flash memory 180 includes a plurality of blocks, each of the blocks has a plurality of pages, each of the pages has a logical address and a physical address, wherein the physical addresses are the permanent addresses of the flash memory 180, the logical addresses are the floating addresses assigned by the host 120 and the controller 160. Moreover, the flash memory 180 further includes a data mapping table TB1 that is dynamically updated by the controller 160, wherein the data mapping table TB1 is arranged to record a plurality of mapping relationships between the logical addresses and the physical addresses of the pages. It should be noted that the minimum erase unit of the flash memory 180 is a block, and the minimum write unit of the flash memory 180 is a page.

FIG. 2 is a schematic diagram illustrating a data mapping table, in accordance with an embodiment. As shown in FIG. 2, the data mapping table TB1 includes the mapping relationships MR_P0~MR_PMX of the logical addresses and the physical addresses of all the pages, wherein each of the mapping relationships MR_P0~MR_PMX corresponds to one page of the flash memory 180, and any two of the mapping relationships MR_P0~MR_PMX are corresponding to the different pages. Moreover, the data mapping table TB1 is divided into a plurality of data mapping sets TS_0~TS_M, each of the data mapping sets TS_0~TS_M has more than one mapping relationship. For example, the data mapping set TS_0 has the mapping relationships MR_P0~MR_PX, the data mapping set TS_1 has the mapping relationships MR_PX+1~MR_P2X, and so on. In this embodiment, each of the data mapping sets TS_0~TS_M has X+1 number of mapping relationships, but it is not limited thereto. In other embodiments, the numbers of mapping relationships of the data mapping sets can be different from each other, and the number of data mapping sets can be adjusted by the designer through the controller 160. It should be noted that each of the data mapping sets TS_0~TS_M corresponds to a set index. In one embodiment, the set index can be 0xAA, 0xBB, 0xCC, 0x128, or other hexadecimal values.

When the data storage device 140 is powered on, the controller 160 can load the data mapping table TB1 on a cache area of the random access memory 166 to perform read operation and update process. However, as the memory space of the flash memory 180 increases, the memory space requirements of the data mapping table TB1 become greater. When the memory space of the whole data mapping table TB1 is greater than the cache area of the random access memory 166, the controller 160 loads a part of the data mapping sets of the data mapping table TB1 on the cache area according to the parameters for operation of the controller. More specifically, when the cache area CA still has space for loading at least one of the data mapping sets TS_0~TS_M, the controller 160 performs a loading process for loading the data mapping set that is required by the operation of the controller on the available sectors of the cache area. When a new data mapping set that hasn't been loaded on the cache area has to be loaded on the cache area from the data mapping table and the cache area is filled, the controller 160 performs a replace process to find the data mapping set that has gone the longest time without having been read from the cache area and replace it with the new data mapping set. When the cache area already has the data mapping set required by the controller 160, the controller 160 performs an update process to update the last read status.

Figure 3:
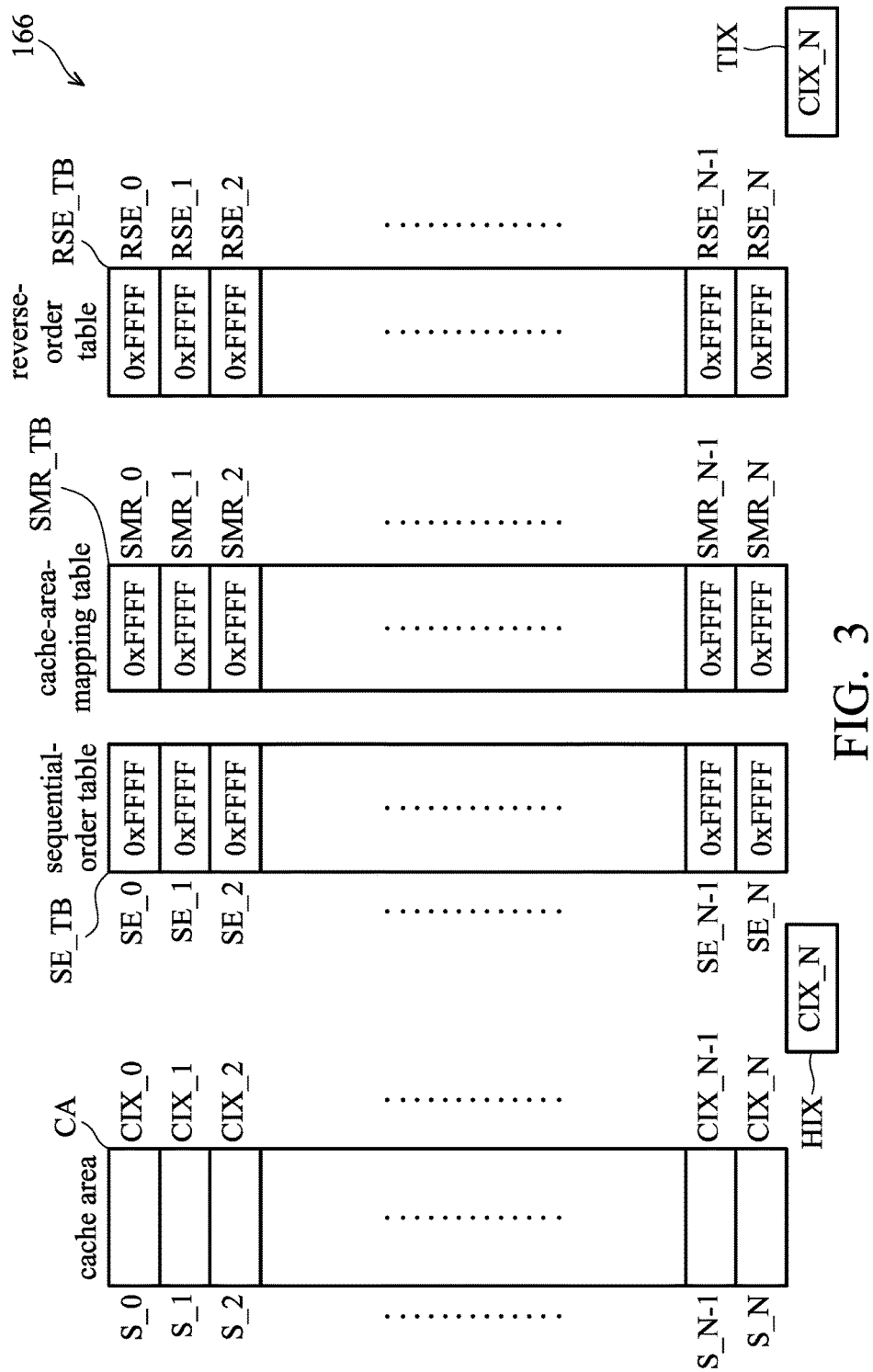
FIG. 3 is a schematic diagram illustrating tables of a random access memory, in accordance with an embodiment.

FIG. 3 is a schematic diagram illustrating tables of a random access memory, in accordance with an embodiment. As shown in FIG. 3, when the data storage device 140 is powered on, the controller 160 builds a cache-area mapping table SMR_TB, a reverse-order table RSE_TB and a sequential-order table SE_TB in the empty space of the random access memory 166 to record the data status of the cache area CA.

The cache area CA has a plurality of sectors S_0~S_N arranged to store a part of the data mapping sets of the data mapping table TB1, wherein each of the sectors is arranged to store one data mapping set. Namely, there are fewer sectors S_0~S_N than there are data mapping sets TS_0~TS_M (N<M).

The cache-area mapping table SMR_TB has a plurality of sector-mapping columns SMR_0~SMR_N arranged to record the set indexes of the data mapping sets TS_0~TS_M in the cache area CA, wherein the sector-mapping columns SMR_0~SMR_N of the cache-area mapping table SMR_TB correspond sequentially to the sectors S_0~S_N of the cache area CA. It should be noted that the initial state of each of the sector-mapping columns SMR_0~SMR_N of the cache-area mapping table SMR_TB has a specific value. In this embodiment, the specific value is 0xFFFF, but it is not limited thereto. Moreover, the set indexes of the data mapping set TS_0~TS_M are different from the specific value.

The sequential-order table SE_TB is arranged to record the order in which the data mapping sets TS_0~TS_M are read from the cache area CA, wherein the sequential-order table SE_TB has a plurality of sequential-order columns SE_0~SE_N corresponding sequentially to the sectors S_0~S_N of the cache area CA. Each of the sequential-order columns SE_0~SE_N of the sequential-order table SE_TB is arranged to store the common index of another sequential-order column that is read prior to the sector of the original sequential-order column (for pointing to another sequential-order column that is read prior to the sector of the original sequential-order column). It should be noted that the initial value of each of the sequential-order columns SE_0~SE_N in the sequential-order table SE_TB is a specific value. In this embodiment, the specific value is 0xFFFF, but it is not limited thereto.

The reverse-order table RSE_TB is arranged to record the opposite order in which the data mapping sets TS_0~TS_M are read from the cache area CA, wherein the reverse-order table RSE_TB has a plurality of reverse-order columns RSE_0~RSE_N corresponding sequentially to the sectors S_0~S_N of the cache area CA. Each of the reverse-order columns RSE_0~RSE_N of the reverse-order table RSE_TB is arranged to store the common index of another reverse-order column that was read subsequent to the sector of the original reverse-order column (for pointing to another sequential-order column that was read subsequent to the sector of the original sequential-order column). It should be noted that the initial status of each of the reverse-order columns RSE_0~RSE_N of the reverse-order table RSE_TB has a specific value. In this embodiment, the specific value is 0xFFFF, but it is not limited thereto.

It should be noted that, in one embodiment, each of the sectors S_0~S_N corresponds sequentially to a plurality of common indexes CIX_0~CIX_N. The sector-mapping columns SMR_0~SMR_N and the corresponding sectors S_0~S_N have the same common indexes CIX_0~CIX_N, respectively. The sequential-order columns SE_0~SE_N and the corresponding sectors S_0~S_N have the same common indexes CIX_0~CIX_N, respectively. The reverse-order columns RSE_0~RSE_N and the corresponding sectors S_0~S_N have the same common indexes CIX_0~CIX_N, respectively. More specifically, the common indexes of the sector S_0, the sequential-order column SE_0, the sector-mapping column SMR_0 and reverse-order column RSE_0 are CIX_0. The common indexes of the sector S_1, the sequential-order column SE_1, the sector-mapping column SMR_1 and the reverse-order column RSE_1 are CIX_1. The common indexes of the sector S_2, the sequential-order column SE_2, the sector-mapping column SMR_2 and the reverse-order column RSE_2 are CIX_2, and so on. It should be noted that the common indexes CIX_0~CIX_N are not equal to the specific value. In one embodiment, the common indexes CIX_0~CIX_N are all hexadecimals, 0x0, 0x1, 0x2, 0x3 . . . , and so on, but it is not limited thereto.

As described above, the controller 160 builds the cache-area mapping table SMR_TB to record the set indexes corresponding to the data mapping sets TS_0~TS_M in the cache area CA. The controller 160 builds the reverse-order table RSE_TB to record the opposite order in which the data mapping sets TS_0~TS_M are read from the cache area CA. The controller 160 builds the sequential-order table SE_TB to record the sequential order in which the data mapping sets TS_0~TS_M are read from the cache area CA. In one of the embodiments, the controller 160 further configured to build a head index HIX and a tail index TIX in the random access memory 166, wherein the head index HIX and the tail index TIX can also be built in the other memory device or other circuit. The head index HIX is the common index corresponding to the sector that was read last from the cache area CA for pointing to the last read sector in the cache area CA. The tail index TIX is the common index corresponding to the sector that has gone the longest time without having been read from the cache area CA for pointing to the first read sector in the cache area CA. It should be noted that the sequential-order column, the sector-mapping column and the reverse-order column have the same common index with the corresponding sector, such that the head index HIX and the tail index TIX are also pointing to the sequential-order column, the sector-mapping column, and the reverse-order column corresponding to the common index(es) stored in the head index HIX and the tail index TIX. In this embodiment, the controller 160 selects one of the sectors S_0~S_N according to the tail index TIX. Namely, the controller 160 may select the sector (the data mapping set) that has gone the longest time without having been read from the cache area CA by the tail index TIX, and load the new data mapping set into the selected sector. Moreover, the controller 160 updates the reverse-order table RSE_TB and the sequential-order table SE_TB according to the head index HIX, the original reverse-order table RSE_TB and the original sequential-order table SE_TB. The following paragraphs related to FIGS. 3-8 describe the relationships of the cache area CA, cache-area mapping table SMR_TB, the reverse-order table RSE_TB and the sequential-order table SE_TB.

Figure 4:
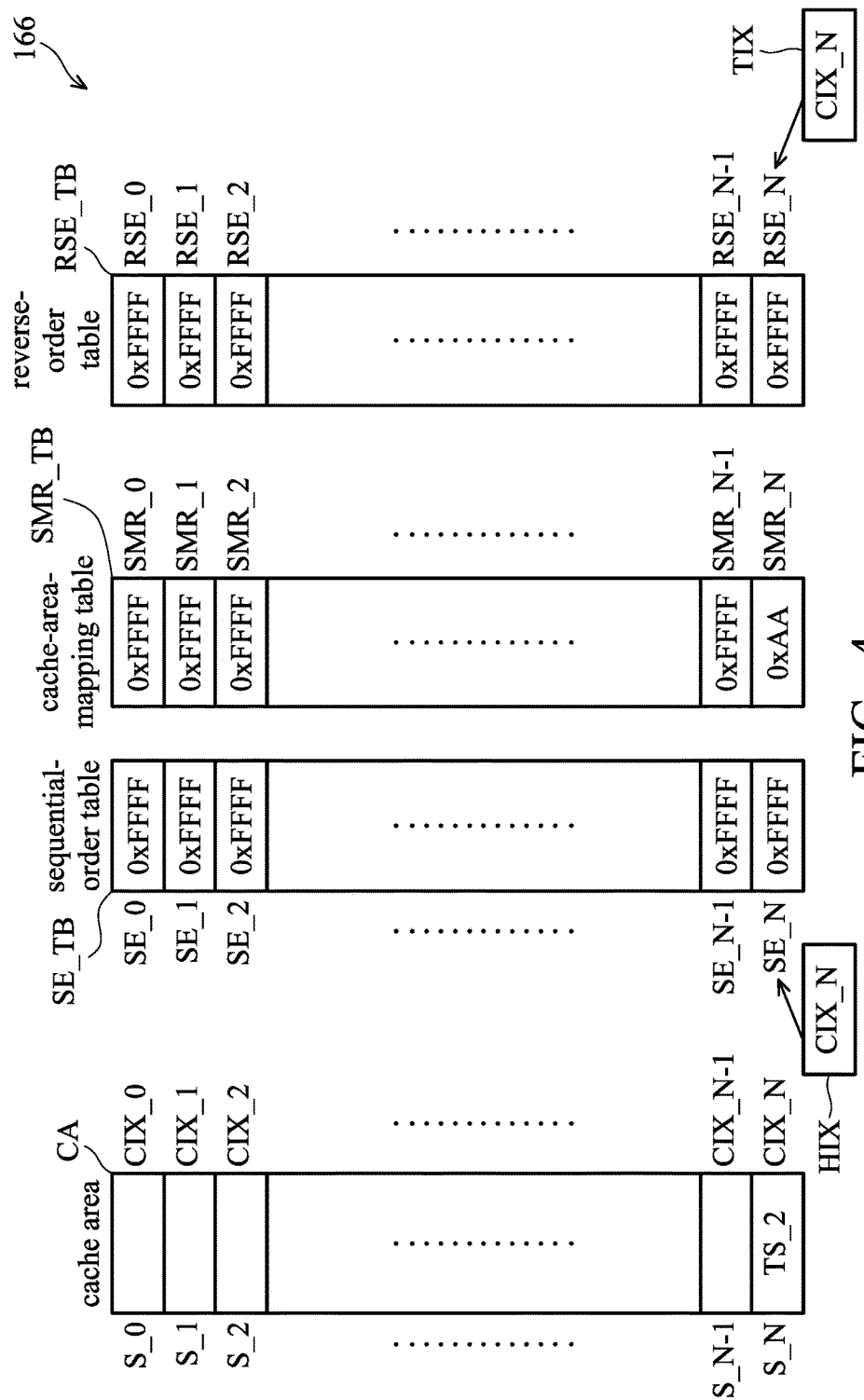
FIG. 4 is a schematic diagram illustrating tables of a random access memory, in accordance with another embodiment.

FIG. 3 shows the initial state of the cache area CA, cache-area mapping table SMR_TB, the reverse-order table RSE_TB and the sequential-order table SE_TB. When the controller 160 receives a read command or a write command in the initial state, the controller 160 obtains a first data mapping set that has a first mapping relationship of the page indicated by the read command or the write command. For example, in one embodiment, the mapping relationship of the logical address and the physical address of the page indicated by the read command/the write command is recorded in the data mapping set TS_2. The controller 160 obtains the page according to the indication of the received read command or the received write command, and finds the corresponding data mapping set TS_2. Next, the controller 160 determines whether the data mapping set TS_2 has been loaded on the cache area CA according to whether the cache-area mapping table SMR_TB has the set index corresponding to the first data mapping set TS_2. For example, the set index of the data mapping set TS_2 is 0xAA. As shown in FIG. 3, none of the data mapping sets is loaded on the cache area CA, so all of the sector-mapping columns SMR_0~SMR_N of the cache-area mapping table SMR_TB are 0xFFFF. Therefore, in this embodiment, the controller 160 determines that the set index 0xAA of the data mapping set TS_2 is not in the cache-area mapping table SMR_TB. Namely, the controller 160 determines that the data mapping set TS_2 is not in the cache area CA according to the cache-area mapping table SMR_TB if it does not have the set index 0xAA of the data mapping set TS_2. Next, the controller 160 determines whether any of the sectors S_0~S_N of the cache area CA is available. As shown in FIG. 3, all of the sectors S_0~S_N of the cache area CA are available, and the controller 160 selects one of the available sectors S_0~S_N. In this embodiment, the controller 160 selects the available sector from the bottom of the cache area CA, so the controller 160 selects the sector S_N. Next, the controller 160 retrieves the data mapping set TS_2 from the data mapping table TB1 of the flash memory 180, and loads the data mapping set TS_2 on the selected sector S_N. Next, the controller 160 updates the cache-area mapping table SMR_TB, the sequential-order table SE_TB, the reverse-order table RSE_TB, the head index HIX and the tail index TIX to record the current state of the cache area CA. As shown in FIG. 4, the controller 160 writes the set index 0xAA of the data mapping set TS_2 into the corresponding sector-mapping column SMR_N, defines the head index HIX and the tail index TIX as the common index CIX_N of the sector S_N. It should be noted that, in this embodiment, the controller 160 keeps the sequential-order column SE_N corresponding to the sector S_N of the sequential-order table SE_TB and the reverse-order column RSE_N corresponding to the sector S_N of the reverse-order table RSE_TB as the specific value 0xFFFF. Lastly, the controller 160 retrieves the data mapping set TS_2 of the cache area CA to perform the received write command or the received read command.

Figure 5:
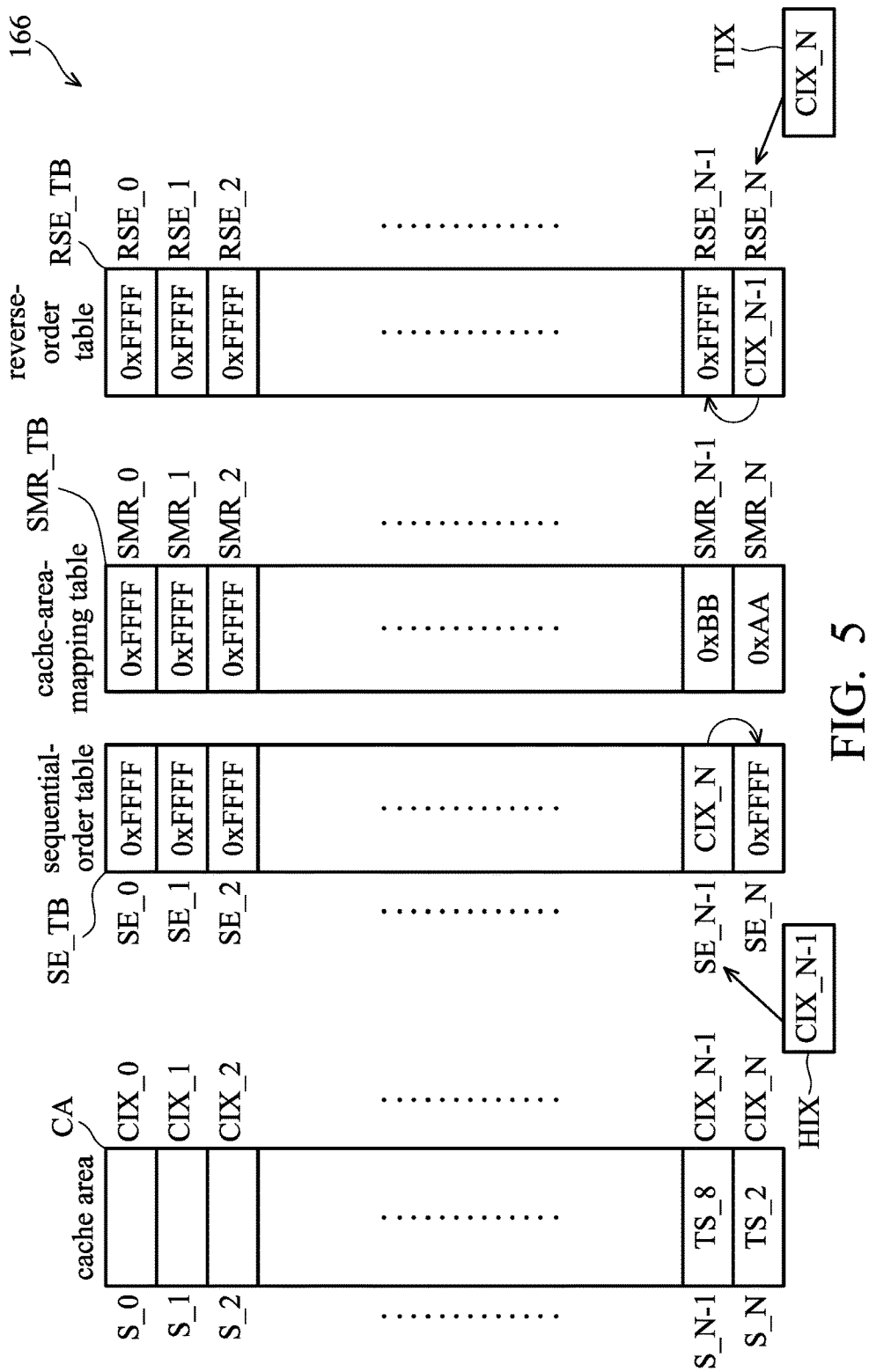
FIG. 5 is a schematic diagram illustrating tables of a random access memory, in accordance with another embodiment.

Next, in the embodiment of FIG. 4, when the controller 160 receives a read command or a write command, the controller 160 obtains a data mapping set that has the mapping relationship of the pages indicated by the received read command or the received write command. For example, in this embodiment the mapping relationship corresponding to the logical address and the physical address of the page indicated by the read command/the write command is recorded in the data mapping set TS_8. Next, the controller 160 determines whether the data mapping set TS_8 has been loaded on the cache area CA according to whether the cache-area mapping table SMR_TB has the set index corresponding to the first data mapping set TS_8. For example, the set index of the data mapping set TS_8 is 0xBB. As shown in FIG. 4, the cache area CA only has the data mapping set TS_2, and all sector-mapping columns of the cache-area mapping table SMR_TB are 0xFFFF except for the sector-mapping column SMR_N is 0xAA. Therefore, in this embodiment, the controller 160 determines that the cache-area mapping table SMR_TB does not have the set index 0xBB of the data mapping set TS_8. Namely, the controller 160 determines that the data mapping set TS_8 is not in the cache area CA when the cache-area mapping table SMR_TB does not have the set index 0xBB of the data mapping set TS_8. Next, the controller 160 determines whether any of the sectors of the cache area CA is available. As shown in FIG. 4, the sectors S_0~S_N−1 of the cache area CA are available. The controller 160 selects an available sector from the cache area CA. In this embodiment, the controller 160 selects the sector S_N−1. Next, the controller 160 retrieves the data mapping set TS_8 form the data mapping table TB1 in the flash memory 180, and loads the data mapping set TS_8 on the selected sector S_N−1. Next, the controller 160 updates the cache-area mapping table SMR_TB, the sequential-order table SE_TB, the reverse-order table RSE_TB, the head index HIX and the tail index TIX to record the current state of the cache area CA. As shown in FIG. 4, the controller 160 locates the sector S_N of the data mapping set TS_2 that was read last from the cache area CA according to the head index HIX, and writes the common index CIX_N of the sequential-order column SE_N corresponding to the sector S_N into the sequential-order column SE_N−1 corresponding to the current sector S_N−1. Next, the controller 160 writes the common index CIX_N−1 of the reverse-order column RSE_N−1 corresponding to the current sector S_N−1 into the reverse-order column RSE_N corresponding to the sector S_N. Next, the controller 160 defines the head index HIX as the common index CIX_N−1 of the current sector S_N−1, and keeps the tail index TIX as the common index CIX_N. The updated cache-area mapping table SMR_TB, the updated sequential-order table SE_TB, the updated reverse-order table RSE_TB, the updated head index HIX and the updated tail index TIX are shown in FIG. 5. Lastly, the controller 160 retrieves the data mapping set TS_8 stored in the cache area CA to perform the received write command and the received read command.

Figure 6:
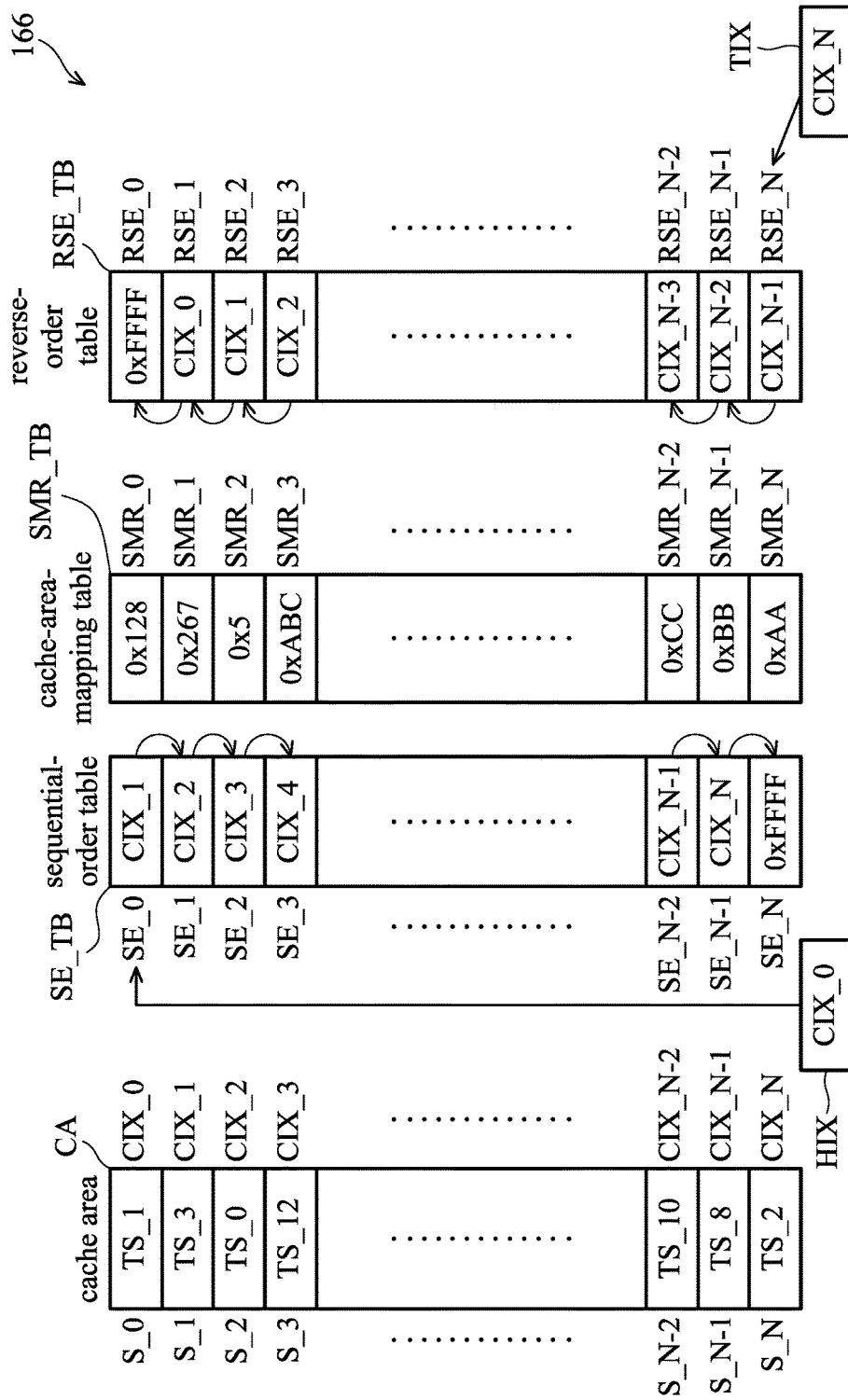
FIG. 6 is a schematic diagram illustrating tables of a random access memory, in accordance with another embodiment.

If the controller 160 continuously receives the write commands and/or the read commands corresponding to the different data mapping sets, the controller 160 repeats the steps described above (the steps for transforming FIG. 4 to FIG. 5) to load the data mapping sets on the sectors S_N−2~S_0, as shown in FIG. 6 (as result in FIG. 6). Namely, the controller 160 repeats the loading process to fill the cache area CA. It should be noted that, in this embodiment, the initial value of the sequential-order table SE_TB and the reverse-order table RSE_TB is the specific value (0xFFFF), so the specific value doesn't have to be written into the reverse-order column corresponding to the sector that was read last from the cache area CA in the loading process and the reverse-order column corresponding to the current sector. In other embodiments, if the specific value of the sequential-order table SE_TB and the reverse-order table RSE_TB is different from the initial value, the controller 160 have to write the specific value into the sequential-order column corresponding to the sector that was read last from the cache area CA and the reverse-order column corresponding to the current sector in the loading process.

The following is the description of the update process. In the embodiment of FIG. 6, when the controller 160 receives a read command or a write command, the controller 160 locates the data mapping set that has the mapping relationship of the page indicated by the received read command or the received write command. For example, the data mapping set that has the mapping relationship of the page indicated by the read command or the write command is TS_0. Next, the controller 160 determines whether the data mapping set TS_0 has been loaded on the cache area CA according to whether the cache-area mapping table SMR_TB has the set index 0x5 corresponding to the data mapping set TS_0. In this embodiment, as shown in FIG. 6, the set index 0x5 of the data mapping set TS_0 has been loaded on the sector-mapping columns SMR_2 of the cache-area mapping table SMR_TB. Therefore, in this embodiment, the controller 160 determines that the set index 0x5 of the data mapping set TS_0 is in the cache-area mapping table SMR_TB. Namely, the controller 160 determines that the data mapping set TS_0 has been loaded on the cache area CA when the set index 0x5 of the data mapping set TS_0 is in the cache-area mapping table SMR_TB. Next, the controller 160 updates the cache-area mapping table SMR_TB, the sequential-order table SE_TB, the reverse-order table RSE_TB, the head index HIX and the tail index TIX to record the current state of the cache area CA. As shown in FIG. 6, the controller 160 retrieves the sequential-order column SE_2 of the current sector S_2 to obtain that the sector that is written prior to the current sector S_2 is the sector S_3. Next, the controller 160 writes the common index CIX_1 stored in the reverse-order column RSE_2 corresponding to the current sector S_2 into the reverse-order column RSE_3 corresponding to the sector S_3. Namely, the controller 160 rewrites the reverse-order column RSE_3 to make the reverse-order column RSE_3 re-point to the reverse-order column RSE_1 rather than the original reverse-order column RSE_2. Next, the controller 160 reads the value of the reverse-order column RSE_2 corresponding to the current sector S_2 in the reverse-order table RSE_TB according to the common index CIX_2 of the current sector S_2, and finds that the common index CIX_1 of the sector S_1 is the common index of the sector that was read subsequent to the current sector S_2 according to the common index CIX_1 stored in the reverse-order column RSE_2. Next, the controller 160 writes the common index CIX_3 stored in the sequential-order column SE_2 corresponding to the current sector S_2 into the sequential-order column SE_1 corresponding to the sector S_1. Namely, the controller 160 makes the sequential-order column SE_1 that was pointing to the sequential-order column SE_2 re-point to the sequential-order column SE_3. Next, the controller 160 obtains a sector S_0 of the data mapping set TS_1 than was last read from the cache area CA according to the head index HIX, and writes the common index CIX_0 of the sequential-order column SE_0 corresponding to the sector S_0 into the sequential-order column SE_2 of the current sector S_2. Next, the controller 160 writes the common index CIX_2 of the reverse-order column RSE_2 corresponding to the current sector S_2 into the reverse-order column RSE_0 corresponding to the sector S_0. Lastly, the controller 160 defines the head index HIX as the common index CIX_2 of the current sector S_2, keeps the common index CIX_N in the tail index TIX, and writes a specific value into the reverse-order column RSE_2 corresponding to the current sector S_2. The updated cache-area mapping table SMR_TB, the updated sequential-order table SE_TB, the updated reverse-order table RSE_TB, the updated head index HIX and the updated tail index TIX are shown in FIG.

7A. Next, the controller 160 reads the corresponding sector S_2 in the cache area CA according to the common index CIX_2 of the sector-mapping column SMR_2 arranged to store the set index 0x5 for obtaining the data mapping set TS_0. Namely, the controller 160 reads the data mapping set TS_0 stored in the cache area CA to perform the received write command or the received read command.

Figure 7A:
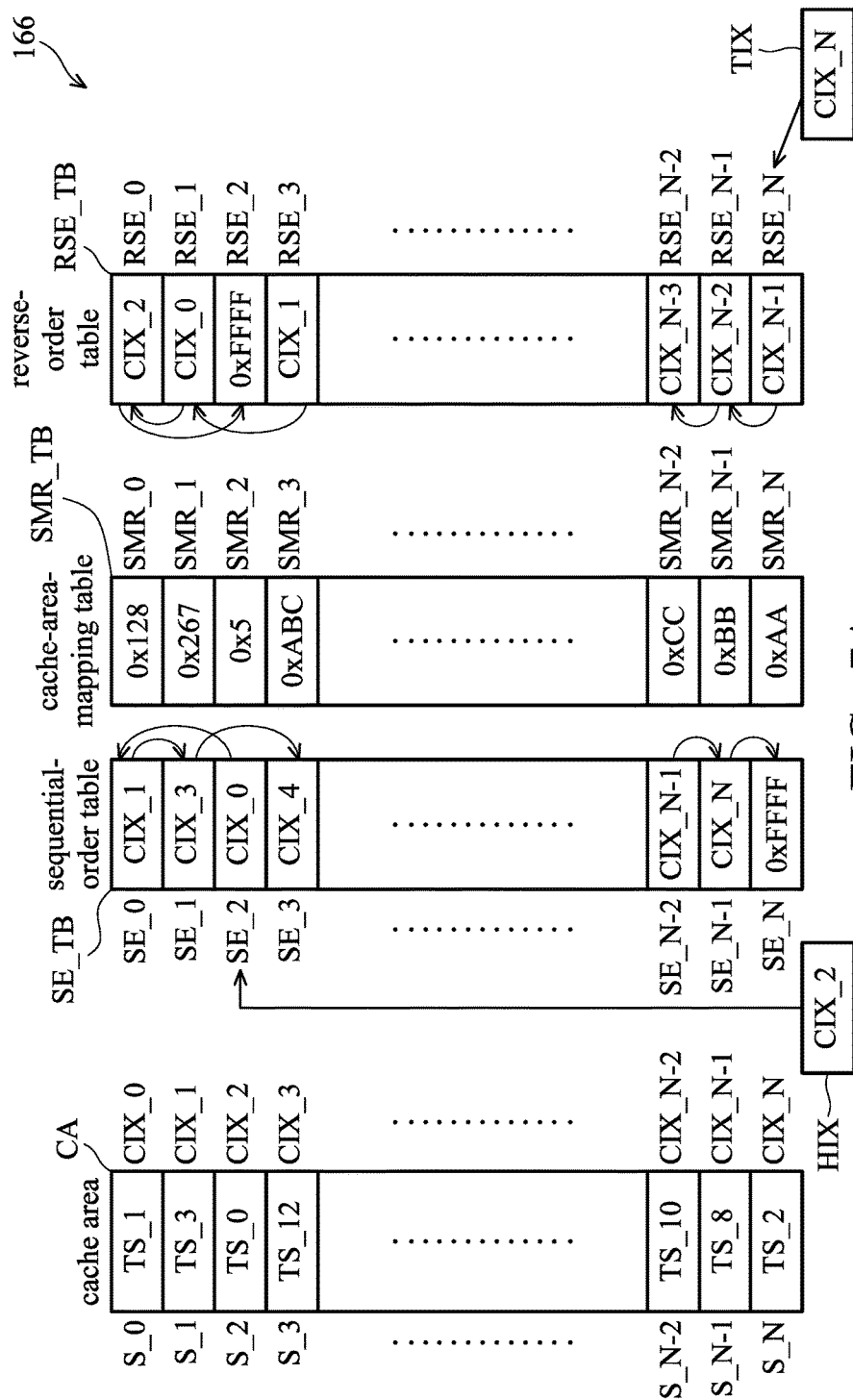
FIG. 7A is a schematic diagram illustrating tables of a random access memory, in accordance with another embodiment.
Figure 7B:
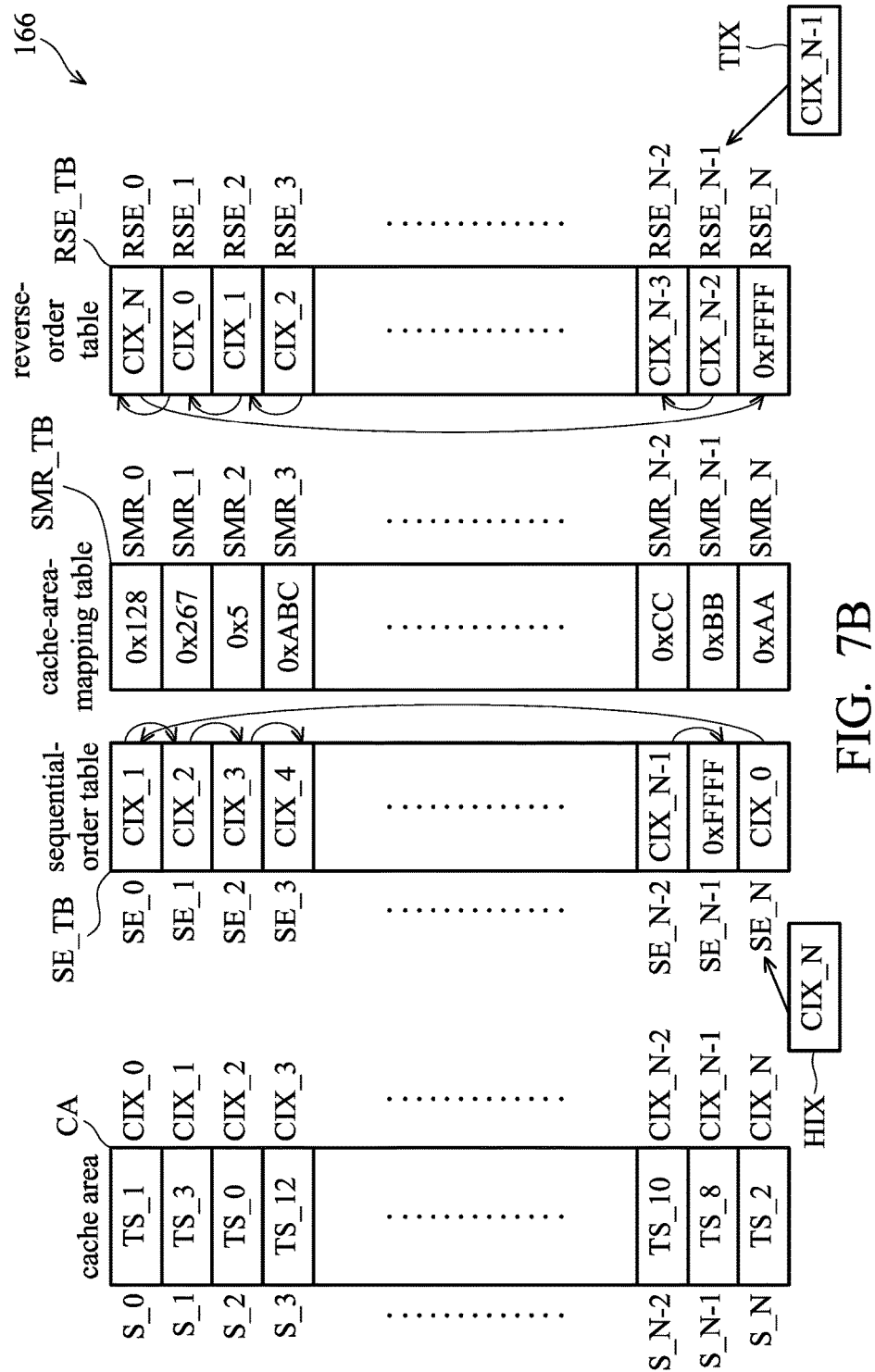
FIG. 7B is a schematic diagram illustrating tables of a random access memory, in accordance with another embodiment.

It should be noted that, in another embodiment of the update process, when the data mapping set corresponding to the write command and the read command has gone the longest time without having been read from the cache area CA, the operations of the controller 160 will be different from the operations corresponding to FIG. 7A. For example, in this embodiment, the data mapping set that includes the mapping relationship of the pages indicated by the read command or the write command is TS_2. The controller 160 determining whether the data mapping set TS_2 is loaded on the cache area CA according to whether the cache-area mapping table SMR_TB includes the set index 0xAA corresponding to the data mapping set TS_2. In this embodiment, as shown in FIG. 6, the set index 0xAA of the data mapping set TS_2 is recorded in the sector-mapping column SMR_N of the cache-area mapping table SMR_TB. Therefore, in this embodiment, the controller 160 determines that the set index 0xAA of the data mapping set TS_2 is included in the cache-area mapping table SMR_TB. Namely, the controller 160 determines that the data mapping set TS_2 has been loaded on the cache area CA when the set index 0xAA of the data mapping set TS_2 is in the cache-area mapping table SMR_TB. It should be noted that, in this embodiment, based on the tail index TIX shown in FIG. 6, the data mapping set TS_2 is the one that has gone the longest time without having been read in the cache area CA. Next, the controller 160 updates the cache-area mapping table SMR_TB, the sequential-order table SE_TB, the reverse-order table RSE_TB, the head index HIX and the tail index TIX to record the current state of the cache area CA. As shown in FIG. 6, the controller 160 retrieves the value stored in the reverse-order column RSE_N of the current sector S_N in the reverse-order table RSE_TB according to the common index CIX_N of the current sector S_N, and obtains the common index CIX_N−1 of the sector S_N−1 that was read subsequent to the current sector S_N according to the common index CIX_N−1 of the reverse-order column RSE_N. Next, the controller 160 writes the value stored in the sequential-order column SE_N corresponding to the current sector S_N into the sequential-order column SE_N−1 corresponding to the sector S_N−1, wherein the current sector S_N has gone the longest time without having been read, and the value stored in the sequential-order column SE_N is the specific value. Next, the controller 160 obtains the sector S_0 including the data mapping set TS_1 that was read last from the cache area CA according to the head index HIX, and writes the common index CIX_0 of the sequential-order column SE_0 corresponding to the sector S_0 into the sequential-order column SE_N corresponding to the sector S_N. Next, the controller 160 writes the common index CIX_N of the reverse-order column RSE_N corresponding to the current sector into the reverse-order column RSE_0 corresponding to the sector S_0. Lastly, the controller 160 defines the head index HIX as the common index CIX_N of the current sector S_N, defines the tail index TIX as the common index CIX_N−1 of the sector S_N−1 that was read subsequent to the current sector S_N, and writes the specific value into the reverse-order column RSE_N corresponding to the common index CIX_N pointed to by the current head index. The updated cache-area mapping table SMR_TB, the updated sequential-order table SE_TB, the updated reverse-order table RSE_TB, the updated head index HIX and the updated tail index TIX are shown in FIG. 7B. Next, the controller 160 reads the sector S_N of the cache area CA to obtain the data mapping set TS_2 according to the common index CIX_N of the sector-mapping column SMR_N that stores the set index 0xAA. Namely, the controller 160 retrieves the data mapping set TS_2 from the cache area CA to perform the received write command and the received read command.

Figure 8:
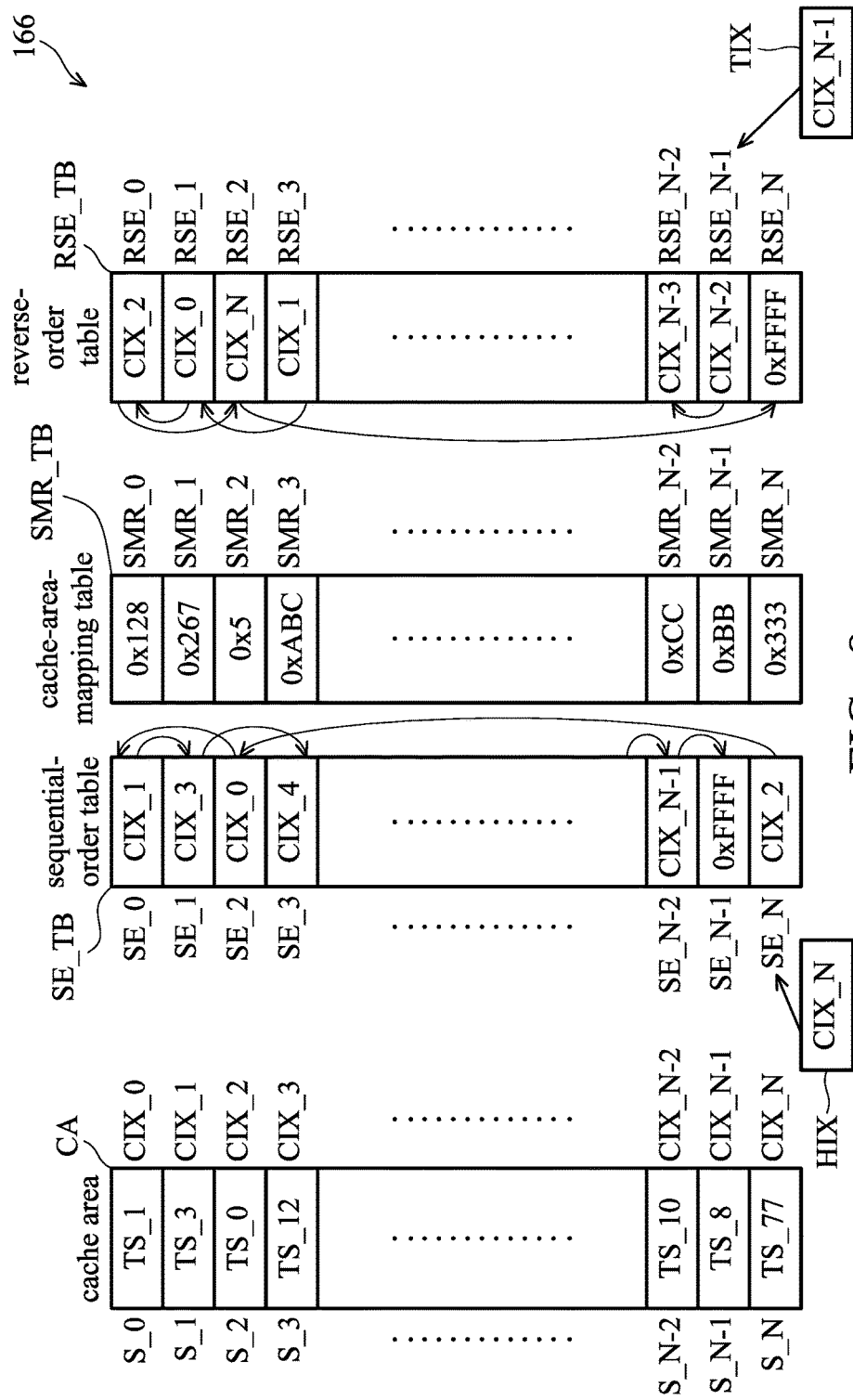
FIG. 8 is a schematic diagram illustrating tables of a random access memory, in accordance with another embodiment.
Figure 10A:
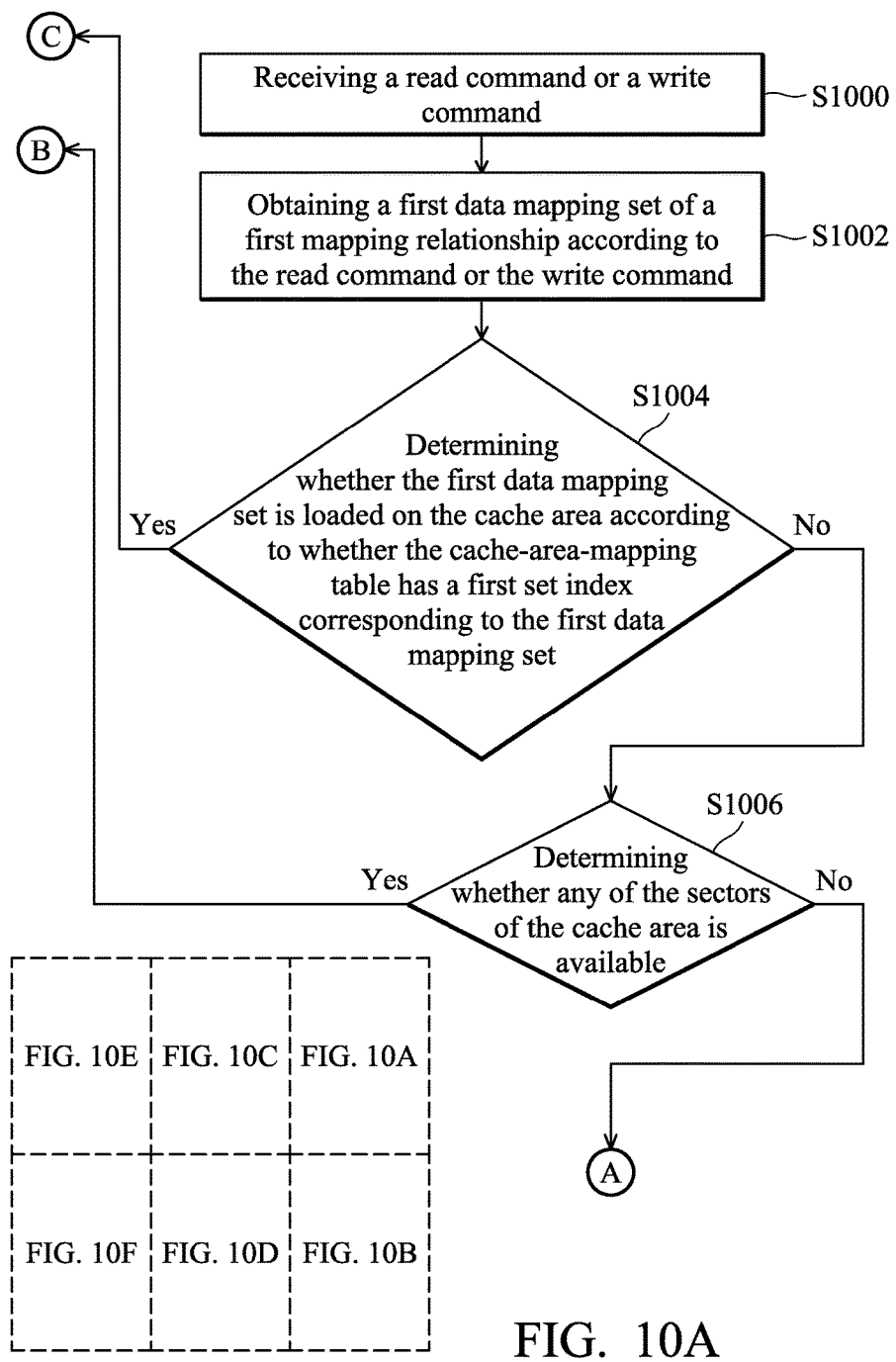
FIGS. 10A~10F is a flowchart of a data maintenance method in accordance with some embodiments.
Figure 10B:
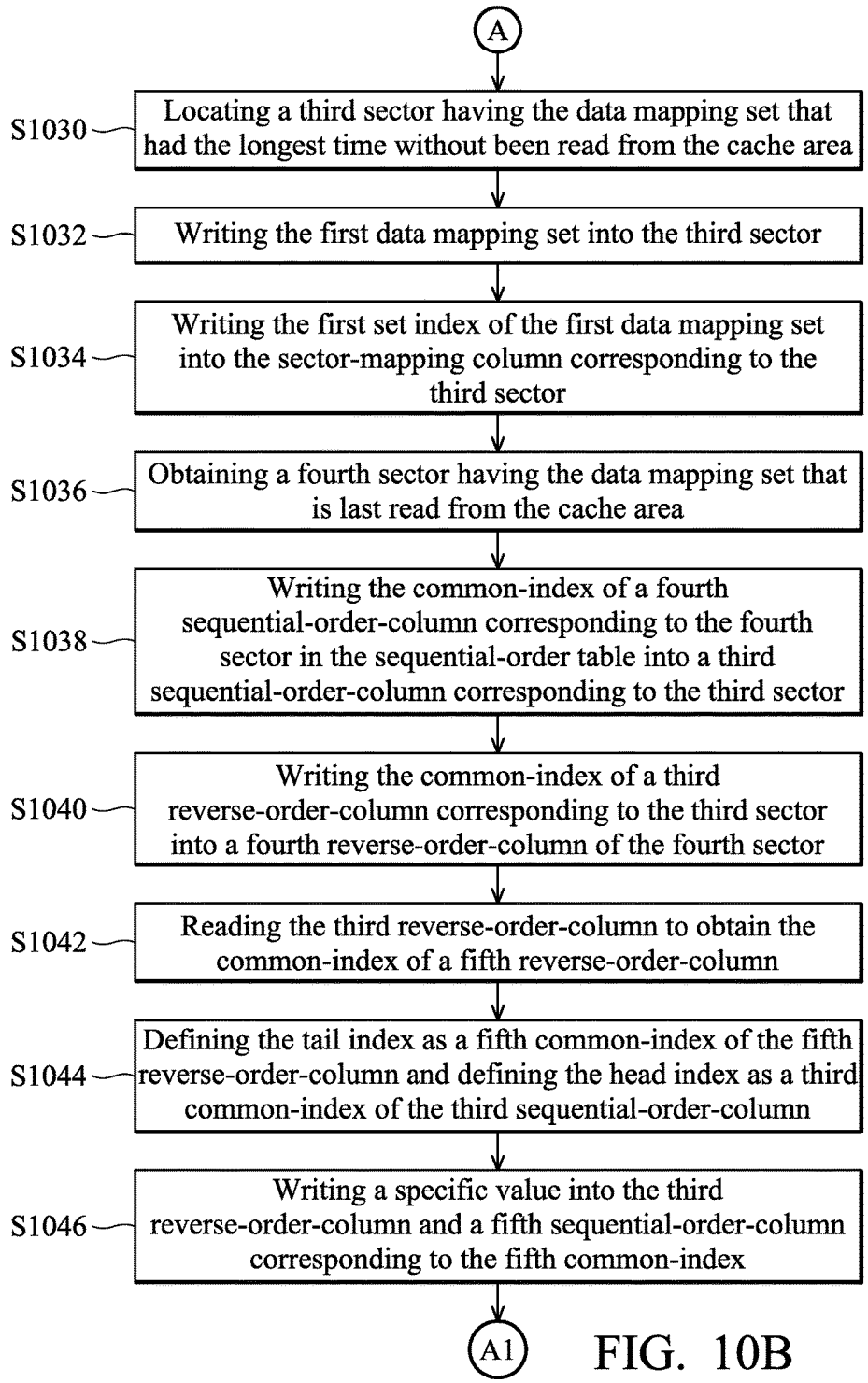
Figure 10C:
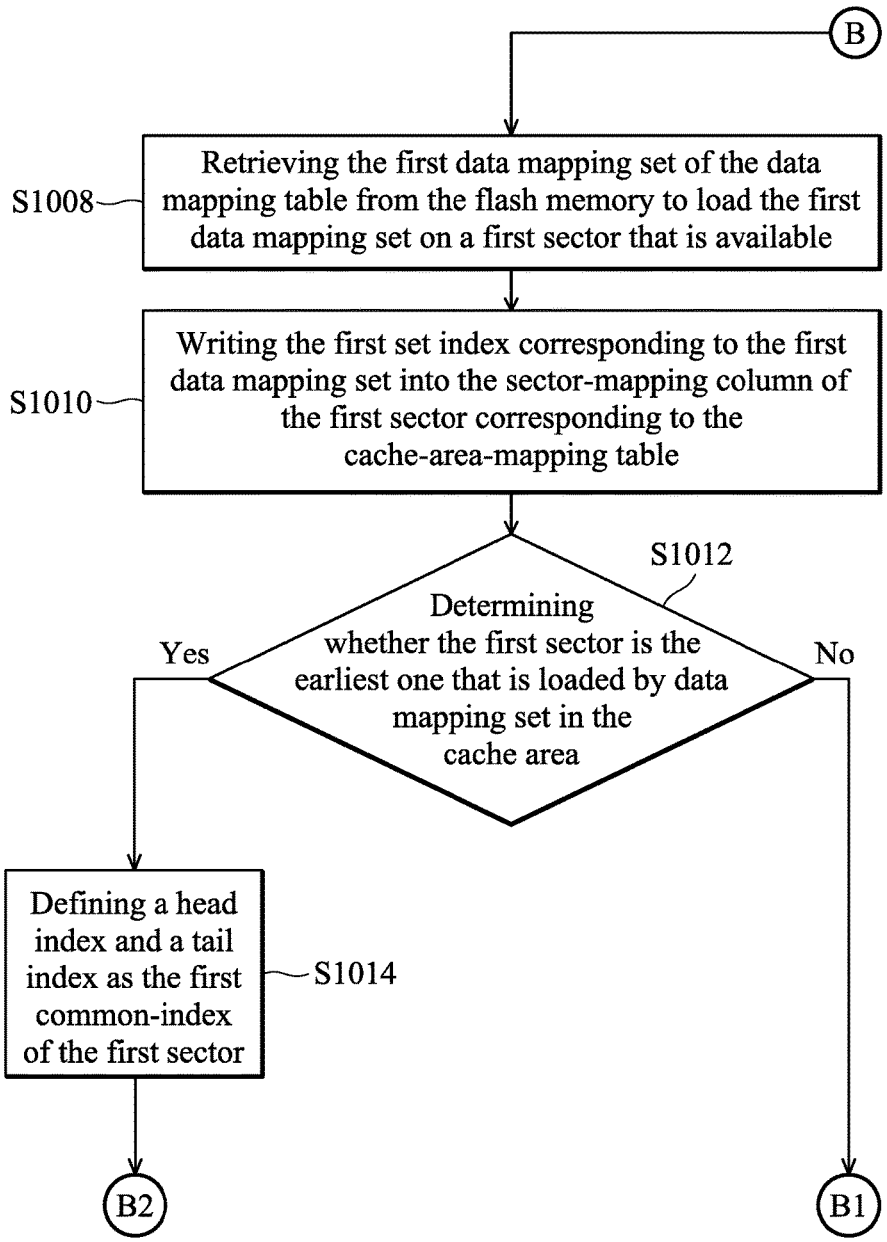
Figure 10D:
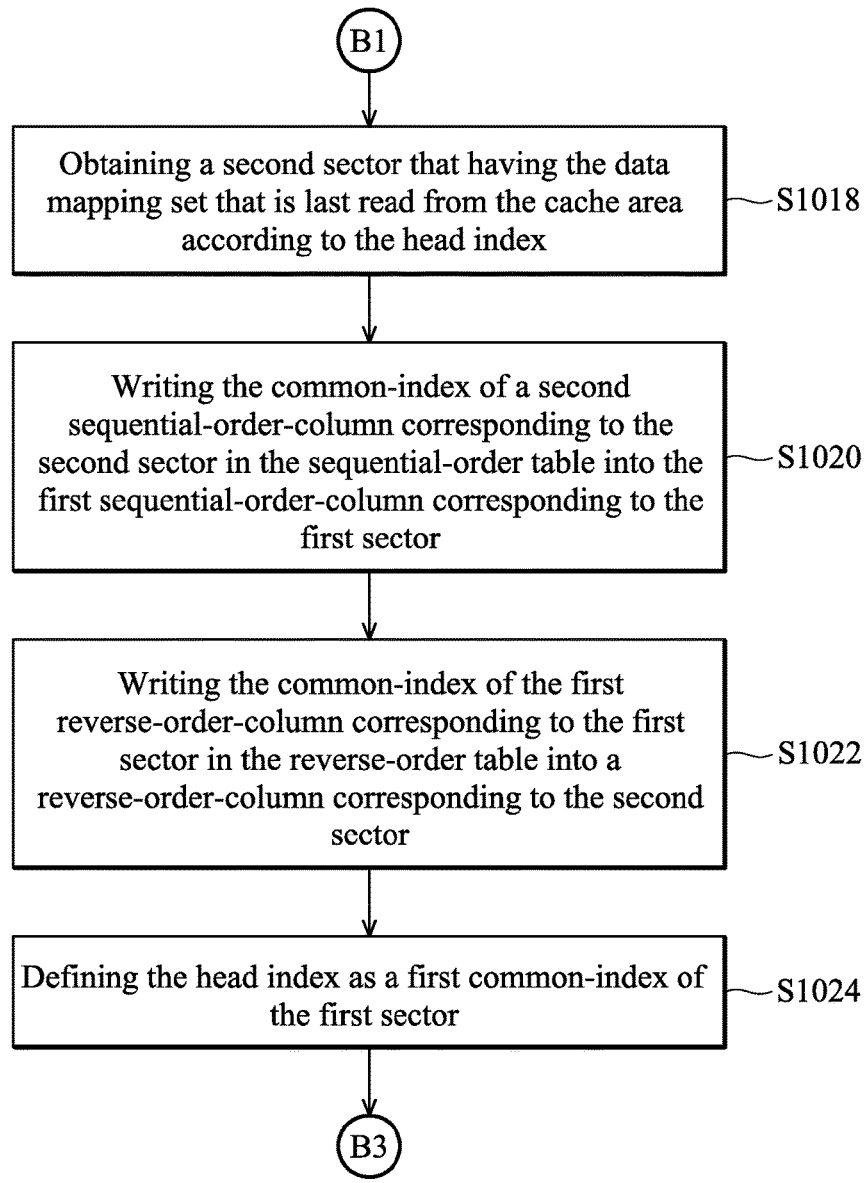
Figure 10E:
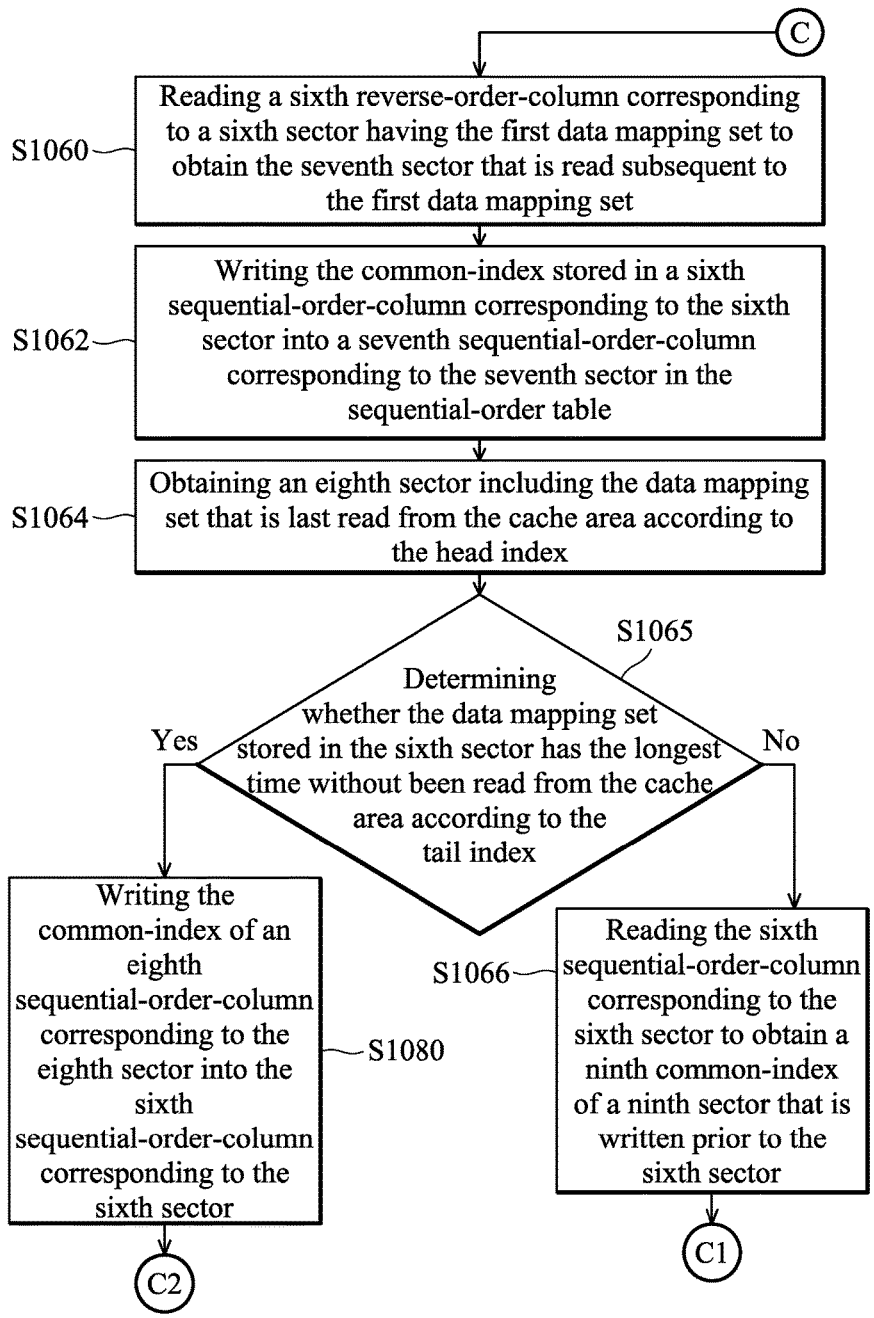
Figure 10F:
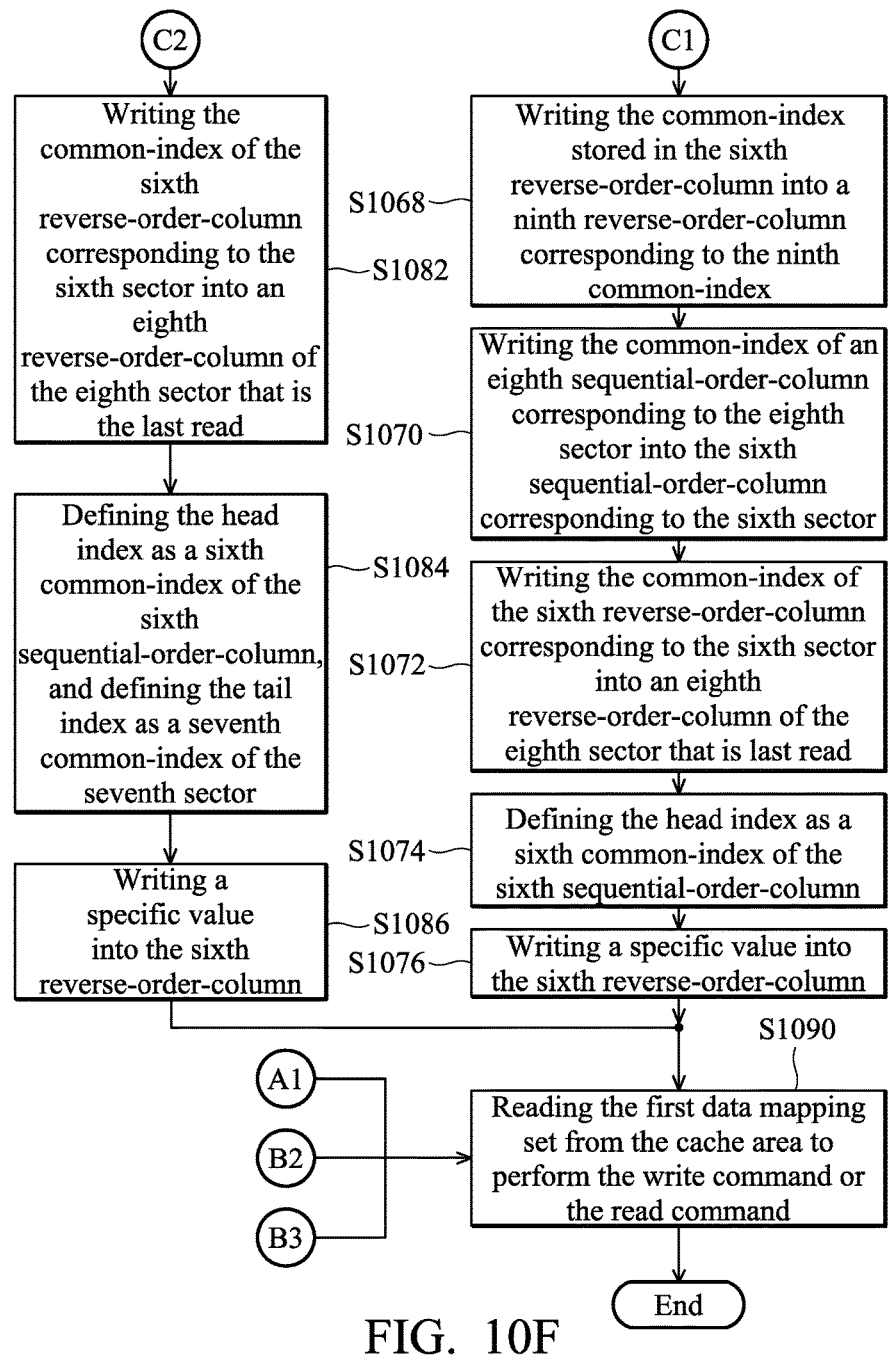

The following is a description of the replace process. Based on the embodiment of FIG. 7A, when the controller 160 receives a read command or a write command, the controller 160 obtains a data mapping set of a mapping relationship of the pages indicated by the read command or the write command. For example, in this embodiment, the data mapping set that includes the mapping relationship of the page indicated by the read command or the write command is TS_77. Next, the controller 160 determines whether the data mapping set TS_77 is loaded on the cache area CA according to whether the cache-area mapping table SMR_TB has the set index 0x333 of the data mapping set TS_77. In this embodiment, the cache area CA does not have data mapping set TS_77, so the set index 0x333 is also not in any sector-mapping columns SMR_0~SMR_N of the cache-area mapping table SMR_TB. The controller 160 determines that the data mapping set TS_77 is not in the cache area CA when the set index 0x333 of the data mapping set TS_77 is not in the cache-area mapping table SMR_TB. Next, the controller 160 determines whether any of the sectors in the cache area CA is available. As shown in FIG. 7A, the sectors S_0~S_N of the cache area CA are all occupied. Next, the controller 160 determines which of the data mapping sets in the cache area CA has gone the longest time without having been read according to the tail index TIX, and writes the data mapping set TS_77 into the data mapping set that has gone the longest time without having been read in the cache area CA. As shown in FIG. 7A, the controller 160 determines that the data mapping set TS_2 has gone the longest time without having been read according to the common index CIX_N stored in the tail index TIX, and obtains that the sector S_N is the one that has gone the longest time without having been read according to the common index CIX_N. Next, the controller 160 retrieves the data mapping set TS_77 from the data mapping table TB1 stored in the flash memory 180 to load the data mapping set TS_77 on the obtained sector S_N for replacing the data mapping set TS_2 that hasn't been read for a long time. Next, the controller 160 updates the cache-area mapping table SMR_TB, the sequential-order table SE_TB, the reverse-order table RSE_TB, the head index HIX and the tail index TIX to record the current state of the cache area CA. First, the controller 160 writes the set index 0x333 of the data mapping set TS_77 into the sector-mapping column SMR_N corresponding to the sector S_N. As shown in FIG. 7A, the controller 160 obtains the sector S_2 including the data mapping set TS_0 that was read last from the cache area CA according to the head index HIX, and writes the common index CIX_2 of the sequential-order column SE_2 corresponding to the sector S_2 into the sequential-order column SE_N corresponding to the current sector S_N. Next, the controller 160 writes the common index CIX_N of the reverse-order column RSE_N corresponding to the current sector S_N into the reverse-order column RSE_2 corresponding to the sector S_2. Next, the controller 160 reads the reverse-order column RSE_N of the current sector S_N to obtain the common index CIX_N−1 of the sector S_N−1 that was read subsequent to the current sector S_N. Next, the controller 160 defines the head index HIX as the common index CIX_N of the current sector S_N, and defines the tail index TIX as the common index CIX_N−1 of the sector S_N−1 that was read subsequent to the current sector S_N. Lastly, the controller 160 writes the specific value into the sequential-order column SE_N−1 corresponding to the sector S_N−1 that was read subsequent to the current sector S_N, and writes the specific value into the reverse-order column RSE_N corresponding to the current sector S_N. The updated cache-area mapping table SMR_TB, the updated sequential-order table SE_TB, the updated reverse-order table RSE_TB, the updated head index HIX and the updated tail index TIX are shown in FIG. 8. Lastly, the controller 160 retrieves the data mapping set TS_8 from the cache area CA to perform the received write command and the received read command.

FIG. 9 is a flowchart of a data maintenance method in accordance with some embodiments. The data maintenance method of FIG. 9 is applied to the data storage device 140 of FIG. 1. The process starts at step S900.

In step S900, when the flash memory 180 is powered on, the controller 160 loads a part of the data mapping sets TS_0~TS_N of the data mapping table TB1 on a cache area CA of the random access memory 166 according to at least one read command or at least one write command.

Next, in step S902, the controller 160 builds a cache-area mapping table SMR_TB, a reverse-order table RSE_TB and a sequential-order table SE_TB in the random access memory 166 according to the order in which the loaded data mapping sets are read from the cache area CA. More specifically, the controller 160 builds the cache-area mapping table SMR_TB in the random access memory 166 to record the set indexes of the data mapping sets in the cache area CA. The controller 160 builds the reverse-order table RSE_TB in the random access memory 166 to record the opposite order in which the data mapping sets are read from the cache area CA. The controller 160 builds the sequential-order table SE_TB in the random access memory 166 to record the sequence order in which the data mapping sets are read from the cache area CA. It should be noted that the order in which the data mapping sets are read from the cache area CA in step S902 is equal to the order in which the data mapping sets of the data mapping table TB1 is read from the cache area CA by the controller 160 for performing the write command and the read command. Moreover, in another embodiment, the controller 160 builds a head index HIX and a tail index TIX according to the order in which the data mapping sets of the data mapping table TB1 is read from the cache area CA. When the new data mapping set that hasn't been loaded on the cache area CA has to be loaded on the cache area CA from the data mapping table TB1 and the cache area CA is filled, the controller 160 selects one of the sectors S_0~S_N from the cache area CA for loading the new data mapping set into the selected sector according to the tail index TIX. After the new data mapping set is loaded on the selected sector, the controller 160 updates the reverse-order table and the sequential-order table according to the head index, the content of the reverse-order table and the content of the sequential-order table SE_TB.

FIGS. 10A-10F is a flowchart of a data maintenance method in accordance with some embodiments. The data maintenance method of FIG. 10 is applied to the data storage device 140 of FIG. 1. The process starts at step S1000.

In step S1000, the controller 160 receives a read command or a write command. The read command/the write command is arranged to read/write a specific page of the flash memory 180. The read command/the write command can be received from the host 120 or produced by the controller 160 for data maintenance.

Next, in step S1002, the controller 160 obtains a first data mapping set of a first mapping relationship according to the read command or the write command received in step S1000. For example, the mapping relationship of the logical address and the physical address of the page indicated by the read command or the write command is stored in the data mapping set TS_2, and the controller 160 obtains the corresponding data mapping set TS_2 of the specific page according to the received read command or the received write command.

Next, in step S1004, the controller 160 determines whether the first data mapping set is loaded on the cache area CA according to whether the cache-area mapping table SMR_TB has a first set index corresponding to the first data mapping set. When the first data mapping set is not loaded on the cache area CA, the process goes to step S1006, otherwise, the process goes to step S1060 to perform an update process.

In step S1006, the controller 160 determines whether any of the sectors of the cache area CA is available. It should be noted that, in this embodiment, the available sector is the sector that isn't written by the data mapping set in the cache area CA. When the cache area CA has at least one available sector, the process goes to step S1008 to perform a loading process, otherwise, the process goes to step S1030 to perform a replace process.

In step S1008, the controller 160 retrieves the first data mapping set of the data mapping table TB1 from the flash memory 180 to load the first data mapping set on the first sector that is available. For example, as shown in FIG. 3, all of the sectors S_0~S_N of the cache area CA are available, the controller 160 selects an available sector. In one embodiment, the controller 160 selects an available sector from the bottom of the cache area CA, so the controller 160 selects the sector S_N. Next, the controller 160 retrieves the data mapping set TS_2 from the data mapping table TB1 of the flash memory 180, and loads the data mapping set TS_2 on the selected sector S_N. In another embodiment, as shown in FIG. 4, the sectors S_0~S_N−1 of the cache area CA are available, and the controller 160 selects the available sector from the bottom of the cache area CA. Therefore, the controller 160 selects the sector S_N−1, but it is not limited thereto. Next, the controller 160 retrieves the data mapping set TS_8 from the data mapping table TB1 of the flash memory 180 to load the data mapping set TS_8 on the selected sector S_N−1.

Next, in step S1010, the controller 160 writes the first set index corresponding to the first data mapping set into the sector-mapping column of the first sector corresponding to the cache-area mapping table SMR_TB. For example, in the embodiment of FIG. 4, the controller 160 writes the data mapping set TS_2 corresponding to the set index 0xAA into the selected sector S_N. Therefore, the controller 160 writes the set index 0xAA of the data mapping set TS_2 into the sector-mapping column SMR_N corresponding to the sector S_N in step S1010. In the embodiment of FIG. 5, the controller 160 writes the data mapping set TS_8 corresponding to the set index 0xBB into the sector S_N−1. Therefore, the controller 160 writes the set index 0xBB of the data mapping set TS_8 into the sector-mapping column SMR_N−1 corresponding to the sector S_N−1 in step S1010.

Next, in step S1012, the controller 160 determines whether the first sector is the earliest one that is loaded by the data mapping set in the cache area CA. Namely, the controller 160 determines whether the other sectors, except for the first sector of the cache area CA, are empty. When the first sector is the earliest one that is loaded by the data mapping set in the cache area CA, the process goes to step S1014, otherwise, the process goes to step S101. It should be noted that the controller 160 can further determine whether the first sector is the earliest one loaded by the data mapping set in the cache area CA in step S1006.

In step S1014, the controller 160 defines a head index HIX and a tail index TIX as the first common index of the first sector. For example, in the embodiment of FIG. 4, the data mapping set TS_2 is the first one written in the cache area CA, wherein the data mapping set TS_2 is loaded in the sector S_N. Therefore, in step S1014, the controller 160 defines both the head index HIX and the tail index TIX as the common index CIX_N of the sector S_N. Next, the process goes to step S1090.

In step S1018, the controller 160 obtains a second sector that contains the data mapping set that was read last from the cache area CA according to the head index HIX. It should be noted that, in this embodiment, the data mapping set that was read last from the cache area CA is equal to the data mapping set corresponding to the last received read command or write command.

Next, in step S1020, the controller 160 writes the common index of a second sequential-order column corresponding to the second sector in the sequential-order table SE_TB into the first sequential-order column corresponding to the first sector. For example, in the embodiment of FIG. 5, the data mapping set TS_8 is not the first one that was written into the cache area CA, wherein the data mapping set TS_8 is written into the sector S_N−1 (the first sector). Before updating the random access memory 166, the controller 160 obtains a sector S_N (the second sector) including the data mapping set TS_2 that was read last from the cache area CA according to the current head index HIX (as shown in FIG. 4) in step S1018. Next, in step S1020, the controller 160 writes the common index CIX_N of the sequential-order column SE_N (the second sequential-order column) corresponding to the sector S_N (the second sector) into the sequential-order column SE_N−1 (the first sequential-order column) corresponding to the current sector S_N−1 (the first sector).

Next, in step S1022, the controller 160 writes the common index of the first reverse-order column corresponding to the first sector in the reverse-order table RSE_TB into a reverse-order column corresponding to the second sector. For example, based on the embodiment of FIG. 5, the controller 160 writes the common index CIX_N−1 of the reverse-order column RSE_N−1 (the first reverse-order column) corresponding to the current sector S_N−1 (the first sector) into the reverse-order column RSE_N corresponding to the sector S_N (the second sector) in step S1022.

Next, in step S1024, the controller 160 defines the head index HIX as a first common index of the first sector. For example, based on the embodiment of FIG. 5, the controller 160 defines the head index HIX as the common index CIX_N−1 (the first common index) of the current sector S_N−1 (the first sector), and keeps the common index CIX_N (the second common index) as the tail index TIX in step S1024. Next, the process goes to step S1090.

In step S1030, the controller 160 locates a third sector having the data mapping set that had gone the longest time without having been read from the cache area CA according to the tail index TIX. It should be noted that, in this embodiment, the data mapping set that went the longest time without being read from the cache area CA is the data mapping set read by the controller 160 in response to the last read command/write command in the current cache area CA.

Next, in step S1032, the controller 160 writes the first data mapping set into the third sector. For example, in the embodiment of FIG. 8, the mapping relationship of the pages indicated by the read command/the write command is included in the data mapping set TS_77 (the first data mapping set). The controller 160 determines that the set index 0x333 of the data mapping set TS_77 is not in the cache-area mapping table SMR_TB in step S1004, and the controller 160 determines that none of the sectors of the cache area CA is available in step S1006. Therefore, in step S1030, the controller 160 determines that the data mapping set TS_2 has gone the longest time without having been read from the cache area CA according to the tail index TIX in the table of FIG. 7A before updating, and the sector corresponding to the data mapping set TS_2 is the sector S_N (the third sector). Therefore, in step S1032, the controller 160 retrieves the data mapping set TS_77 (the first data mapping set) from the data mapping table TB1 stored in the flash memory 180 to load the data mapping set TS_77 into the obtained sector S_N (the third sector) for replacing the data mapping set TS_2 that hasn't been read for a long time.

Next, in step S1034, the controller 160 writes the first set index of the first data mapping set into the sector-mapping column corresponding to the third sector in the cache-area mapping table SMR_TB. Based on the embodiment of FIG. 8, the controller 160 writes the set index 0x333 (first set index) corresponding to the data mapping set TS_77 (the first data mapping set) into the sector-mapping column SMR_N corresponding to the sector S_N (the third sector) in the cache-area mapping table SMR_TB in step S1034.

Next, in step S1036, the controller 160 obtains a fourth sector having the data mapping set that was read last from the cache area CA according to the head index HIX.

Next, in step S1038, the controller 160 writes the common index of a fourth sequential-order column corresponding to the fourth sector in the sequential-order table SE_TB into a third sequential-order column corresponding to the third sector in the sequential-order table SE_TB. For example, in the embodiment of FIG. 8, the controller 160 obtains the sector S_2 (the fourth sector) having the data mapping set TS_0 that was read last from the cache area CA according to the head index HIX before updating the tables of FIG. 7A in step S1036. Next, in step S1038, the controller 160 writes the common index CIX_2 of the sequential-order column SE_2 (the fourth sequential-order column) corresponding to the sector S_2 (the fourth sector) into the sequential-order column SE_N (the third sequential-order column) corresponding to the current sector S_N (the third sector).

Next, in step S1040, the controller 160 writes the common index of a third reverse-order column corresponding to the third sector in the reverse-order table RSE_TB into a fourth reverse-order column of the fourth sector corresponding to the reverse-order table RSE_TB. For example, based on the embodiment of FIG. 8, the controller 160 writes the common index CIX_N of the reverse-order column RSE_N (the third reverse-order column) corresponding to the current sector S_N (the third sector) into the reverse-order column RSE_2 (the fourth reverse-order column) corresponding to the sector S_2 (the fourth sector).

Next, in step S1042, the controller 160 reads the third reverse-order column to obtain the common index of a fifth reverse-order column of the reverse-order columns RSE_0~RSE_N. Namely, the controller 160 reads the third reverse-order column corresponding to the current sector (the third sector) to obtain a fifth sector that was read subsequent to the current sector (the third sector).

Next, in step S1044, the controller 160 defines the tail index TIX as a fifth common index of the fifth reverse-order column and defines the head index HIX as a third common index of the third sequential-order column. For example, based on the embodiment of FIG. 8, the controller 160 reads the reverse-order column RSE_N (the third reverse-order column) corresponding to the current sector S_N (the third sector) to obtain the common index CIX_N−1 (the common index of the fifth reverse-order column) of the sector S_N−1 that was read subsequent to the current sector S_N (the third sector) in step S1044. Next, the controller 160 defines the head index HIX as the common index CIX_N of the current sector S_N (the third sector), and defines the tail index TIX as the common index CIX_N−1 (the fifth common index) of the sector S_N−1 (the fifth sector) that was read subsequent to the current sector S_N.

Next, in step S1046, the controller 160 writes a specific value into the third reverse-order column and a fifth sequential-order column corresponding to the fifth common index. Namely, the controller 160 writes the specific value into the reverse-order column corresponding to the common index pointed the current head index, and writes the specific value into the sequential-order column corresponding to the common index pointed to by the tail index. As shown in FIG. 8, the controller 160 writes the specific value into the reverse-order column RSE_N corresponding to the current sector S_N (the third sector) and the sequential-order column SE_N−1 (the fifth sequential-order column) corresponding to the common index CIX_N−1 (the common index of the fifth reverse-order column). Next, the process goes to step S1090.

In step S1060, the controller 160 reads a sixth reverse-order column corresponding to a sixth sector having the first data mapping set to obtain the seventh sector that was read subsequent to the first data mapping set. Namely, the controller 160 reads a sixth reverse-order column corresponding to a sixth sector in a reverse-order table RSE_TB to obtain a seventh sector that was read subsequent to the sixth sector. For example, in the embodiment of FIG. 7A, a mapping relationship of the pages indicated by the read command or the write command is included in the data mapping set TS_0. As shown in FIG. 6 before updating the tables, the set index 0x5 of the data mapping set TS_0 is in the sector-mapping column SMR_2 of the cache-area mapping table SMR_TB. Therefore, the controller 160 determines that the data mapping set TS_0 is loaded on the cache area CA when the set index 0x5 of the data mapping set TS_0 is in the cache-area mapping table SMR_TB in step S1004. Next, in step S1060, the controller 160 reads the reverse-order column RSE_2 (the sixth reverse-order column) corresponding to the sector S_2 (sixth sector) in the reverse-order table RSE_TB according to the common index CIX_2 of the current sector S_2 (the sixth sector), and finds out that the sector S_1 was read subsequent to the current sector S_2 (the sixth sector) according to the common index CIX_1 stored in the reverse-order column RSE_2 (the sixth reverse-order column). In the embodiment of FIG. 7B, a mapping relationship of the pages indicated by the read command or the write command is included in the data mapping set TS_2. As shown in FIG. 6 before updating the table, the set index 0xAA of the data mapping set TS_2 is in the sector-mapping column SMR_N of the cache-area mapping table SMR_TB. Therefore, the controller 160 determines that the data mapping set TS_2 is in the cache area CA when the set index 0xAA corresponding to the data mapping set TS_N is in the cache-area mapping table SMR_TB in step S1004. Next, in step S1060, the controller 160 reads the reverse-order column RSE_N (the sixth reverse-order column) corresponding to the current sector S_N (the sixth sector) in the reverse-order table RSE_TB according to the common index CIX_N of the current sector S_N (sixth sector), and finds out that the sector S_N−1 was read subsequent to the current sector S_N (the sixth sector) according to the common index CIX_N−1 stored in the reverse-order column RSE_N (the sixth reverse-order column).

Next, in step S1062, the controller 160 writes the common index stored in a sixth sequential-order column corresponding to the sixth sector into a seventh sequential-order column corresponding to the seventh sector in the sequential-order table SE_TB. For example, in the embodiment of FIG. 7A, the controller 160 obtains that the sector read subsequent to the current sector S_2 (the sixth sector) is the sector S_1 (the seventh sector) in step S1060. Therefore, in step S1062, the controller 160 writes the common index CIX_3 stored in the sequential-order column SE_2 (the sixth sequential-order column) corresponding to the current sector S_2 (the sixth sector) into the sequential-order column SE_1 (the seventh sequential-order column) corresponding to the sector S_1 (the seventh sector). Namely, the controller 160 made the original sequential-order column SE_1 (the seventh sequential-order column) pointing to the sequential-order column SE_2 (the sixth sequential-order column) re-point to the sequential-order column SE_3 corresponding to the sector S_3 that is read prior to the first data mapping set. In the embodiment of FIG. 7B, the controller 160 obtains that the sector that was read subsequent to the current sector S_N (the sixth sector) is the sector S_N−1 (the seventh sector) in step S1060. Therefore, in step S1062, the controller 160 writes the value stored in the sequential-order column SE_N (the sixth sequential-order column) corresponding to the current sector S_N (the sixth sector) into the sequential-order column SE_N−1 (the seventh sequential-order column) corresponding to the sector S_N−1 (the seventh sector).

Next, in step S1064, the controller 160 obtains an eighth sector including the data mapping set that was read last from the cache area CA according to the head index HIX.

Next, in step S1065, the controller 160 determines whether the data mapping set stored in the sixth sector has gone the longest time without having been read from the cache area CA according to the tail index TIX. When the data mapping set stored in the sixth sector has gone the longest time without having been read from the cache area CA according to the tail index TIX, the process goes to step S1080, otherwise, the process goes to step S1066. Namely, the controller 160 determines whether the current data mapping set that is required to be read is the one that has gone the longest time without having been read in the cache area CA.

In step S1066, the controller 160 reads the sixth sequential-order column corresponding to the sixth sector to obtain a ninth common index of a ninth sector that is written prior to the sixth sector. In the embodiment of FIG. 7A, the controller 160 determines that the data mapping set TS_0 stored in the current sector S_2 (the sixth sector) is not the data mapping set that has gone the longest time without having been read in the cache area CA according to the tail index TIX in step S1065. Next, in step S1066, the controller 160 reads the sequential-order column SE_2 (the sixth sequential-order column) corresponding to the current sector S_2 (the sixth sector) to obtain that the sector S_3 (ninth sector) is the sector that was written prior to the sector S_2 (the sixth sector).

Next, in step S1068, the controller 160 writes the common index stored in the sixth reverse-order column into a ninth reverse-order column corresponding to the ninth common index. For example, in the embodiment of FIG. 7A, the controller 160 writes the common index CIX_1 stored in the reverse-order column RSE_2 (the sixth reverse-order column) corresponding to the current sector S_2 (the sixth sector) into the reverse-order column RSE_3 (the ninth reverse-order column) corresponding to the sector S_3 (the ninth sector) in step S1068.

Next, in step S1070, the controller 160 writes the common index of an eighth sequential-order column corresponding to the eighth sector in the sequential-order table SE_TB into the sixth sequential-order column corresponding to the sixth sector in the sequential-order column SE_0~SE_N. For example, in the embodiment of FIG. 7A, the controller 160 obtains a sector S_0 (the eighth sector) including the data mapping set TS_1 that was read last from the cache area CA according to the head index HIX of FIG. 6, and writes the common index CIX_0 of the sequential-order column SE_0 (the eighth sequential-order column) corresponding to the sector S_0 (the eighth sector) into the sequential-order column SE_2 (the sixth sequential-order column) corresponding to the current sector S_2 (the sixth sector) in step S1064.

Next, in step S1072, the controller 160 writes the common index of the sixth reverse-order column corresponding to the sixth sector of the reverse-order table RSE_TB into an eighth reverse-order column of the eighth sector that was read last in the reverse-order table RSE_TB. For example, in the embodiment of FIG. 7A, the controller 160 writes the common index CIX_2 of the reverse-order column RSE_2 (the sixth reverse-order column) corresponding to the current sector S_2 (the sixth sector) into the reverse-order column RSE_0 (the eighth reverse-order column) corresponding to the sector S_0 (the eighth sector) in step S1072.

Next, in step S1074, the controller 160 defines the head index HIX as a sixth common index of the sixth sequential-order column. For example, in the embodiment of FIG. 7A, the controller 160 defines the head index HIX as the common index CIX_2 of the current sector S_2, and keeps the tail index TIX as the common index CIX_N in step S1074.

Next, in step S1076, the controller 160 writes a specific value into the sixth reverse-order column. For example, in the embodiment of FIG. 7A, the controller 160 writes a specific value into the reverse-order column RSE_2 (the sixth reverse-order column) corresponding to the current sector S_2 (the sixth sector) in step S1076. Next, the process goes to step S1090.

In step S1080, the controller 160 writes the common index of an eighth sequential-order column corresponding to the eighth sector into the sixth sequential-order column corresponding to the sixth sector in the sequential-order table SE_TB. In the embodiment of FIG. 7B, the controller 160 determines that the data mapping set TS_2 stored in the sector S_N (the sixth sector) is not the data mapping set that has gone the longest time without having been read of the cache area CA according to the tail index TIX in step S1065. Next, in step S1080, the controller 160 reads the sequential-order column SE_2 (the sixth sequential-order column) corresponding to the current sector S_2 (the sixth sector) to obtain the sector S_3 (the ninth sector) that is read prior to the current sector S_2 (the sixth sector).

Next, in step S1082, the controller 160 writes the common index of the sixth reverse-order column corresponding to the sixth sector in the reverse-order table RSE_TB into an eighth reverse-order column of the eighth sector that was read last in the reverse-order table RSE_TB. For example, in the embodiment of FIG. 7B, the controller 160 has obtained that the last read sector is the sector S_0 (the eighth sector) in step S1064. Therefore, the controller 160 writes the common index CIX_N of the reverse-order column RSE_N (the sixth reverse-order column) corresponding to the current sector S_N (the sixth sector) into the reverse-order column RSE_0 (the eighth reverse-order column) corresponding to the sector S_0 (the eighth sector) in step S1082.

Next, in step S1084, the controller 160 defines the head index HIX as a sixth common index of the sixth sequential-order column, and defines the tail index TIX as a seventh common index of the seventh sector. For example, in the embodiment of FIG. 7B, the controller 160 defines the head index HIX as the common index CIX_2 of the current sector S_2 (the sixth sector), and keeps the tail index TIX as the common index CIX_N, in step S1084.

Next, in step S1086, the controller 160 writes a specific value into the sixth reverse-order column. Namely, the controller 160 writes the specific value into the reverse-order column RSE_N corresponding to the common index CIX_N pointed to by the head index. Next, the process goes to step S1090.

In step S1090, the controller 160 reads the first data mapping set from the cache area CA to perform the write command or the read command received in step S1000. The process ends at step S1090.

It should be noted that reading and writing a file stored in the flash memory 180 causes the corresponding data mapping sets to be repeatedly read. Namely, the data mapping set which is not related to reading or writing commands will only be read once. In view of this, the present invention provides another embodiment to maintain the data mapping sets by two separate systems based on the frequency of reading of the data mapping sets, wherein any of the data mapping sets in the cache area CA that has been read less than a predetermined number of times is defined as an infrequent data mapping set, and any of the data mapping sets in the cache area CA that has been read more than the predetermined number of times is defined as a frequent data mapping set. In one embodiment, the predetermined number of times is 1, but it is not limited thereto. In other embodiments, the predetermined number of times can be 2, 3, 4, 5, 6, 7 or 8, wherein the developer may design the predetermined number of times according to read/write operation of different situations.

Figure 11:
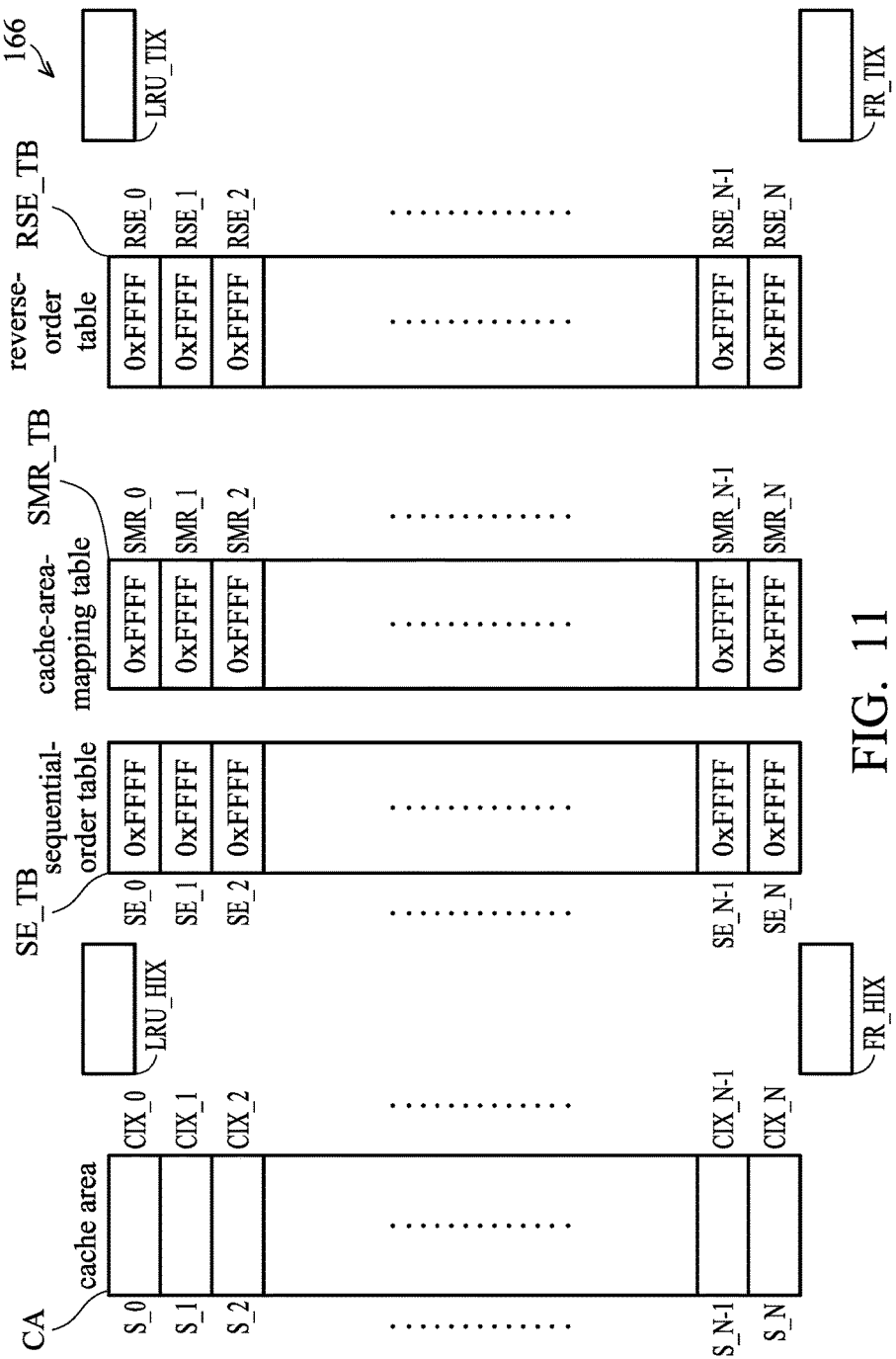
FIGS. 11~20 are a schematic diagram illustrating tables of a random access memory, in accordance with embodiments.

FIG. 11 is a schematic diagram illustrating tables of a random access memory, in accordance with another embodiment. As shown in FIG. 11, after the data storage device 140 is powered on, the controller 160 builds a cache-area-mapping table SMR_TB, a reverse-order table RSE_TB and a sequential-order table SE_TB which are empty in the random access memory 166 to record the data status of the cache area CA.

The cache area CA has a plurality of sectors S_0~S_N arranged to load a part of data mapping sets of the data mapping table TB1, wherein each of the sectors is arranged to store a data mapping set. Namely, the number of sectors S_0~S_N is less than the number of data mapping sets TS_0~TS_M, that is N<M.

The cache-area-mapping table SMR_TB has a plurality of sector-mapping columns SMR_0~SMR_N arranged to record the set indexes of the data mapping sets which are stored in the cache area CA, wherein each of the sector-mapping columns SMR_0~SMR_N of the cache-area-mapping table SMR_TB corresponds sequentially to the sectors S_0~S_N of the cache area CA. It should be noted that the default value of the sector-mapping columns SMR_0~SMR_N of the cache-area-mapping table SMR_TB is a specific value. In this embodiment, the specific value is "0xFFFF", but it is not limited thereto. Moreover, the set indexes of the data mapping sets TS_0~TS_M are not equal to the specific value.

The sequential-order table SE_TB is arranged to record the order in which the frequent data mapping sets are read from the cache area CA and the order in which the infrequent data mapping sets are read from the cache area CA, wherein the sequential-order table SE_TB has a plurality of sequential-order columns SE_0~SE_N, and each of the sequential-order columns SE_0~SE_N correspond sequentially to the sector S_0~S_N of the cache area CA. It should be noted that, in this embodiment, the sequential-order columns SE_0~SE_N of the sequential-order table SE_TB can record two kinds of order (the order in which the frequent data mapping sets are read from the cache area CA and the order in which the infrequent data mapping sets are read from the cache area CA). More specifically, any of the sequential-order columns SE_0~SE_N that corresponds to the same common index as the sector having the frequent data mapping set is defined as a frequent-sequential-order column, and any of the sequential-order columns SE_0~SE_N that corresponds to the same common index as the sector having the infrequent data mapping set is defined as an infrequent-sequential-order column. Namely, the definition of the sequential-order columns are dynamically changed based on the type of the data mapping set (frequent or infrequent) stored in the corresponding sector. Each of the frequent-sequential-order columns is arranged to store a common index of another frequent-sequential-order column, and the common index in the frequent-sequential-order column is arranged to point to another frequent-sequential-order column corresponding to the sector of the frequent data mapping set which is read prior to the sector corresponding to the original frequent-sequential-order column having the common index. Each of the infrequent-sequential-order columns is arranged to store a common index of another infrequent-sequential-order column, the infrequent-sequential-order column points to another infrequent-sequential-order column corresponding to the sector of the infrequent data mapping set that is read prior to the sector corresponding to the original infrequent-sequential-order column having the common index. It should be noted that the default value of the sequential-order columns SE_0~SE_N of the sequential-order table SE_TB is a specific value. In this embodiment, the specific value is "0xFFFF", but it is not limited thereto.

The reverse-order table RSE_TB is arranged to record the opposite order in which the frequent data mapping sets are read from the cache area cache area CA and the opposite order in which the infrequent data mapping set is read from the cache area CA, wherein the reverse-order table RSE_TB has a plurality of reverse-order columns RSE_0~RSE_N, each of the reverse-order columns RSE_0~RSE_N corresponds sequentially to the sectors S_0~S_N of the cache area CA. It should be noted that, in this embodiment, the reverse-order columns RSE_0~RSE_N of the reverse-order table RSE_TB can record two kinds of order (the opposite order in which the frequent data mapping sets are read from the cache area CA and the opposite order in which the infrequent data mapping sets are read from the cache area CA). More specifically, any of the reverse-order-columns RSE_0~RSE_N that corresponds to the same common index as the sector having the frequent data mapping set is defined as a frequent-reverse-order column, and any of the reverse-order-columns RSE_0~RSE_N that corresponds to the same common index as the sector having the infrequent data mapping set is defined as an infrequent-reverse-order column. Namely, the definition of the reverse-order columns RSE_0~RSE_N are dynamically changed based on the type of the data mapping set (frequent or infrequent) stored in the corresponding sectors. Each of the frequent-reverse-order columns RSE_0~RSE_N is arranged to store the common index of another frequent-reverse-order column, and the common index in the frequent-reverse-order column points to another frequent-reverse-order column corresponding to the sector of the frequent data mapping set that was read subsequent to the sector corresponding to the original frequent-reverse-order column having the common index. Each of the infrequent-reverse-order columns RSE_0~RSE_N is arranged to store the common index of another infrequent-reverse-order column, and the common index in the infrequent-reverse-order column points to another infrequent-reverse-order column corresponding to the sector of the infrequent data mapping set which was read subsequent to the sector corresponding to the infrequent-reverse-order column having the common index. It should be noted that the default value of the reverse-order columns RSE_0~RSE_N of the reverse-order table RSE_TB is a specific value. In this embodiment the specific value is "0xFFFF", but it is not limited thereto.

It should be noted that, in one embodiment, the sectors S_0~S_N correspond sequentially to a plurality of common indexes common index CIX_0~CIX_N. The sector-mapping columns SMR_0~SMR_N and the corresponding sectors S_0~S_N have the same common indexes CIX_0~CIX_N. The sequential-order column SE_0~SE_N and the corresponding sectors S_0~S_N also have the same common indexes CIX_0~CIX_N. The reverse-order columns RSE_0~RSE_N and the corresponding sectors S_0~S_N have the same common indexes CIX_0~CIX_N. More specifically, the sector S_0, the sequential-order column SE_0, the sector-mapping column SMR_0 and the reverse-order column RSE_0 have the same common index CIX_0. The sector S_1, the sequential-order column SE_1, the sector-mapping column SMR_1 and the reverse-order column RSE_1 have the same common index CIX_1. The sector S_2, the sequential-order column SE_2, the sector-mapping column SMR_2 and the reverse-order column RSE_2 have the same common index CIX_2, and so on. It should be noted that the common indexes CIX_0~CIX_N are not equal to the specific value. In one embodiment, the common indexes CIX_0~CIX_N sequentially are 0x0, 0x1, 0x2, 0x3, etc. (Hexadecimal), but it is not limited thereto.

As described above, the controller 160 builds the cache-area-mapping table SMR_TB to record the set indexes of the data mapping sets in the cache area CA. The controller 160 builds the reverse-order table RSE_TB to record the opposite order in which the frequent data mapping sets are read from the cache area CA and the opposite order in which the infrequent data mapping set is read from the cache area CA. The controller 160 builds the sequential-order table SE_TB to record the order in which the frequent data mapping sets are read from the cache area CA and the order in which the infrequent data mapping set is read from the cache area CA. In one embodiment, the controller 160 is further arranged to set up an infrequent index set and a frequent index set in the random access memory 166, wherein the infrequent index set is arranged to maintain the infrequent data mapping sets, and the frequent index set is arranged to maintain the frequent data mapping sets. In one embodiment, the infrequent index set is constituted by an infrequent head index LRU_HIX and an infrequent tail index LRU_TIX, and the frequent index set is constituted by a frequent head index FR_HIX and a frequent tail index FR_TIX. In other embodiments, the infrequent head index LRU_HIX, the infrequent tail index LRU_TIX, the frequent head index FR_HIX and the frequent tail index FR_TIX can also be built in other memories or circuits, but it is not limited thereto. The infrequent head indexes LRU_HIX stores the common index of the sector having the infrequent data mapping set that was read last from the cache area CA for pointing to the infrequent data mapping set that was read last from the cache area CA. The infrequent tail index LRU_TIX stores the common index of the sector having the infrequent data mapping set that has gone the longest time without having been read for pointing to the infrequent data mapping set that has gone the longest time without having been read in the cache area CA. The frequent head index FR_HIX stores the common index of the sector having the frequent data mapping set that was read last for pointing to the frequent data mapping set that was read last from the cache area CA. The frequent tail index FR_TIX stores the common index of the sector having the frequent data mapping set that has gone the longest time without having been read for pointing to the frequent data mapping set that has gone the longest time without having been read in the cache area CA. It should be noted that the sector, the sequential-order column, the sector-mapping column and the reverse-order column which are corresponding to each others have the same common index, such that the infrequent head index LRU_HIX, the infrequent tail index LRU_TIX, the frequent head index FR_HIX and the frequent tail index FR_TIX can also point to the corresponding sequential-order column, the corresponding sector-mapping column and the corresponding reverse-order column. It should be noted that, in one embodiment, the default value of the infrequent head index LRU_HIX and the infrequent tail index LRU_TIX can be the common index CIX_N, and the default value of the frequent head index FR_HIX and the default value of the frequent tail index FR_TIX can be a specific value, wherein the specific value is different from the common indexes CIX_0~CIX_N. In another embodiment, the default values of the infrequent head index LRU_HIX, the infrequent tail index LRU_TIX, the frequent head index FR_HIX and the frequent tail index FR_TIX are a specific value, and the specific value is different from the common indexes CIX_0~CIX_N.

In this embodiment, when any of the data mapping sets TS_0~TS_M is loaded on the cache area CA, the loaded data mapping set is defined as an infrequent data mapping set at first, until another command enables the controller 160 to read the infrequent data mapping set loaded on the cache area CA, the read infrequent data mapping set will be re-defined as a frequent data mapping set. Moreover, the controller 160 can select one of the sectors S_0~S_N from the cache area CA according to the infrequent tail index LRU_TIX. More specifically, the controller 160 may select the infrequent data mapping set that has gone the longest time without having been read in the cache area CA according to the infrequent tail index LRU_TIX to load a new data mapping set on the sector having the selected infrequent data mapping set. When all of the data mapping sets in the cache area CA are defined as the frequent data mapping sets and the controller 160 needs to load a new data mapping set on the cache area CA, it represents that the controller 160 starts to read another file rather than the current file. Therefore, when the infrequent tail index LRU_TIX does not point to any common index, the controller 160 transforms the frequent index set to be the infrequent index set, and removes the value in the frequent index set.

More specifically, when the cache-area-mapping table SMR_TB does not include a first set index of a first data mapping set that the controller 160 needs, the controller 160 determines whether any of the sectors S_0~S_N in the cache area CA is available (empty). When the controller 160 determines that a first sector of the sector S_0~S_N in the cache area CA is available, the controller 160 reads the first data mapping set of the data mapping table TB1 from the flash memory 180, and loads the first data mapping set on the first sector. When the controller 160 determines that none of the sectors S_0~S_N in the cache area CA is available, the controller 160 determines whether the infrequent tail index LRU_TIX is equal to any of the common indexes. When the infrequent tail index LRU_TIX is equal to one of the common indexes, the controller 160 determines which of the infrequent data mapping sets is the one that has gone the longest time without having been read according to the infrequent tail index LRU_TIX to write the first data mapping set into the sector having the infrequent data mapping set that has gone the longest time without having been read. When the infrequent tail index LRU_TIX is not equal to any of the common indexes, the controller 160 writes the common index stored in the frequent tail index FR_TIX into the infrequent tail index LRU_TIX, writes the common index stored in the frequent head index FR_HIX into the infrequent head index LRU_HIX, and deletes the common indexes in the frequent tail index FR_TIX and the infrequent tail index LRU_TIX. In another embodiment, after writing the common index stored in the frequent head index FR_HIX into the infrequent head index LRU_HIX, the controller 160 writes the specific value which is different from the common indexes into the frequent tail index FR_TIX and the infrequent tail index LRU_TIX. Furthermore, the controller 160 updates the sequential-order table SE_TB and the reverse-order table RSE_TB according to the infrequent index set and the frequent index set.

Figure 12:
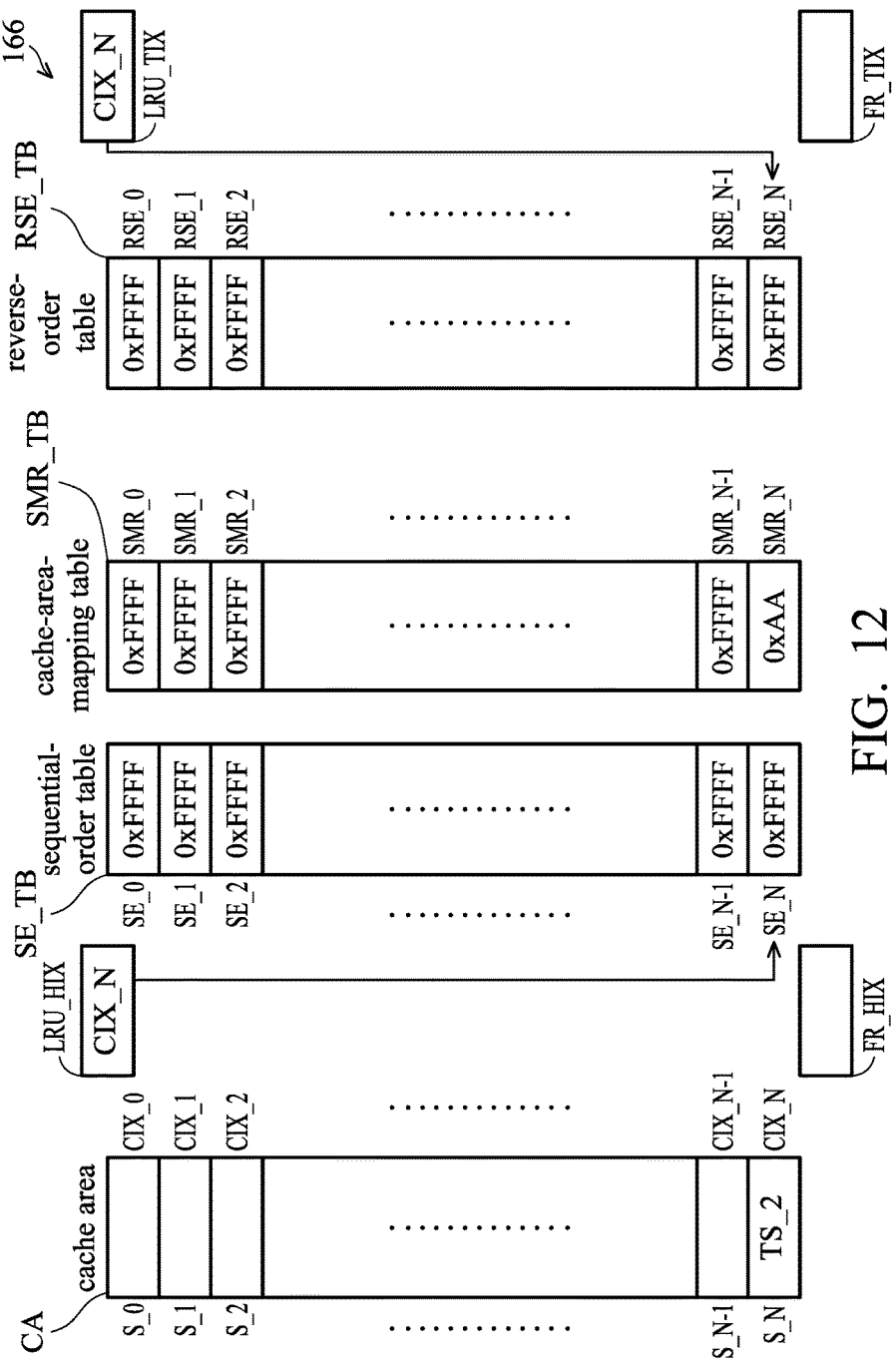

In the embodiment of the default state shown in FIG. 11, when the controller 160 receives a read command or a write command, the controller 160 obtains a first data mapping set of a first mapping relationship indicated by the read command or the write command according to the received read command or the received write command. For example, when the mapping relationship of the logical address and the physical address corresponding to the page indicated by the read command or the write command is stored in the data mapping set TS_2, the controller 160 may obtain the target page from the read command or the write command and obtain the data mapping set TS_2 corresponding to the page. Next, the controller 160 determines whether the data mapping set TS_2 is loaded on the cache area CA according to whether the cache-area-mapping table SMR_TB has the set index corresponding to the first data mapping set TS_2. For example, the set index of the data mapping set TS_2 is "0xAA" as shown in FIG. 4. As shown in FIG. 11, when none of the data mapping sets is written in the cache area CA, the value of all of the sector-mapping columns SMR_0~SMR_N in the cache-area-mapping table SMR_TB are 0xFFFF. Therefore, in this embodiment, the controller 160 determines that the set index 0xAA of the data mapping set TS_2 is not in the cache-area-mapping table SMR_TB. Namely, the controller 160 determines that the data mapping set TS_2 is not in the cache area CA, because the set index 0xAA of the data mapping set TS_2 is not in the cachearea-mapping table SMR_TB. Next, similarly to FIG. 4, after determining that the cache area CA has an available sector, the controller 160 selects an available sector S_N and reads the data mapping set TS_2 from the data mapping table TB1 stored in the flash memory 180 to load the data mapping set TS_2 on the selected sector S_N. Next, the controller 160 updates the cache-area-mapping table SMR_TB, the sequential-order table SE_TB, the reverse-order table RSE_TB, the infrequent index set and the frequent index set to record the current state of the cache area CA. As shown in FIG. 12, the controller 160 writes the set index 0xAA of the data mapping set TS_2 into the sector-mapping column SMR_N corresponding to the sector S_N. It should be noted that the data mapping set TS_2 is newly loaded data, such that the data mapping set TS_2 is defined as (belonging to) the infrequent data mapping set. Therefore, the controller 160 also writes the common index CIX_N of the sector S_N into the infrequent head index LRU_HIX and the infrequent tail index LRU_TIX. It should be noted that, in this embodiment, the specific value 0xFFFF is kept in the sequential-order column SE_N of the sequential-order table SE_TB and the reverse-order column RSE_N of the reverse-order table RSE_TB which are corresponding to the sector S_N, and the frequent head index FR_HIX and the frequent tail index FR_TIX are also kept in the original status. Lastly, the controller 160 reads the data mapping set TS_2 from the cache area CA to execute the received write command or the received read command. It should be noted that the sequential-order column SE_N and the reverse-order column RSE_N have the same common index CIX_N as the sector S_N having the infrequent data mapping set TS_2. Therefore, in this embodiment, the sequential-order column SE_N is an infrequent-sequential-order column, and the reverse-order column RSE_N is an infrequent-reverse-order column.

Figure 13:
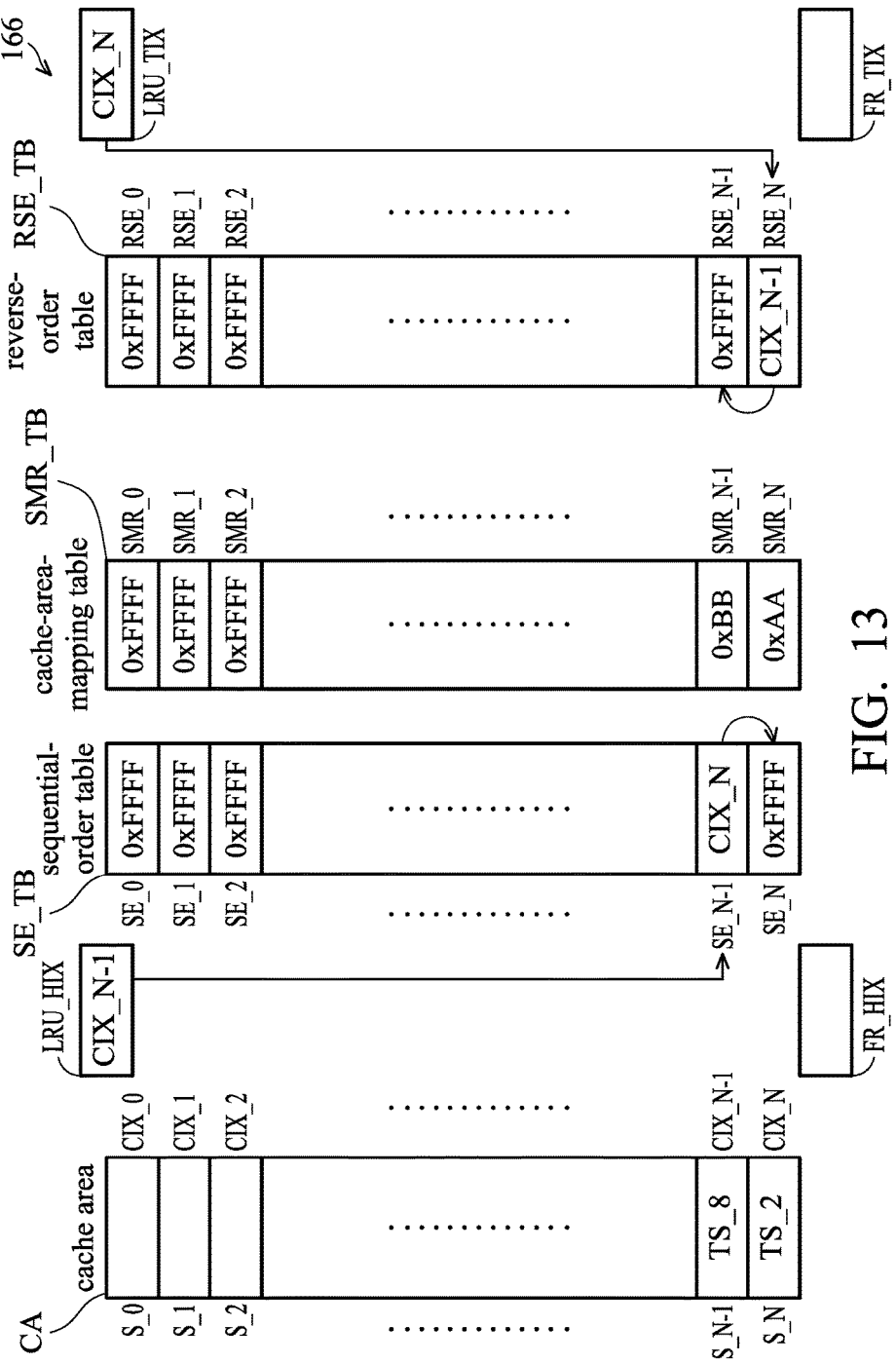

Next, in the embodiment of FIG. 12, when the controller 160 receives a read command or a write command, the controller 160 will obtain a data mapping set of a mapping relationship corresponding to the page indicated by the received read command or the received write command. For example, in this embodiment, the mapping relationship of the page indicated by the read command or the write command is recorded in the data mapping set TS_8. Next, the controller 160 determines whether the data mapping set TS_8 is loaded on the cache area CA according to whether the set index of the data mapping set TS_8 is in the cache-area-mapping table SMR_TB. For example, the set index of the data mapping set TS_8 is 0xBB. As shown in FIG. 12, the cache area CA only has the data mapping set TS_2, the cache-area-mapping table SMR_TB only has 0xAA in the sector-mapping column SMR_N, and the others are 0xFFFF. Similar to the embodiment of FIG. 5, the controller 160 determines that the set index 0xBB of the data mapping set TS_8 is not in the cache-area-mapping table SMR_TB, and selects an available sector S_N−1. Next, the controller 160 reads the data mapping set TS_8 from the data mapping table TB1 stored in the flash memory 180 to load the data mapping set TS_8 on the selected sector S_N−1. Next, the controller 160 updates the cache-area-mapping table SMR_TB, the sequential-order table SE_TB, the reverse-order table RSE_TB, the infrequent index set and the frequent index set to record the current status of the cache area CA. It should be noted that the data mapping set TS_8 is newly loaded data, such that the data mapping set TS_8 is defined as an infrequent data mapping set. Therefore, as shown in FIG. 12, the controller 160 obtains a sector S_N having the infrequent data mapping set TS_2 that was last read from the cache area CA according to the infrequent head index LRU_HIX, and writes the common index CIX_N of the sector S_N corresponding to the sequential-order column SE_N to into the sequential-order column SE_N−1 corresponding to the current sector S_N−1. Next, the controller 160 writes the common index CIX_N−1 of the current sector S_N−1 corresponding to the reverse-order column RSE_N−1 into the reverse-order column RSE_N corresponding to the sector S_N. Next, the controller 160 defines the infrequent head index LRU_HIX as the common index CIX_N−1 of the current sector S_N−1, keeps the infrequent tail index LRU_TIX as the common index CIX_N, and keeps the values of the frequent head index FR_HIX and the frequent tail index FR_TIX. After updating the cache-area-mapping table SMR_TB, the statuses of the sequential-order table SE_TB, the reverse-order table RSE_TB, the infrequent head index LRU_HIX and the infrequent tail index LRU_TIX are shown in FIG. 13. Lastly, the controller 160 reads the data mapping set TS_8 from the cache area CA to execute the received write command and the received read command. It should be noted that the sequential-order column SE_N−1 and the reverse-order column RSE_N−1 have the same common index CIX_N−1 as the sector S_N−1 having the infrequent data mapping set TS_8. Therefore, in this embodiment, the sequential-order column SE_N−1 is defined as an infrequent-sequential-order column, and the reverse-order column RSE_N−1 is defined as an infrequent-reverse-order column.

Figure 14:
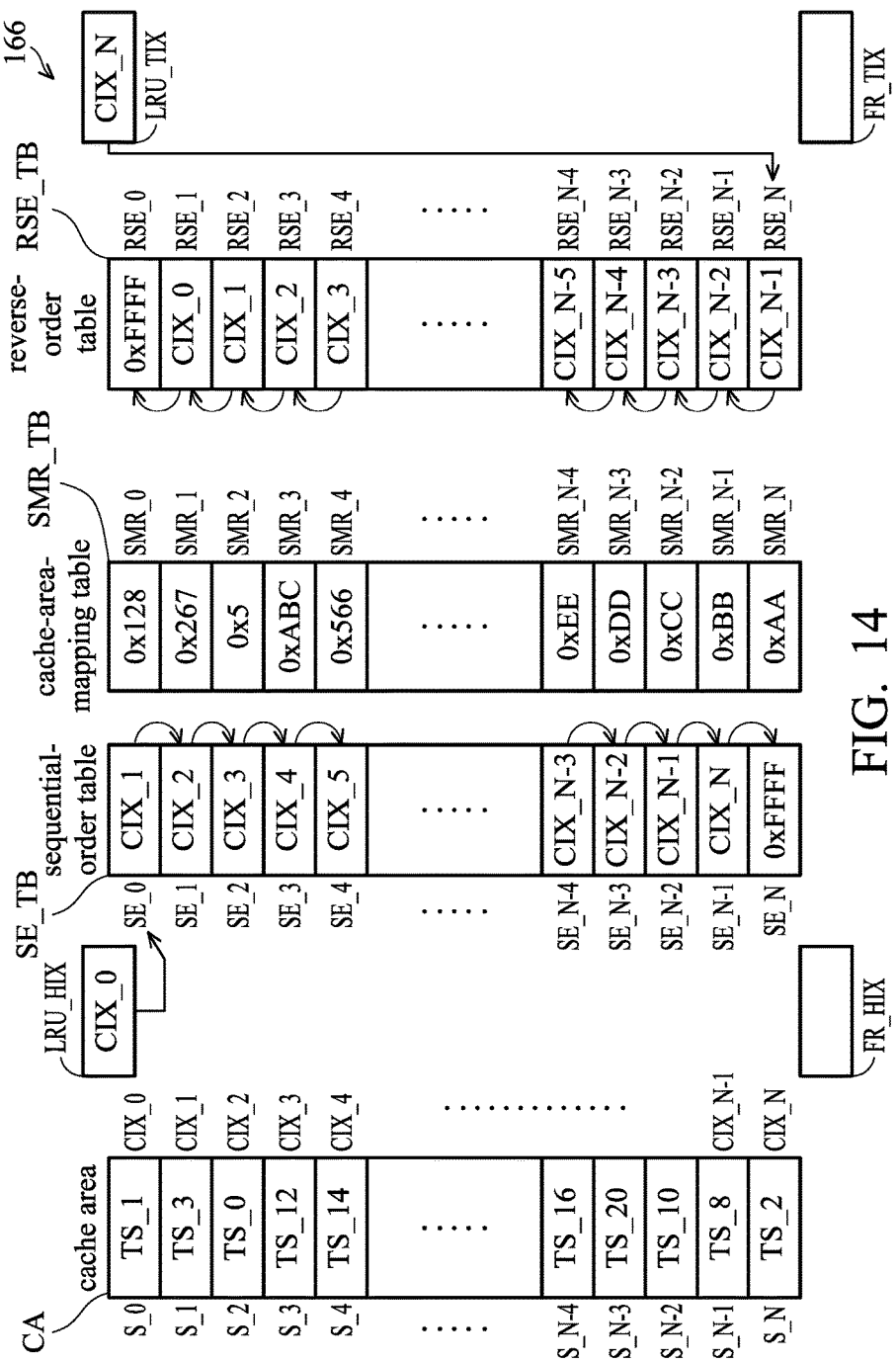

If the controller 160 continuously receives write commands and read commands corresponding to new data mapping sets, the controller 160 will repeat the above steps of transforming FIG. 12 to FIG. 13 to write the data mapping sets into the sectors S_N−2~S_0, as shown in FIG. 14. Namely, the controller 160 repeats loading process to fill the cache area CA. it should be noted that, in this embodiment, the default values of the sequential-order table SE_TB and the reverse-order table RSE_TB are the specific value (0xFFFF), such that the loading process does not need to write the specific value into the reverse-order column corresponding to the current sector and the sequential-order column corresponding to the sector that has gone the longest time without having been read in the cache area CA. In other embodiments, if the value in the sequential-order table SE_TB and the value in the reverse-order table RSE_TB are different from the specific value, the controller 160 has to write the specific value into the reverse-order column corresponding to the current sector and the sequential-order column corresponding to the sector that has gone the longest time without having been read in the cache area CA. It should be noted that, in the above processes, the controller 160 does not receive the command corresponding to the data mapping set that is already loaded on the cache area CA, such that the value of the frequent head index FR_HIX and the frequent tail index FR_TIX stay the same. Moreover, in the embodiment of FIG. 14, all of the sequential-order columns SE_0~SE_N belong to the infrequent-sequential-order column, and all of the reverse-order columns RSE_0~RSE_N belong to the infrequent-reverse-order column. The details of the method of frequent data mapping sets are as follows. Moreover, for the details of the updating process of the infrequent data mapping set, the reader can refer to FIG. 7A~8 after regarding the infrequent head index LRU_HIX as the head index HIX and regarding the infrequent tail index LRU_TIX as the tail index TIX, wherein the value of the frequent head index FR_HIX and the frequent tail index FR_TIX stay the same.

Figure 15:
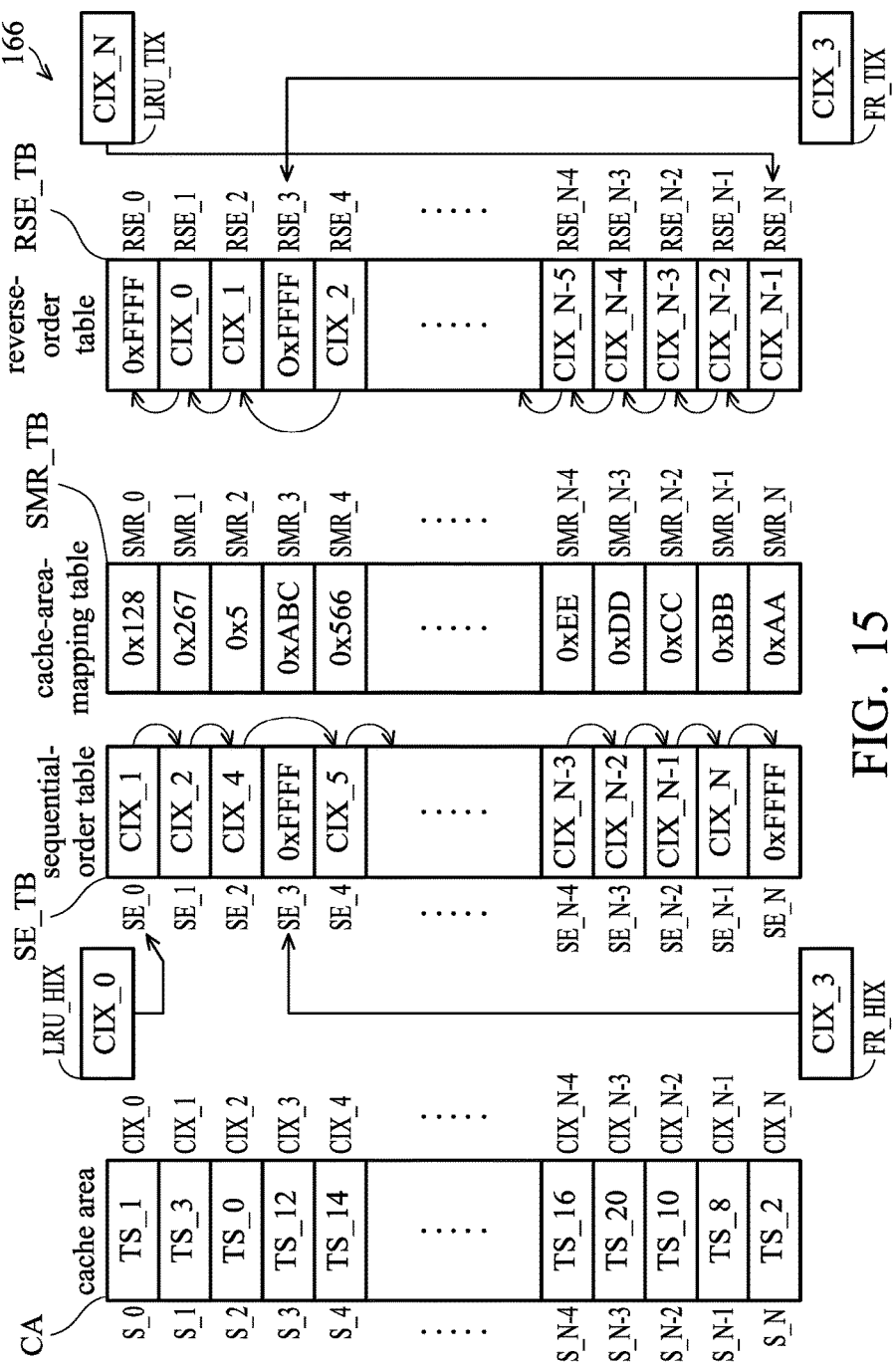

The following are details of the updating process. In the embodiment of FIG. 14, when the controller 160 receives a read command or a write command, the controller 160 obtains a data mapping set of a mapping relationship of the page indicated by the received read command and the received write command according to the read command and write command. For example, in this embodiment, the data mapping set of the mapping relationship of the page indicated by the read command or the write command is TS_12. Next, the controller 160 determines whether the data mapping set TS_12 is loaded on the cache area CA according to whether the set index 0xABC corresponding to the data mapping set TS_12 is in the cache-area-mapping table SMR_TB. In this embodiment, as shown in FIG. 14, the set index 0xABC of the data mapping set TS_12 is in the sector-mapping column SMR_3 of the cache-area-mapping table SMR_TB. Therefore, in this embodiment, the controller 160 determines that the set index 0xABC of the data mapping set TS_12 is in the cache-area-mapping table SMR_TB. Namely, the controller 160 determines that the cache area CA has the data mapping set TS_12, because the set index 0xABC of the data mapping set TS_12 is in the cache-area-mapping table SMR_TB, wherein the sector S_3 having the data mapping set TS_12 is the current sector. The data mapping set TS_12 is already in the cache area CA. namely, the number of times that the data mapping set TS_12 is read from the cache area CA is more than the predetermined number of times "1". Therefore, in this embodiment, the data mapping set TS_12 is defined as a frequent data mapping set. Next, the controller 160 updates the cache-area-mapping table SMR_TB, the sequential-order table SE_TB, the reverse-order table RSE_TB, the infrequent index set and the frequent index set to record the status of the current cache area CA. As shown in FIG. 14, the controller 160 reads the sequential-order column SE_3 of the current sector S_3 to obtain the sector that was written prior to the current sector S_3 is the sector S_4. Next, the controller 160 writes the common index CIX_2 stored in the reverse-order column RSE_3 corresponding to the current sector S_3 into the reverse-order column RSE_4 corresponding to the sector S_4. Namely, the controller 160 makes the reverse-order column RSE_4 which is pointing to the reverse-order column RSE_3 re-point to the reverse-order column RSE_2. Next, the controller 160 reads the reverse-order column RSE_3 corresponding to the current sector S_3 from the reverse-order table RSE_TB according to the common index CIX_3 of the current sector S_3, and obtains the common index CIX_2 of the sector S_2 that was read subsequent to the current sector S_3 according to the common index CIX_2 stored in the reverse-order column RSE_3. Next, the controller 160 writes the common index CIX_4 stored in the sequential-order column SE_2 corresponding to the current sector S_2 into the sequential-order column SE_2 corresponding to the sector S_2. Namely, the controller 160 makes the sequential-order column SE_2, which originally points to the sequential-order column SE_3, re-point to the sequential-order column SE_4. It should be noted that the sequential-order column SE_3 and the reverse-order column RSE_3 are not in the infrequent system in the steps of making the sequential-order column SE_2 re-point to the sequential-order column SE_4 from the sequential-order column SE_3 and making the reverse-order column RSE_4 re-point to the reverse-order column RSE_2 from the reverse-order column RSE_3. Namely, the order in which the infrequent data mapping sets are read from the cache area CA which is recorded in the sequential-order table SE_TB and the reverse-order table RSE_TB does not include a record of the data mapping set TS_12 corresponding to the sequential-order column SE_3 and the reverse-order column RSE_3. Next, the controller 160 writes the specific value (0xFFFF) into the sequential-order column SE_3 which has the same common index CIX_3 as the current sector S_3 to set the start of the frequent-sequential-order columns of the sequential-order table SE_TB, and writes the specific value (0xFFFF) into the reverse-order column RSE_3 which has the same common index CIX_3 as the current sector S_3 to set the start of the frequent-sequential-order columns of the sequential-order table RSE_TB. Lastly, the controller 160 defines the frequent head index FR_HIX as the common index CIX_3 of the current sector S_3, defines the frequent tail index FR_TIX as the common index CIX_3 of the current sector S_3 and keeps the value of the infrequent index set. The cache-area-mapping table SMR_TB, the sequential-order table SE_TB, the reverse-order table RSE_TB, the frequent index set and the infrequent index set after updating is shown in FIG. 15. Next, the controller 160 reads the corresponding sector S_3 of the cache area CA according to the common index CIX_3 of the sector-mapping column SMR_3 having the set index 0xABC to obtain the data mapping set TS_12. Namely, the controller 160 reads the data mapping set TS_12 from the cache area CA to execute the received write command and the received read command. It should be noted that the sequential-order column SE_3 and the reverse-order column RSE_3 have the same common index CIX_3 as the sector S_3 having the infrequent data mapping set TS_12. Therefore, in this embodiment, the sequential-order column SE_3 is defined as an infrequent-sequential-order column, and the reverse-order column RSE_3 is defined as an infrequent-reverse-order column.

Figure 16:
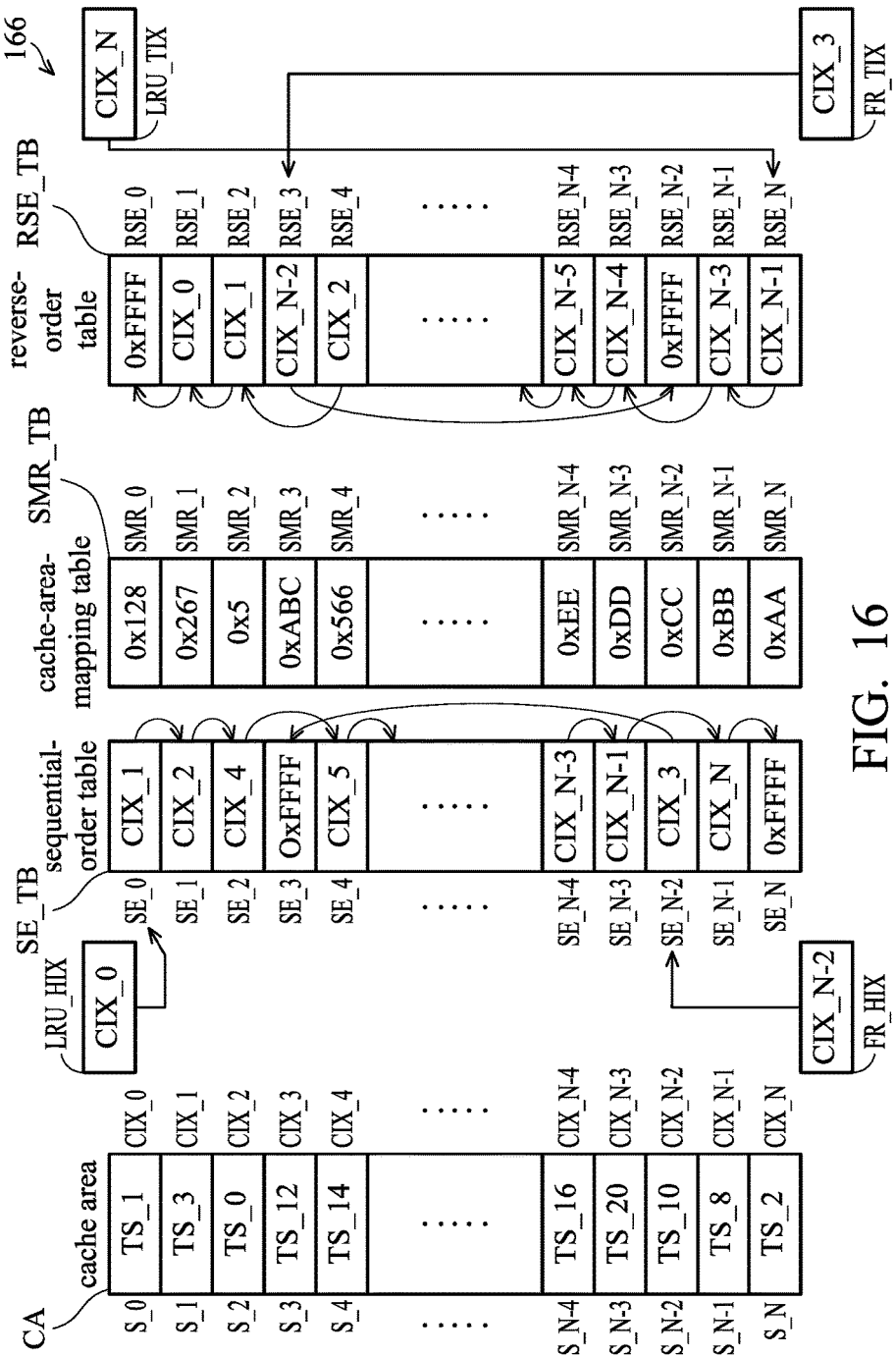

Next, in the embodiment of FIG. 15, when the controller 160 receives a read command or a write command, the controller 160 obtains a data mapping set of a mapping relationship of the page indicated by the received read command or write command according to the read/write command. For example, in this embodiment, the data mapping set of the mapping relationship of the page indicated by the read command or the write command is TS_10. Next, the controller 160 determines whether the data mapping set TS_10 is loaded on the cache area CA according to whether the set index 0xCC corresponding to the data mapping set TS_10 is in the cache-area-mapping table SMR_TB. In this embodiment, as shown in FIG. 15, the set index 0xCC of the data mapping set TS_10 is in the sector-mapping column SMR_N−2 of the cache-area-mapping table SMR_TB. Therefore, in this embodiment, the controller 160 determines that the set index 0xCC of the data mapping set TS_10 is in the cache-area-mapping table SMR_TB. Namely, the controller 160 determines that the data mapping set TS_10 is in the cache area CA, because the set index 0xCC of the data mapping set TS_10 is in the cache-area-mapping table SMR_TB, wherein the sector S_N−2 having the data mapping set TS_10 is the current sector. The data mapping set TS_10 is loaded on the cache area CA. Namely, the number of times that the data mapping set TS_10 is read from the cache area CA is more than the predetermined number of times "1". Therefore, in this embodiment, the data mapping set TS_10 is defined as the frequent data mapping set. Next, the controller 160 updates the cache-area-mapping table SMR_TB, the sequential-order table SE_TB, the reverse-order table RSE_TB, the frequent index set and the infrequent index set to record the current status of the cache area CA. as shown in FIG. 15, the controller 160 reads the sequential-order column SE_N−2 of the current sector S_N−2 to obtain that the sector that was written prior to the current sector S_N−2 is the sector S_N−1. Next, the controller 160 writes the common index CIX_N−3 stored in the reverse-order column RSE_N−2 corresponding to the current sector S_N−2 into the reverse-order column RSE_N−1 corresponding to the sector S_N−1. Namely, the controller 160 makes the reverse-order column RSE_N−1 which was pointing to the reverse-order column RSE_N−2, re-point to the reverse-order column RSE_N−3. Next, the controller 160 reads the reverse-order column RSE_N−2 corresponding to the current sector S_N−2 in the reverse-order table RSE_TB according to the common index CIX_N−2 of the current sector S_N−2, and obtains the common index CIX_N−3 of the sector S_N−3 that was read subsequent to the current sector S_N−2 according to the common index CIX_N−3 stored in the reverse-order column RSE_N−2. Next, the controller 160 writes the common index CIX_N−1 stored in the sequential-order column SE_N−2 corresponding to the current sector S_N−2 into the sequential-order column SE_N−3 corresponding to the current sector S_N−3. Namely, the controller 160 makes the sequential-order column SE_N−3, which points to the sequential-order column SE_N−2, re-point to the sequential-order column SE_N−1. It should be noted that the sequential-order column SE_N−2 and the reverse-order column RSE_N−2 are no longer in the infrequent system after the steps of making the sequential-order column SE_N−3 re-point to the sequential-order column SE_N−1 from the sequential-order column SE_N−2 and making the reverse-order column RSE_N−1 re-point to the reverse-order column RSE_N−3 from the reverse-order column RSE_N−2. Namely, the order in which the infrequent data mapping sets are read from the cache area CA which is record in the sequential-order table SE_TB and the data mapping set TS_12 corresponding to reverse-order table RSE_TB does not include the data mapping set TS_12 corresponding to the sequential-order column SE_3 and the reverse-order column RSE_3. Next, the controller 160 obtains the sector S_3 having the frequent data mapping set TS_12 that is the last one read from the cache area CA according to the frequent head index FR_HIX, and writes the common index CIX_3 of the sequential-order column SE_3 corresponding to the sector S_3 into the sequential-order column SE_N−2 corresponding to the current sector S_N−2. Next, the controller 160 obtains the sector S_3 having the frequent data mapping set TS_12 that has gone the longest time without having been read in the cache area CA according to the frequent tail index FR_TIX, and writes the common index CIX_N−2 of the reverse-order column RSE_N−2 corresponding to the current sector S_N−2 into the reverse-order column RSE_3 corresponding to the sector S_3. It should be noted that, in this embodiment, the cache area CA only has one frequent data mapping set TS_12, such that the frequent data mapping set TS_12 is the last frequent data mapping set that was read from the cache area and also the last frequent data mapping set that has gone the longest time without having been read. Lastly, the controller 160 defines the frequent head index FR_HIX as the common index CIX_N−2 of the current sector S_N−2, keeps the frequent tail index TIX as the common index CIX_3, and writes the specific value into the reverse-order column RSE_N−2 corresponding to the current sector S_N−2. Moreover, the controller 160 also keeps the infrequent index set as the original value. The cache-area-mapping table SMR_TB, the sequential-order table SE_TB, the reverse-order table RSE_TB, the frequent index set and the infrequent index set after updating are shown in FIG. 16. Next, the controller 160 reads the corresponding sector S_N−2 from the cache area CA according to the common index CIX_N−2 of the sector-mapping column SMR_N−2 storing the set index 0xCC to obtain the data mapping set TS_10. Namely, the controller 160 reads the data mapping set TS_10 from the cache area CA to execute the received write command and the received read command. It should be noted that the sequential-order column SE_N−2 and the reverse-order column RSE_N−2 have the same common index CIX_N−2 as the sector S_N−2 having the infrequent data mapping set TS_10. Therefore, in this embodiment, the sequential-order column SE_N−2 is defined as the infrequent-sequential-order column, and the reverse-order column RSE_N−2 is defined as the infrequent-reverse-order column.

Figure 17:
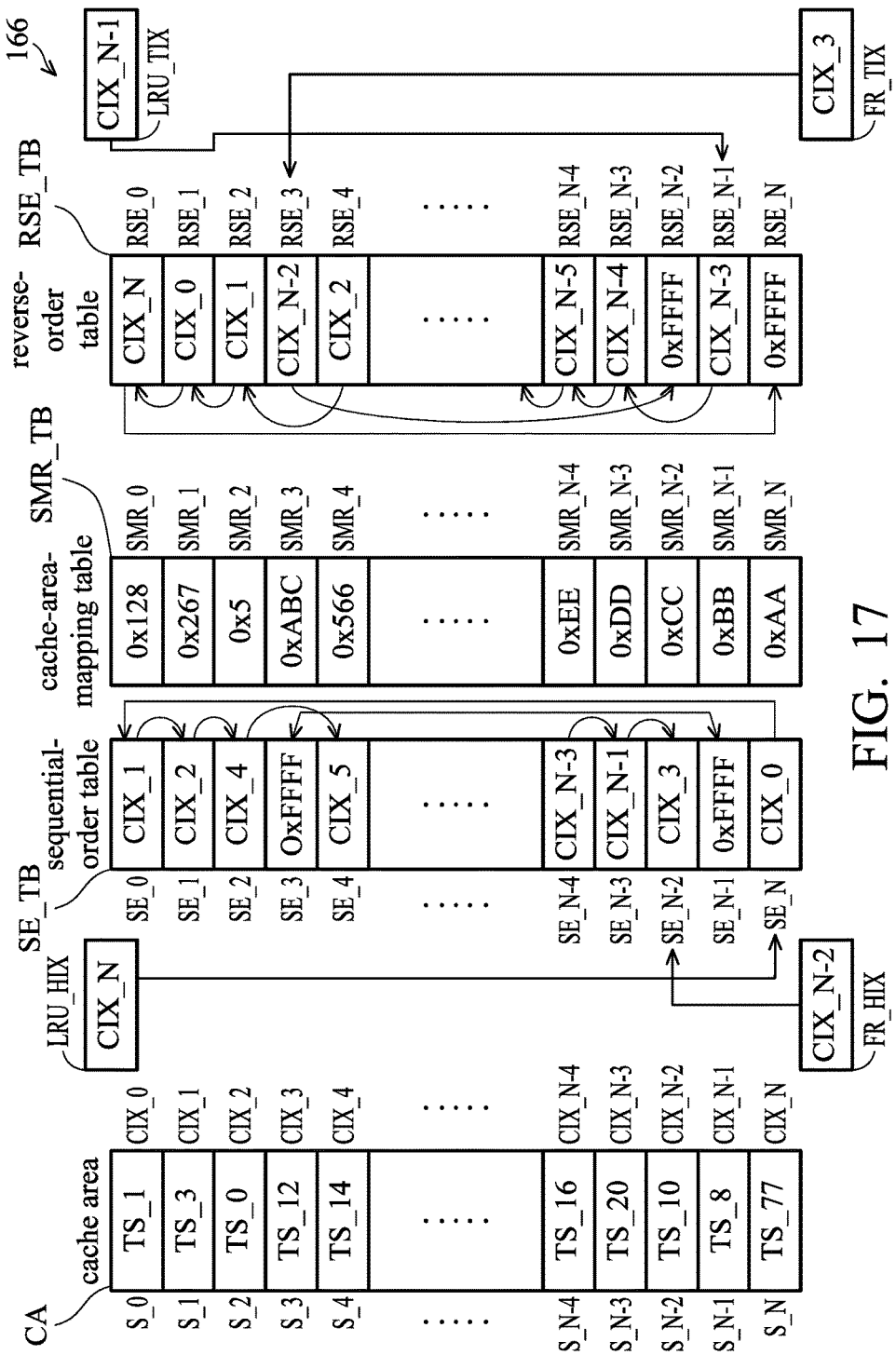

Next, in the embodiment of FIG. 16, when the controller 160 receives a read command or a write command, the controller 160 obtains a data mapping set of a mapping relationship of the page indicated by the received read command and the received write command. For example, in this embodiment, the data mapping set of the mapping relationship of the page indicated by the read command or the write command is TS_77. Next, the controller 160 determines whether the data mapping set TS_77 is in the cache area CA according to whether the set index 0x333 of the data mapping set TS_77 is in the cache-area-mapping table SMR_TB. In this embodiment, the cache area CA does not have the data mapping set TS_77, such that the set index 0x333 is also not in the cache-area-mapping table SMR_TB. The controller 160 determines that the data mapping set TS_77 is not in the cache area CA, because the set index 0x333 of the data mapping set TS_77 is not in the cache-area-mapping table SMR_TB. Next, the controller 160 determines whether any of the sectors of the cache area CA is available. As shown in FIG. 16, none of the sectors S_0~S_N of the cache area CA is available. Next, the controller 160 determines whether the infrequent tail index LRU_TIX is equal to any of the common indexes CIX_0~CIX_N. As shown in FIG. 16, the infrequent tail index LRU_TIX is equal to the common index CIX_N. Next, the controller 160 determines which of the infrequent data mapping sets is the one that has gone the longest time without having been read according to the infrequent tail index LRU_TIX, and writes the data mapping set TS_77 into sector having the infrequent data mapping set that has gone the longest time without having been read. As shown in FIG. 16, the controller 160 determines that the data mapping set TS_2 is the infrequent data mapping set that has gone the longest time without having been read in the cache area CA according to the common index CIX_N stored in the infrequent tail index LRU_TIX, and obtains that the sector S_N is the one that has the infrequent data mapping set having gone the longest time without having been read according to the common index CIX_N. Next, the controller 160 reads the data mapping set TS_77 from the data mapping table TB1 stored in the flash memory 180 to load the data mapping set TS_77 on the obtained sector S_N for replacing the original infrequent data mapping set TS_2 that hasn't been read for a long time. Next, the controller 160 updates the cache-area-mapping table SMR_TB, the sequential-order table SE_TB, the reverse-order table RSE_TB, the frequent index set and the infrequent index set to record the current status of the cache area CA. First, the controller 160 writes the set index 0x333 corresponding to the data mapping set TS_77 into the sector-mapping column SMR_N corresponding to the sector S_N of the cache-area-mapping table SMR_TB. As shown in FIG. 16, the controller 160 obtains the sector S_0 having the infrequent data mapping set TS_1 that was the last infrequent data mapping set read from the cache area CA according to the infrequent head index LRU_HIX, and writes the common index CIX_0 of the sequential-order column SE_0 corresponding to the sector S_0 into the sequential-order column SE_N corresponding to the sector S_N. Next, the controller 160 writes the common index CIX_N of the reverse-order column RSE_N corresponding to the current sector S_N into the reverse-order column RSE_0 corresponding to the sector S_0. Next, the controller 160 reads the reverse-order column RSE_N of the current sector S_N to obtain the common index CIX_N−1 of the sector S_N−1 which was read subsequent to the current sector S_N. Next, the controller 160 defines the infrequent head index LRU_HIX as the common index CIX_N of the current sector S_N, defines the infrequent tail index LRU_TIX as the common index CIX_N−1 of the sector S_N−1 that was read subsequent to the current sector S_N, and keeps the frequent index set as the original value. Lastly, the controller 160 writes the specific value into the sequential-order column SE_N−1 corresponding to the sector S_N−1 that was read subsequent to the current sector S_N, and writes the specific value into the reverse-order column RSE_N corresponding to the current sector S_N. The cache-area-mapping table SMR_TB, the sequential-order table SE_TB, the reverse-order table RSE_TB, the infrequent index set and the frequent index set after updating are shown in FIG. 17. Lastly, the controller 160 reads the data mapping set TS_77 from the cache area CA to execute the received write command or the received read command.

Figure 18:
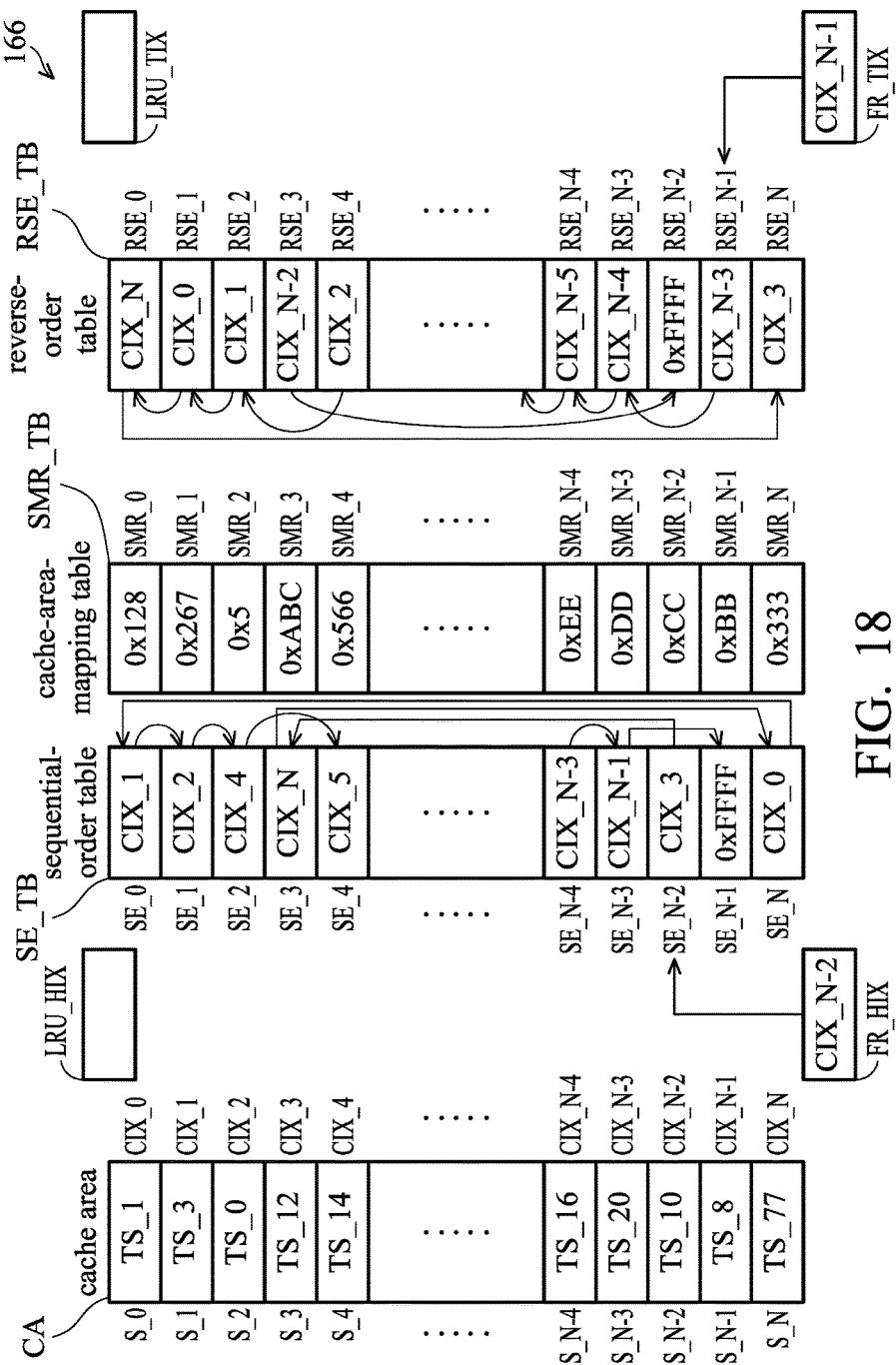

If the controller 160 continually receives the write command/read command corresponding to the frequent data mapping sets which are already loaded on the cache area CA, the controller 160 repeats the steps of transforming FIG. 15 to FIG. 16 to update the sequential-order table SE_TB, the reverse-order table RSE_TB and the frequent index set until all of the data in the cache area CA are frequent data mapping sets as shown in FIG. 18. It should be noted that when the cache area CA only has one infrequent data mapping set TS_8 left, the sequential-order column SE_N−1 corresponding to the infrequent data mapping set TS_8 and the reverse-order column RSE_N−1 are the specific value (0xFFFF). Namely, when the controller 160 needs to read the infrequent data mapping set TS_8, the controller 160 will realize that the sequential-order column SE_N−1 and the sequential-order column SE_N−1 are the specific value (0xFFFF). When the sequential-order column SE_N−1 and the sequential-order column SE_N−1 are the specific value, the controller 160 determines that the infrequent data mapping set TS_8 which is going to be transformed to the frequent data mapping set is the last infrequent data mapping set. Therefore, the controller 160 deletes the common index of the infrequent head index LRU_HIX and the common index of the infrequent tail index LRU_TIX after updating the data corresponding to the data mapping set TS_8 on the frequent system, as shown in FIG. 18.

Figure 19:
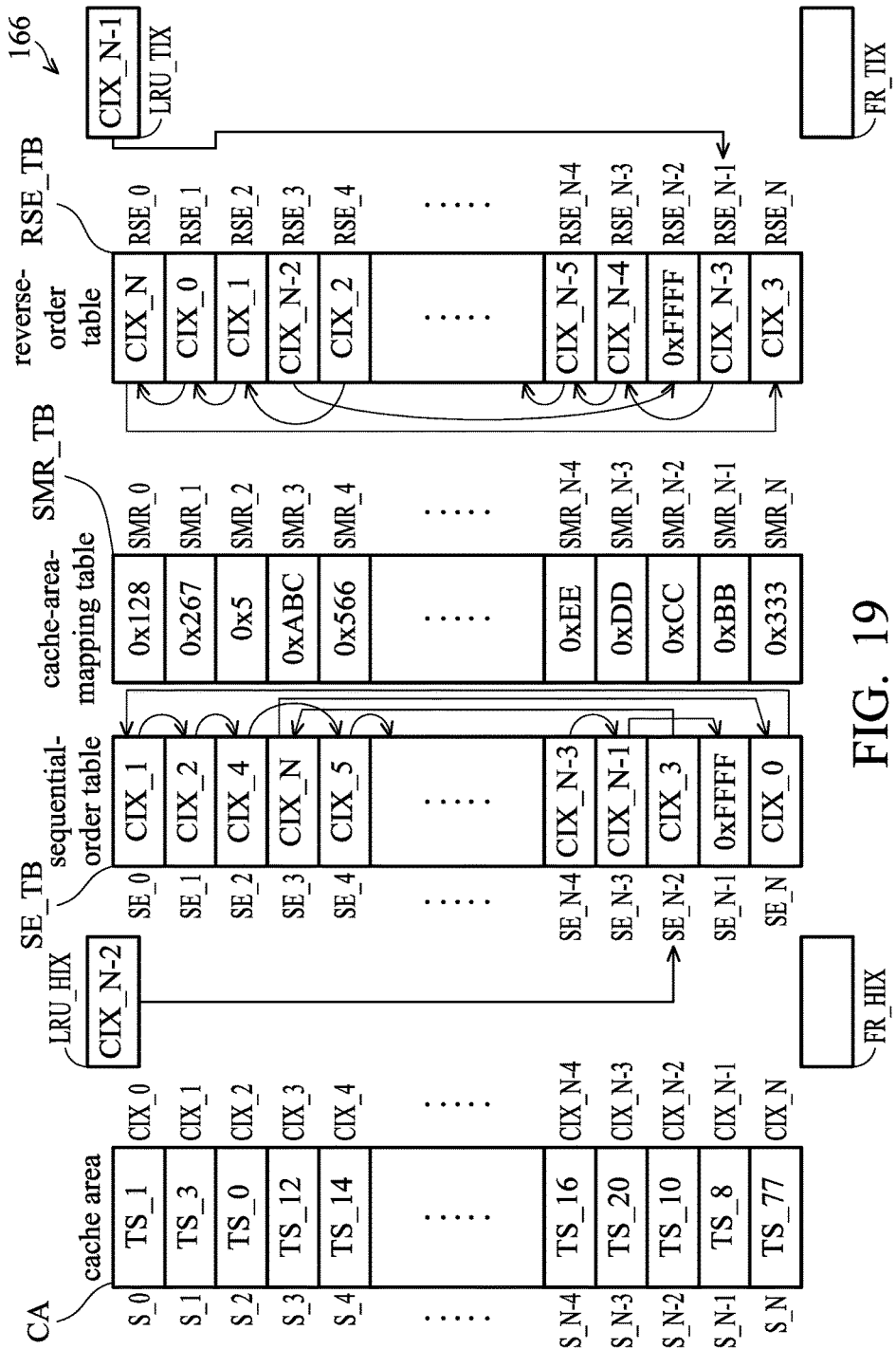
Figure 20:
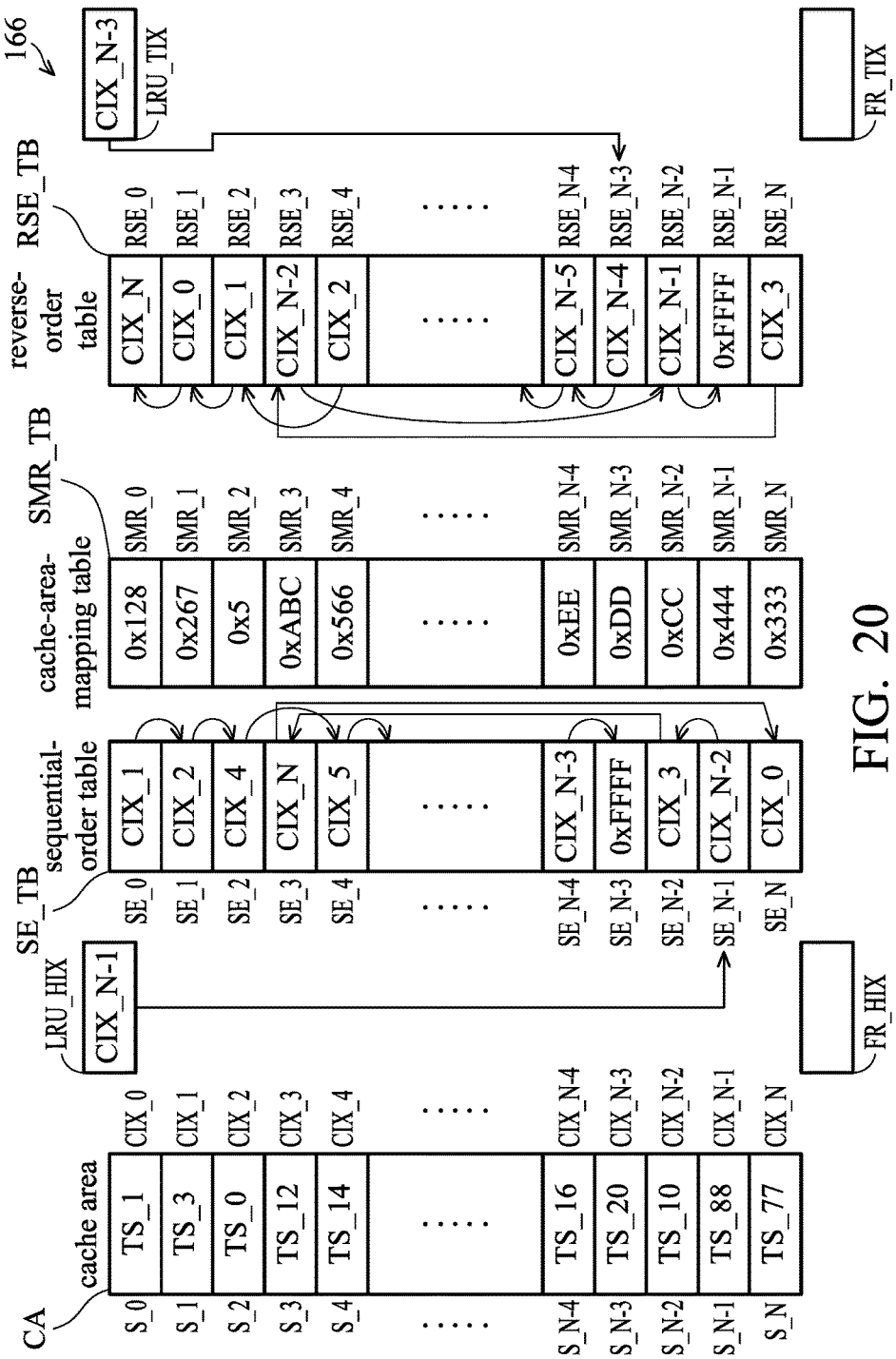

Next, in the embodiment of FIG. 18, when the controller 160 receives a read command or a write command, the controller 160 obtains a data mapping set of a mapping relationship of the page indicated by the received read command or the received write command according to the received read command or the received write command. For example, in this embodiment, the data mapping set of the mapping relationship indicated by the received read command or the received write command is TS_88. Next, the controller 160 determines whether the data mapping set TS_88 is loaded on the cache area CA according to whether the set index 0x444 corresponding to the data mapping set TS_88 is in the cache-area-mapping table SMR_TB. In this embodiment, the cache area CA does not have the data mapping set TS_88, such that the set index 0x444 is not in the cache-area-mapping table SMR_TB. The controller 160 determines that the data mapping set TS_88 is not loaded on the cache area CA, because the set index 0x444 of the data mapping set TS_88 is not in the cache-area-mapping table SMR_TB. Next, the controller 160 determines whether any of the sectors of the cache area CA is available. As shown in FIG. 18, none of the sectors S_0~S_N of the cache area CA is available. Next, the controller 160 determines whether the infrequent tail index LRU_TIX is equal to any of the common indexes CIX_0~CIX_N. As shown in FIG. 18, the infrequent tail index LRU_TIX is empty or the specific value. Therefore, the controller 160 writes the common index CIX_N−1 of the frequent tail index FR_TIX into the infrequent tail index LRU_TIX, writes the common index CIX_N−2 stored in the frequent head index FR_HIX into the frequent tail index LRU_HIX, and deletes the common indexes in the frequent tail index FR_TIX and the frequent head index FR_HIX, as shown in FIG. 19. Next, the controller 160 determines which of the infrequent data mapping sets is the one that has gone the longest time without having been read in the cache area CA according to the infrequent tail index LRU_TIX, and writes the data mapping set TS_88 into the sector having the infrequent data mapping set that has gone the longest time without having been read in the cache area CA. As shown in FIG. 19, the controller 160 determines that the data mapping set TS_8 is the data mapping set that has gone the longest time without having been read in the cache area CA according to the common index CIX_N−1 of the infrequent tail index LRU_TIX, and obtains that the sector S_N−1 is the sector having the infrequent data mapping set that has gone the longest time without having been read according to the common index CIX_N−1. Next, the controller 160 reads the data mapping set TS_88 from the data mapping table TB1 of the flash memory 180, and loads the data mapping set TS_88 on the obtained sector S_N−1 to replace the original infrequent data mapping set TS_8 that hasn't been read for a long time. Next, the controller 160 updates the cache-area-mapping table SMR_TB, the sequential-order table SE_TB, the reverse-order table RSE_TB, the frequent index set and the infrequent index set to record the current status of the cache area CA. More specifically, the details of updating can be found in the description of FIG. 16 and FIG. 17. The cache-area-mapping table SMR_TB, the sequential-order table SE_TB, the reverse-order table RSE_TB, the infrequent index set and the frequent index set after updating are shown in FIG. 20. Lastly, the controller 160 reads the data mapping set TS_88 stored in the cache area CA to execute the received write command or the received read command.

Figure 21:
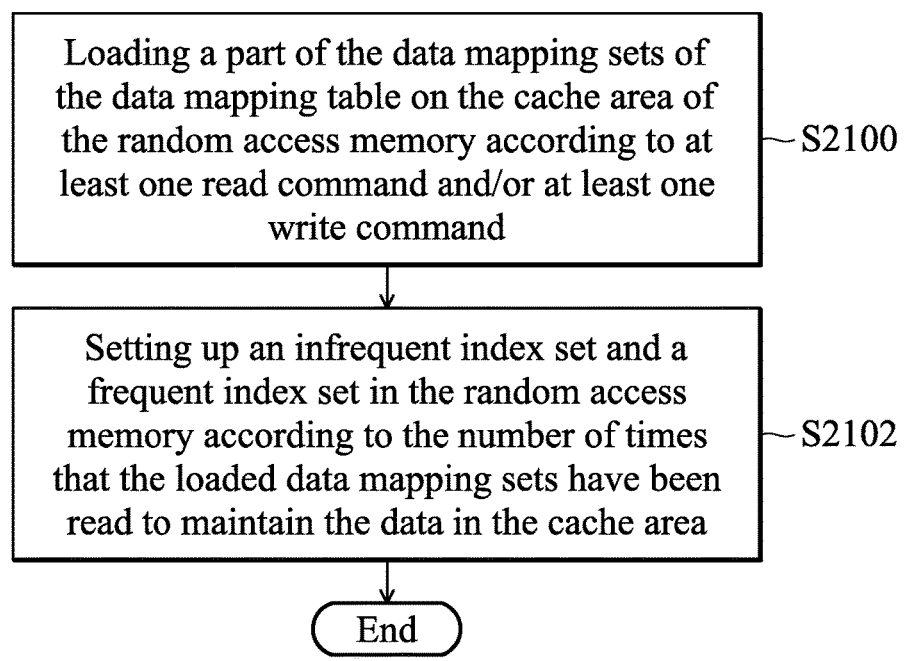
FIG. 21 is a flowchart of a data maintenance method in accordance with some embodiments.
Figure 22A:
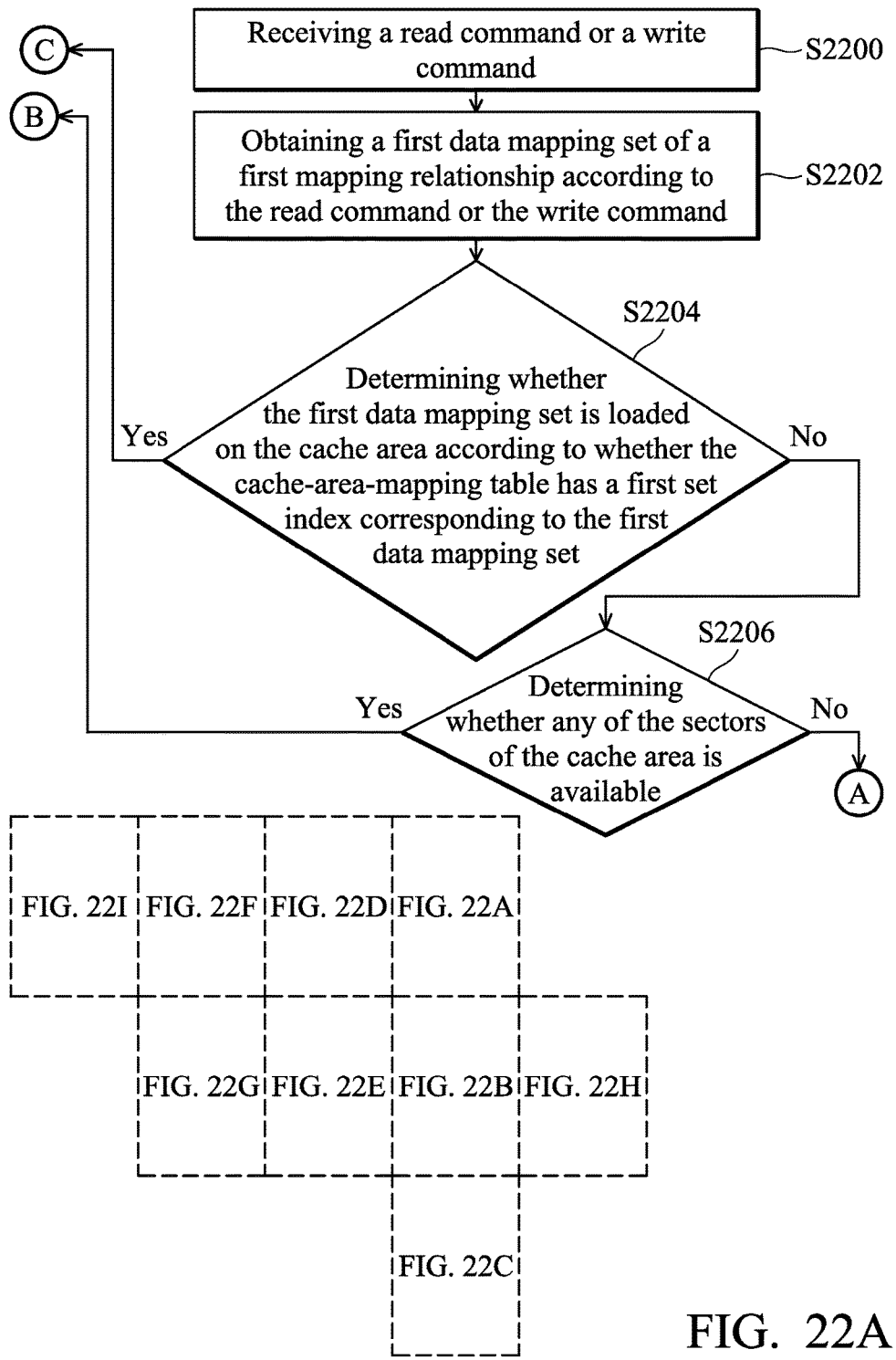
FIGS. 22A~22I are a flowchart of a data maintenance method in accordance with some embodiments.
Figure 22B:
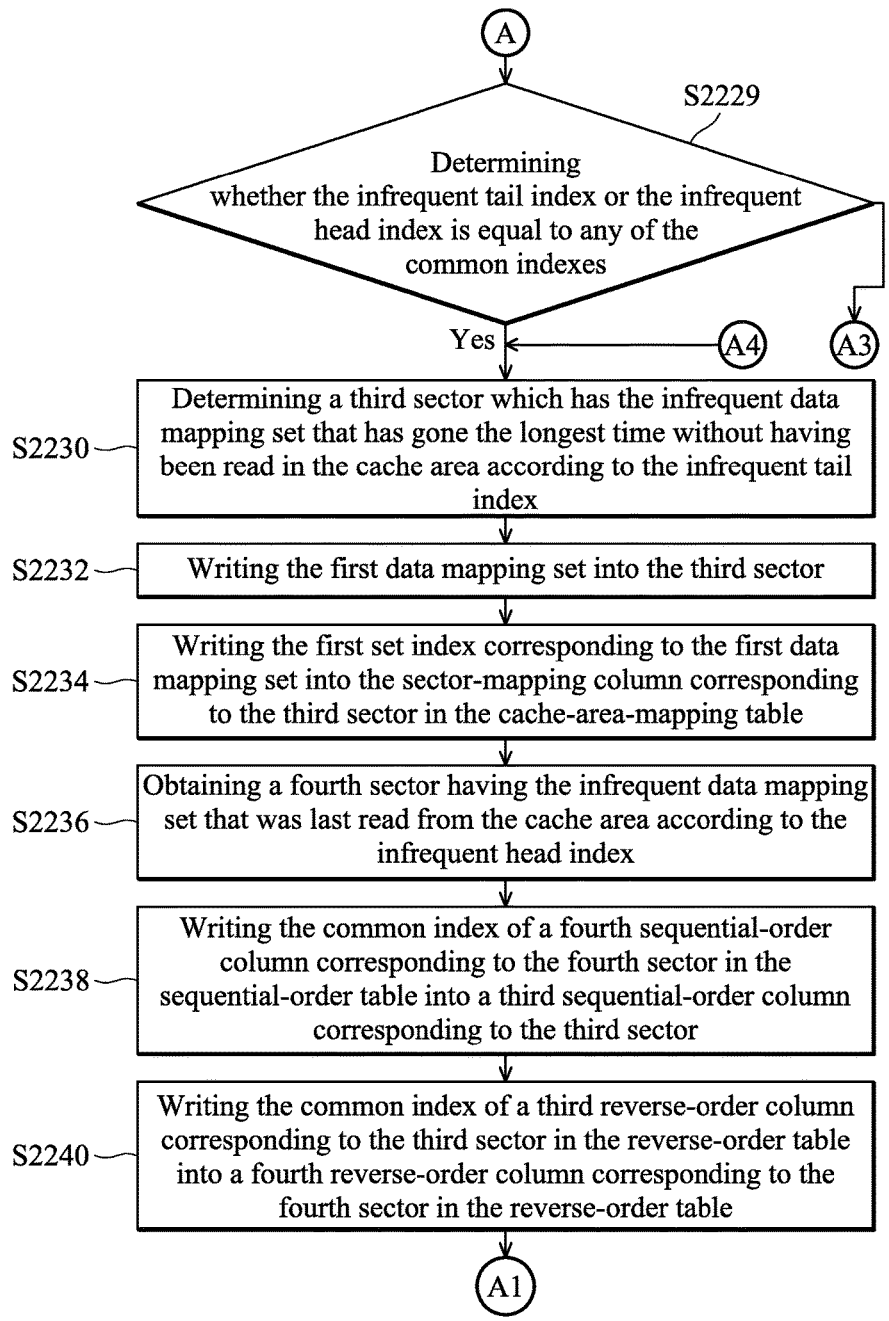
Figure 22C:
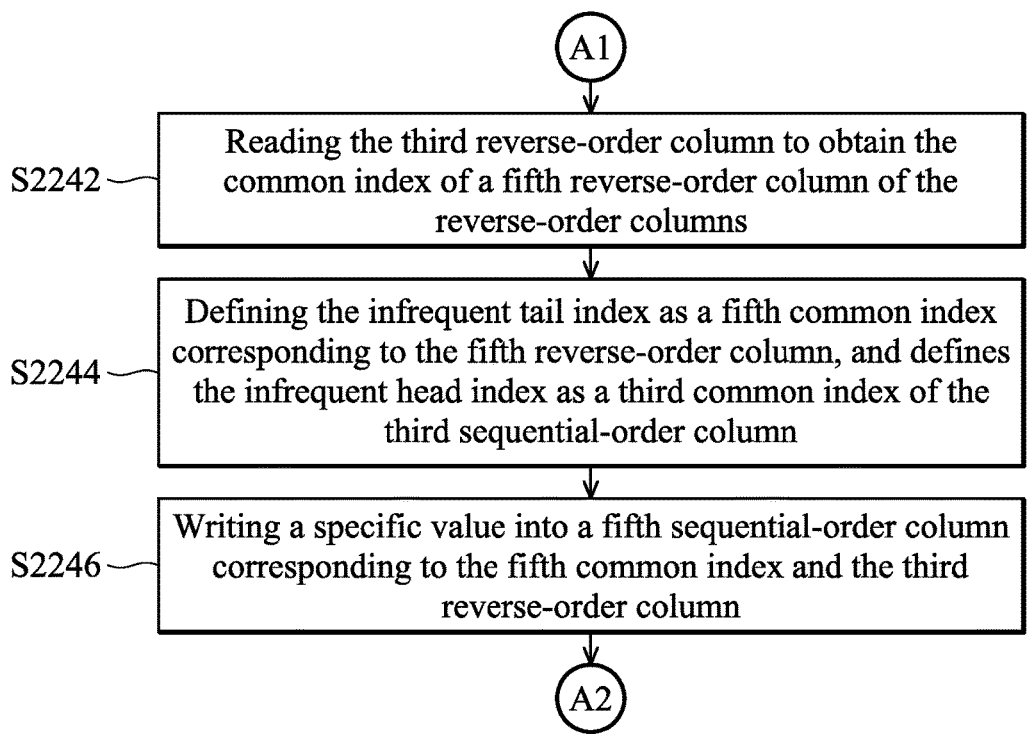
Figure 22D:
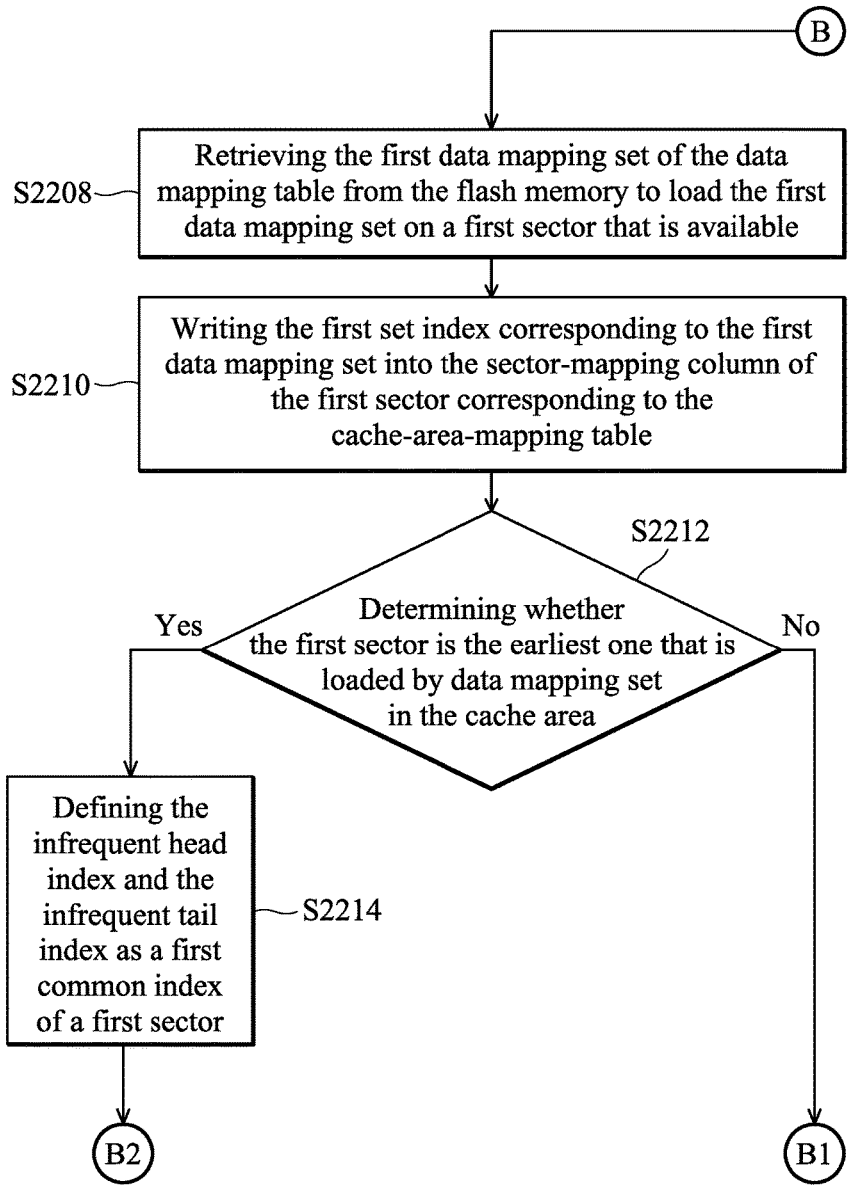
Figure 22E:
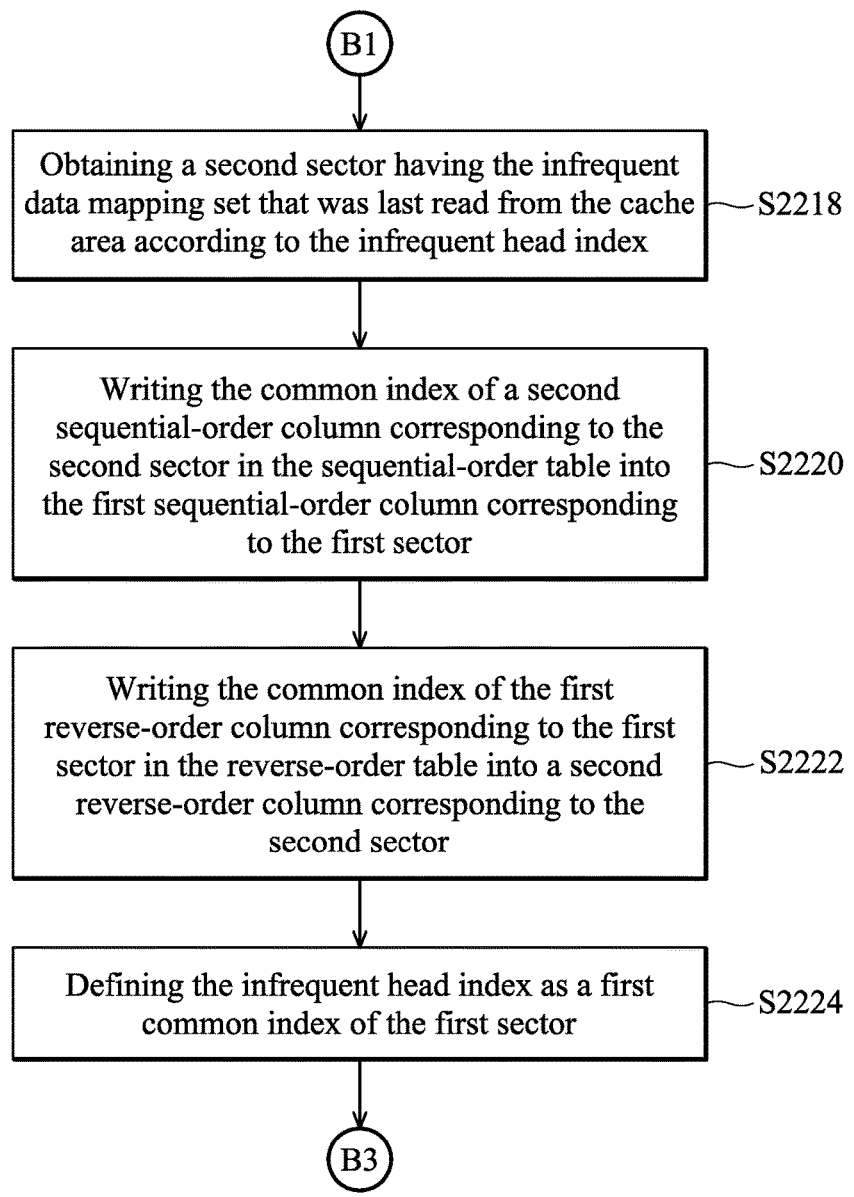
Figure 22F:
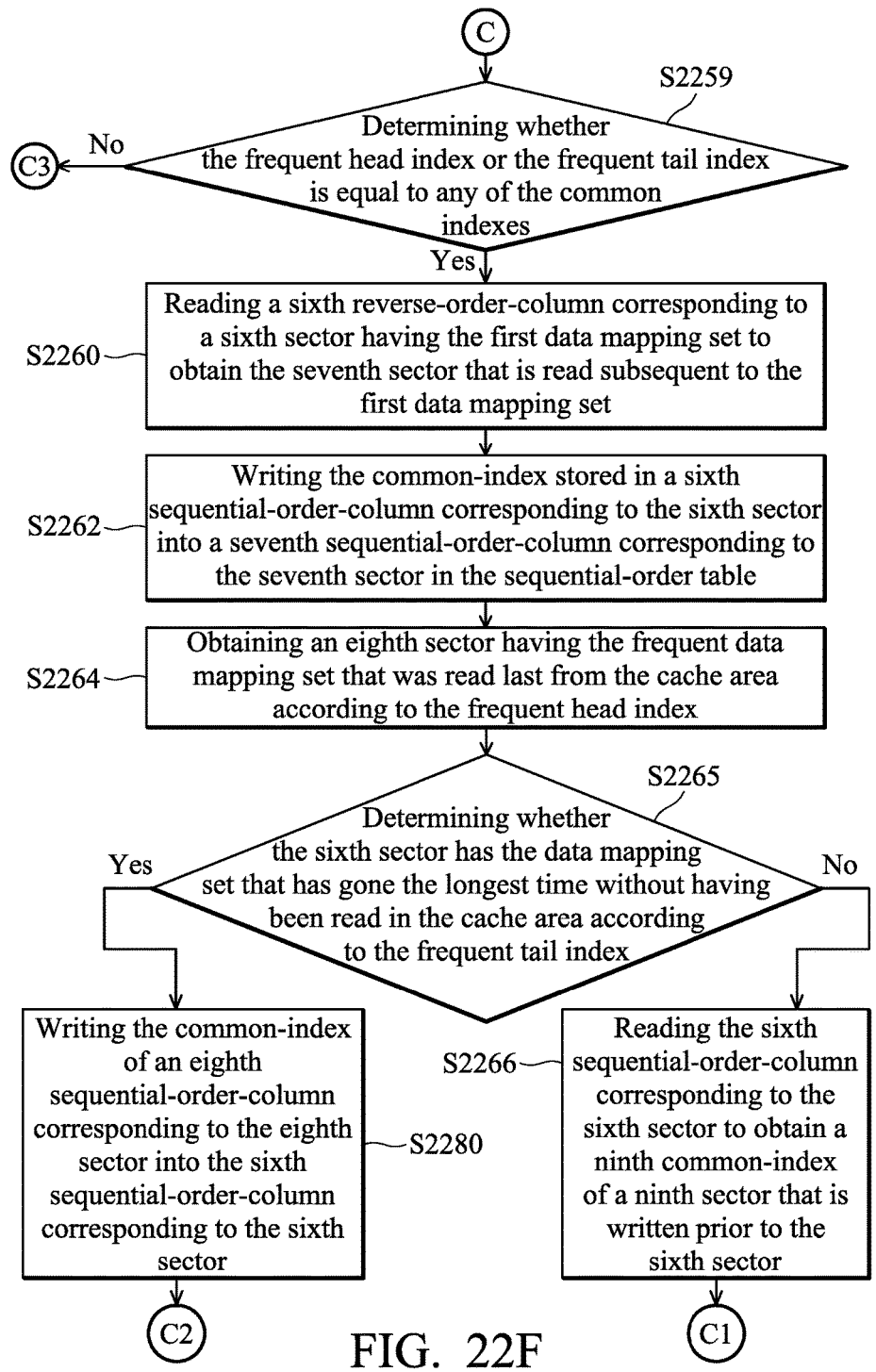
Figure 22G:
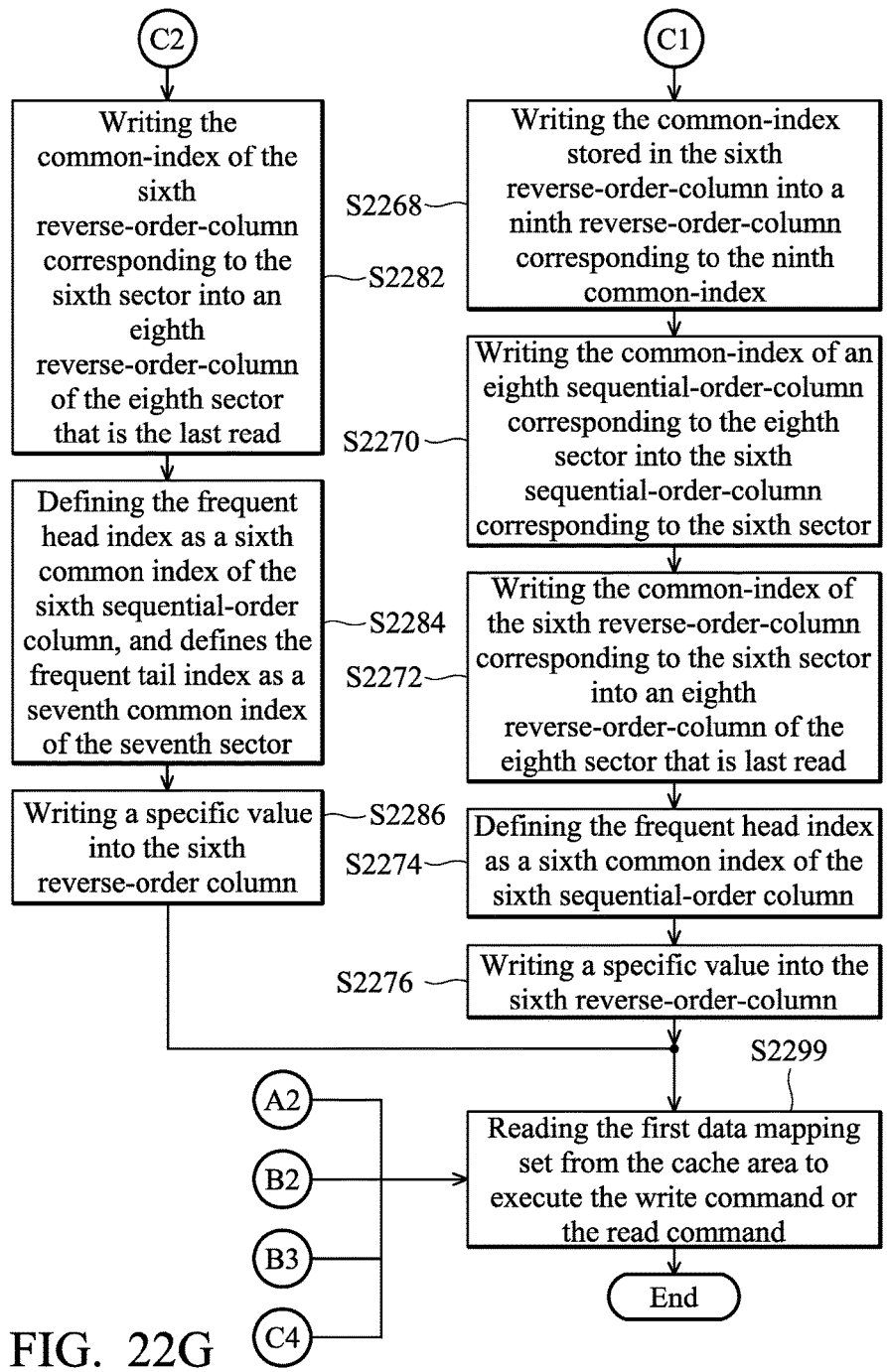
Figure 22H:
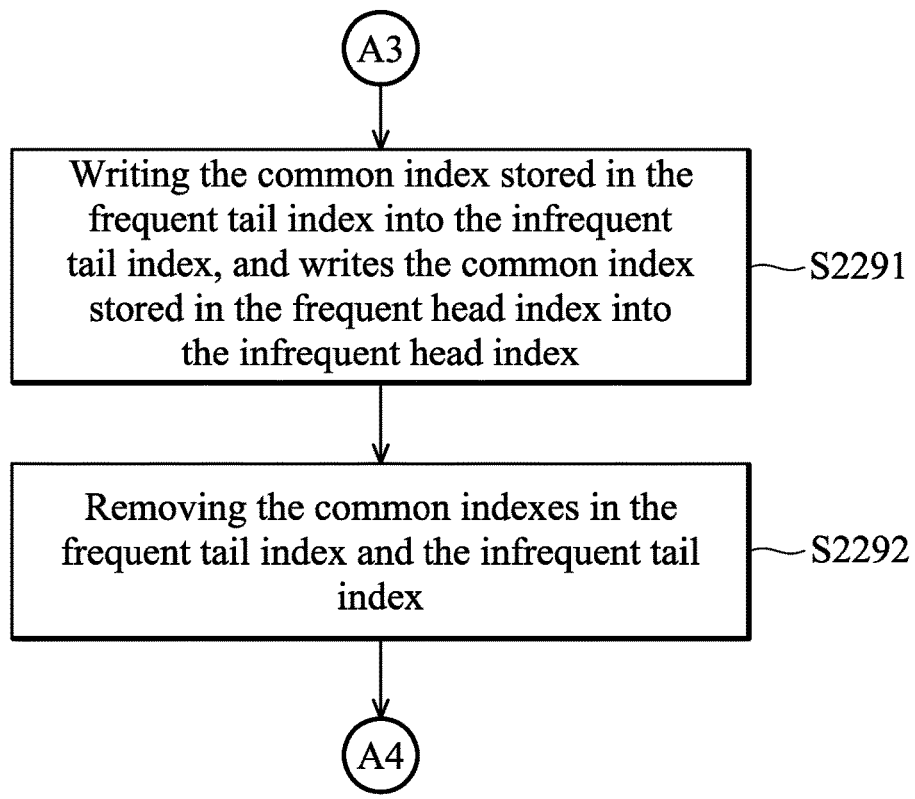
Figure 22I:
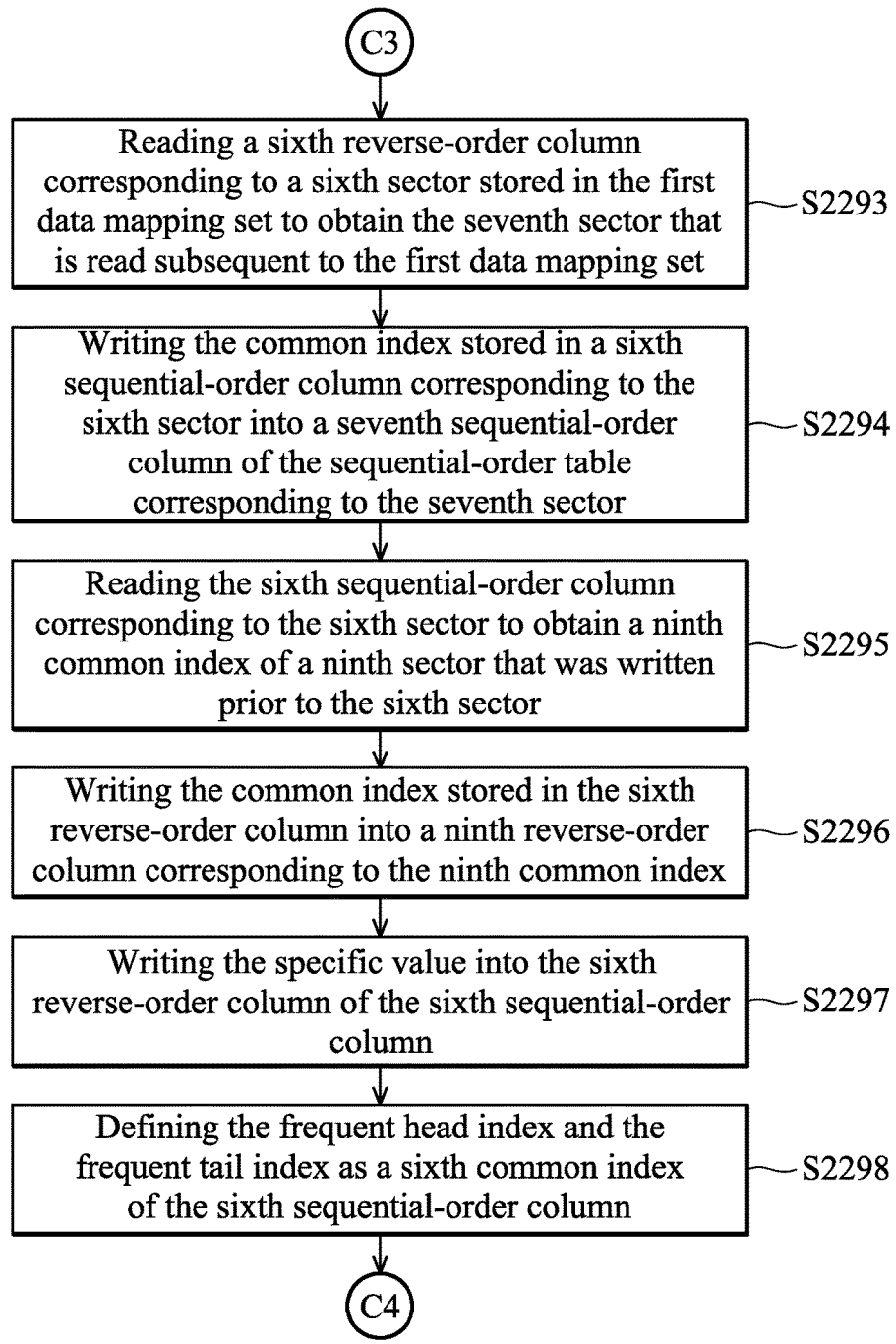

FIG. 21 is a flowchart of a data maintenance method in accordance with some embodiments. The data maintenance method is applied to the data storage device 140 of FIG. 1. The process starts at step S2100.

In step S2100, after the flash memory 180 is powered on, the controller 160 loads a part of the data mapping sets TS_0~TS_N of the data mapping table TB1 on the cache area CA of the random access memory 166 according to at least one read command and/or at least one write command.

Next, in step S2102, the controller 160 sets up an infrequent index set and a frequent index set in the random access memory 166 according to the number of times that the loaded data mapping sets have been read to maintain the data in the cache area CA. More specifically, the controller 160 sets up an infrequent index set and a frequent index set in the random access memory 166, wherein the infrequent index set is arranged to maintain the infrequent data mapping sets, and the frequent index set is arranged to maintain the frequent data mapping sets. In one embodiment, the infrequent index set is constituted by an infrequent head index LRU_HIX and an infrequent tail index LRU_TIX, and the frequent index set is constituted by a frequent head index FR_HIX and a frequent tail index FR_TIX. The infrequent head indexes LRU_HIX stores the common index of the sector having the infrequent data mapping set that was read last from the cache area CA for pointing to the infrequent data mapping set that was read last from the cache area CA. The infrequent tail index LRU_TIX stores the common index of the sector having the infrequent data mapping set that has gone the longest time without having been read for pointing to the infrequent data mapping set that has gone the longest time without having been read in the cache area CA. The frequent head index FR_HIX stores the common index of the sector having the frequent data mapping set that was read last for pointing to the frequent data mapping set that was read last from the cache area CA. The frequent tail index FR_TIX stores the common index of the sector having the frequent data mapping set that has gone the longest time without having been read for pointing to the frequent data mapping set that has gone the longest time without having been read in the cache area CA.

In another embodiment, in step S2102, the controller 160 builds a cache-area-mapping table SMR_TB, a reverse-order table RSE_TB and a sequential-order table SE_TB according to the loaded data mapping set. More specifically, the controller 160 builds the cache-area-mapping table SMR_TB in the random access memory 166 to record the set indexes of the data mapping sets in the cache area CA. The controller 160 builds the reverse-order table RSE_TB in the random access memory 166 to record the opposite order in which the frequent data mapping sets are read from the cache area CA and the opposite order in which the infrequent data mapping set is read from the cache area CA. It should be noted that, in this embodiment, the reverse-order column RSE_0~RSE_N of the reverse-order table RSE_TB can record two kinds of order (the opposite order in which the frequent data mapping sets are read from the cache area CA and the opposite order in which the infrequent data mapping sets are read from the cache area CA). Similarly, the controller 160 builds the sequential-order table SE_TB in the random access memory 166 to record the order in which the frequent data mapping sets are read from the cache area CA and the order in which the infrequent data mapping set is read from the cache area CA. When the cache area CA is filled and the controller 160 needs to load a new data mapping set on the cache area CA, the controller 160 selects one of the sectors S_0~S_N of the cache area CA according to the infrequent tail index LRU_TIX to load the new data mapping set on the selected sector. After loading the new data mapping set on the selected sector or reading the old data mapping set, the controller 160 updates the indexes and tables in the random access memory 166 according to the infrequent index set and/or the frequent index set, the data of the reverse-order table RSE_TB and the data of the sequential-order table SE_TB to record the current data status of the cache area CA.

FIGS. 22A-22I are a flowchart of a data maintenance method in accordance with some embodiments. The data maintenance method of FIGS. 22A~22I is applied to the data storage device 140 of FIG. 1. The process starts at step S2200. Steps S2200~S2212, S2260~S2262, S2266~S2272 and S2276~S2282 are similar to steps S1000~S1012, S1060~S1062, S1066~S1072 and S1076~S1082 of FIG. 10, such that the details of steps S2200~S2212, S2260~S2262, S2266~S2272 and S2276~S2282 can be referred to in FIG. 10.

In step S2214, the controller 160 defines the infrequent head index LRU_HIX and the infrequent tail index LRU_TIX as a first common index of a first sector. For example, in the embodiment of FIG. 12, the data mapping set TS_2 is the first data mapping set written in the cache area CA, wherein the data mapping set TS_2 is written into the sector S_N. Therefore, in step S2214, the controller 160 defines both of the infrequent head index LRU_HIX and the infrequent tail index LRU_TIX as the common index CIX_N of the common index CIX_N of the sector S_N. Next, the process goes to step S2299.

In step S2218, the controller 160 obtains a second sector having the infrequent data mapping set that was last read from the cache area CA according to the infrequent head index LRU_HIX. It should be noted that, in this embodiment, the infrequent data mapping set which was read last from the cache area CA for the read command or the write command is the one that was read last of the infrequent data mapping sets.

Next, in step S2220, the controller 160 writes the common index of a second sequential-order column corresponding to the second sector in the sequential-order table SE_TB into the first sequential-order column corresponding to the first sector. For example, in the embodiment of FIG. 5, the data mapping set TS_8 is not the first data mapping set that was written into the cache area CA, wherein the data mapping set TS_8 is written into the sector S_N−1 (first sector). Before updating the tables in the random access memory 166, the controller 160 obtains the sector S_N (the second sector) having the infrequent data mapping set TS_2 that was read last from the cache area CA according to the current infrequent head index LRU_HIX (as shown in FIG. 12) in step S1018. Next, in step S2220, the controller 160 writes the common index CIX_N of the sequential-order column SE_N (the second sequential-order column) corresponding to the sector S_N (the second sector) into the sequential-order column SE_N−1 (the first sequential-order column) corresponding to the current sector S_N−1 (the first sector).

Next, in step S2222, the controller 160 writes the common index of the first reverse-order column corresponding to the first sector in the reverse-order table RSE_TB into a second reverse-order column corresponding to the second sector. For example, in the embodiment of FIG. 13, the controller 160 writes the common index CIX_N−1 of the reverse-order column RSE_N−1 (the first reverse-order column) corresponding to the current sector S_N−1 (the first sector) into the reverse-order column RSE_N corresponding to the sector S_N (the second sector) in step S2222.

Next, in step S2224, the controller 160 defines the infrequent head index LRU_HIX as a first common index of the first sector. For example, in the embodiment of FIG. 13, the controller 160 defines the infrequent head index LRU_HIX as the common index CIX_N−1 (the first common index) of the current sector S_N−1 (the first sector) and keeps the infrequent tail index LRU_TIX as the common index CIX_N (the second common index) in step S2224, wherein the frequent index set is also maintain the original value. Next, the process goes to step S1090.

In step S2229, the controller 160 determines whether the infrequent tail index LRU_TIX or the infrequent head index LRU_HIX is equal to any of the common indexes CIX_0~CIX_N. when the infrequent tail index LRU_TIX or the infrequent head index LRU_HIX is equal to one of the common indexes CIX_0~CIX_N, the process goes to step S2230, otherwise the process goes to step S2291.

In step S2230, the controller 160 determines a third sector which has the infrequent data mapping set that has gone the longest time without having been read in the cache area CA according to the infrequent tail index LRU_TIX. It should be noted that, in this embodiment, the infrequent data mapping set that has gone the longest time without having been read in the cache area CA is the infrequent data mapping set that has gone the longest time without having been read for read or write command in the cache area CA.

Next, in step S2232, the controller 160 writes the first data mapping set into the third sector. Taking the embodiment of FIG. 17 as an example, the mapping relationship of the page indicated by the read command or the write command is recorded in the data mapping set TS_77 (the first data mapping set). The controller 160 has determined that the set index 0x333 of the data mapping set TS_77 is not in the cache-area-mapping table SMR_TB in step S2204, and determines that the cache area CA does not have empty sector in step S2206. Therefore, in step S2230, the controller 160 determines that the data mapping set TS_2 is the infrequent data mapping set that has gone the longest time without having been read in the cache area CA according to the infrequent tail index LRU_TIX shown in FIG. 16, and the data mapping set TS_2 is corresponding to the sector S_N (the third sector). Therefore, in step S2232, the controller 160 reads the data mapping set TS_77 (the first data mapping set) from the data mapping table TB1 stored in the flash memory 180 to write the data mapping set TS_77 into the obtained sector S_N (the third sector) to replace the original data mapping set TS_2 that hasn't been read for a long time.

Next, in step S2234, the controller 160 writes the first set index corresponding to the first data mapping set into the sector-mapping column corresponding to the third sector in the cache-area-mapping table SMR_TB. In the embodiment of FIG. 17, the controller 160 writes the set index 0x333 (the first set index) corresponding to the data mapping set TS_77 (the first data mapping set) into the sector-mapping column SMR_N corresponding to the sector S_N (the third sector) in step S2234.

Next, in step S2236, the controller 160 obtains a fourth sector having the infrequent data mapping set that was last read from the cache area CA according to the infrequent head index LRU_HIX.

Next, in step S2238, the controller 160 writes the common index of a fourth sequential-order column corresponding to the fourth sector in the sequential-order table SE_TB into a third sequential-order column corresponding to the third sector. For example, in the embodiment of FIG. 17, the controller 160 obtains the sector S_2 (the fourth sector) having the data mapping set TS_0 that was read last from the cache area CA according to the infrequent head index LRU_HIX shown in FIG. 16 in step S2236. Next, in step S1038, the controller 160 writes the common index CIX_2 of the sequential-order column SE_2 (the fourth sequential-order column) corresponding to the sector S_2 (the fourth sector) into the sequential-order column SE_N (the third sequential-order column) corresponding to the current sector S_N (the third sector).

Next, in step S2240, the controller 160 writes the common index of a third reverse-order column corresponding to the third sector in the reverse-order table RSE_TB into a fourth reverse-order column corresponding to the fourth sector in the reverse-order table RSE_TB. For example, in the embodiment of FIG. 17, the controller 160 writes the common index CIX_N of the reverse-order column RSE_N (the third reverse-order column) corresponding to the current sector S_N (the third sector) into the reverse-order column RSE_2 (the fourth reverse-order column) corresponding to the sector S_2 (the fourth sector).

Next, in step S2242, the controller 160 reads the third reverse-order column to obtain the common index of a fifth reverse-order column of the reverse-order columns RSE_0~RSE_N. Namely, the controller 160 reads the third reverse-order column corresponding to the current third sector to obtain a fifth sector that was read subsequent to the current third sector.

Next, in step S2244, the controller 160 defines the infrequent tail index LRU_TIX as a fifth common index corresponding to the fifth reverse-order column, and defines the infrequent head index LRU_HIX as a third common index of the third sequential-order column. For example, in the embodiment of FIG. 17, the controller 160 reads the reverse-order column RSE_N (the third reverse-order column) of the current sector S_N (the third sector) in step S2244 to obtain the common index CIX_N−1 (the common index of the fifth reverse-order column) that was read subsequent to the current sector S_N (the third sector). Next, the controller 160 defines the infrequent head index LRU_HIX as the common index CIX_N of the current sector S_N (the third sector), and defines the infrequent tail index LRU_TIX as the common index CIX_N−1 (the fifth common index) of the sector S_N−1 (the fifth sector) that was read subsequent to the current sector S_N.

Next, in step S2246, the controller 160 writes a specific value into a fifth sequential-order column corresponding to the fifth common index and the third reverse-order column. Namely, the controller 160 writes the specific value into the reverse-order column corresponding to the common index that is pointed by the current head index, and writes the specific value into the sequential-order column corresponding to the common index pointed by the current tail index. As shown in FIG. 17, the controller 160 writes the specific value into the reverse-order column RSE_N corresponding to the current sector S_N (the third sector) and the sequential-order column SE_N−1 (the fifth sequential-order column) corresponding to the common index CIX_N−1 (the common index of the fifth reverse-order column). Next, the process goes to step S2299.

In step S2259, the controller 160 determines whether the frequent head index FR_HIX or the frequent tail index FR_TIX is equal to any of the common indexes CIX_0~CIX_N. When the frequent head index FR_HIX is equal to one of the common indexes CIX_0~CIX_N, the process goes to step S2260, otherwise the process goes to step S2293.

Next, in step S2264, the controller 160 obtains an eighth sector having the frequent data mapping set that was read last from the cache area CA according to the frequent head index FR_HIX.

Next, in step S2265, the controller 160 determines whether the sixth sector has the data mapping set that has gone the longest time without having been read in the cache area CA according to the frequent tail index FR_TIX. When the sixth sector has the data mapping set that has gone the longest time without having been read in the cache area CA, the process goes to step S2280, otherwise the process goes to step S2266. Namely, the controller 160 is arranged to determine whether the data mapping set which is going to be read is the data mapping set that has gone the longest time without having been read in the cache area CA.

Next, in step S2274, the controller 160 defines the frequent head index FR_HIX as a sixth common index of the sixth sequential-order column.

Next, in step S2284, the controller 160 defines the frequent head index FR_HIX as a sixth common index of the sixth sequential-order column, and defines the frequent tail index FR_TIX as a seventh common index of the seventh sector.

Next, in step S2286, the controller 160 writes a specific value into the sixth reverse-order column. Namely, the controller 160 writes the specific value into the reverse-order column RSE_N corresponding to the common index pointed by the current head index. Next, the process goes to step S2299.

In step S2291, the controller 160 writes the common index stored in the frequent tail index FR_TIX into the infrequent tail index LRU_TIX, and writes the common index stored in the frequent head index FR_HIX into the infrequent head index LRU_HIX.

Next, in step S2292, the controller 160 removes the common indexes in the frequent tail index FR_TIX and the infrequent tail index LRU_TIX. In another embodiment, after writing the common index stored in the frequent head index FR_HIX into the infrequent head index LRU_HIX, the controller 160 writes the default value into the frequent tail index FR_TIX and the infrequent tail index LRU_TIX. For example, in step S2229, the controller 160 determines that the infrequent tail index LRU_TIX or the infrequent head index LRU_HIX is not equal to any of the common indexes CIX_0~CIX_N, as shown in FIG. 18. Next, in steps S2291~S2292, the controller 160 writes the common index CIX_N−1 stored in the frequent tail index FR_TIX into the infrequent tail index LRU_TIX, writes the common index CIX_N−2 stored in the frequent head index FR_HIX into the infrequent head index LRU_HIX, and removes the common index in the frequent tail index FR_TIX and the infrequent tail index LRU_TIX. Next, the process goes to step S2230.

In step S2293, the controller 160 reads a sixth reverse-order column corresponding to a sixth sector stored in the first data mapping set to obtain the seventh sector that is read subsequent to the first data mapping set. Namely, the controller 160 reads a sixth reverse-order column corresponding to a sixth sector in the reverse-order table RSE_TB to obtain a seventh sector that was read subsequent to the sixth sector. For example, in the embodiment of FIG. 15, the mapping relationship of the page indicated by the read command or the write command is recorded in the data mapping set TS_12. As shown in FIG. 14, the set index 0xABC of the data mapping set TS_12 is already in the sector-mapping column SMR_3 of the cache-area-mapping table SMR_TB. Therefore, in step S2204, the controller 160 determines that the data mapping set TS_12 is loaded on the cache area CA, because the set index 0xABC corresponding to the data mapping set TS_3 is in the cache-area-mapping table SMR_TB. Next, the controller 160 reads the reverse-order column RSE_3 (the sixth reverse-order column) corresponding to the current sector S_3 (the sixth sector) in the reverse-order table RSE_TB according to the common index CIX_3 of the current sector S_3 (the sixth sector) in step S2293, and obtains that the sector S_2 is the one that was read subsequent to the current sector S_3 (the sixth sector) according to the common index CIX_2 stored in the reverse-order column RSE_3 (the sixth reverse-order column).

Next, in step S2294, the controller 160 writes the common index stored in a sixth sequential-order column corresponding to the sixth sector into a seventh sequential-order column of the sequential-order table SE_TB corresponding to the seventh sector. For example, in the embodiment of FIG. 14, the controller 160 obtains that the sector S_2 (the seventh sector) is the one that was read subsequent to the current sector S_3 (the sixth sector) in step S1093. Therefore, in step S1094, the controller 160 writes the common index CIX_4 stored in the sequential-order column SE_3 (the sixth sequential-order column) corresponding to the current sector S_3 (the sixth sector) into the sequential-order column SE_2 (the seventh sequential-order column) corresponding to the sector S_2 (the seventh sector). Namely, the controller 160 makes the sequential-order column SE_2 (the seventh sequential-order column), which is pointed to the sequential-order column SE_3 (sixth sequential-order column), re-point to the sequential-order column SE_4 corresponding to the sector S_4 that was read prior to the first data mapping set.

Next, in step S2295, the controller 160 reads the sixth sequential-order column corresponding to the sixth sector to obtain a ninth common index of a ninth sector that was written prior to the sixth sector. In the embodiment of FIG. 15, the controller 160 reads the sequential-order column SE_3 (the sixth sequential-order column) corresponding to the current sector S_3 (the sixth sector) in step S2295 to obtain the sector S_4 (the ninth sector) that is the sector which was written prior to the current sector S_4 (the sixth sector).

Next, in step S2296, the controller 160 writes the common index stored in the sixth reverse-order column into a ninth reverse-order column corresponding to the ninth common index. For example, in the embodiment of FIG. 15, the controller 160 writes the common index CIX_2 stored in the reverse-order column RSE_3 (the sixth reverse-order column) corresponding to the current sector S_3 (the sixth sector) into the reverse-order column RSE_4 (the ninth reverse-order column) corresponding to the sector S_4 (the ninth sector) in step S2295.

Next, in step S2297, the controller 160 writes the specific value into the sixth reverse-order column of the sixth sequential-order column. For example, in the embodiment of FIG. 15, the controller 160 writes the specific value 0xFFFF into the sequential-order column SE_3 (the sixth sequential-order column) and the reverse-order column RSE_3 (the sixth reverse-order column) corresponding to the current sector S_3 (the sixth sector) in step S2297.

Next, in step S2298, the controller 160 defines the frequent head index FR_HIX and the frequent tail index FR_TIX as a sixth common index of the sixth sequential-order column. For example, in the embodiment of FIG. 15, the controller 160 defines the frequent head index FR_HIX and the frequent tail index FR_TIX as the common index CIX_3 of the current sector S_3 in step S2297. Next, the process goes to step S2299.

In step S2299, the controller 160 reads the first data mapping set from the cache area CA to execute the write command or the read command received in step S2200. The process ends at step S2299.

The data storage device 140 and the data maintenance method provided by the present invention may update the data in the cache area according the data status of the cache area by using the indexes, the reverse-order table, the sequential-order table and the cache-area-mapping table. By using the indexes, the reverse-order table and the sequential-order table, the number of columns of the cache-area-mapping table that is going to be amended will not be more than five in each updating process.

Data transmission methods, or certain aspects or portions thereof, may take the form of program code (i.e., executable instructions) embodied in tangible media, such as floppy diskettes, CD-ROMS, hard drives, or any other machine-readable storage medium, wherein, when the program code is loaded into and executed by a machine such as a computer, the machine thereby becomes an apparatus for practicing the methods. The methods may also be embodied in the form of program code transmitted over some transmission medium, such as electrical wiring or cabling, through fiber optics, or via any other form of transmission, wherein, when the program code is received and loaded into and executed by a machine such as a computer, the machine becomes an apparatus for practicing the disclosed methods. When implemented on a general-purpose processor, the program code combines with the processor to provide a unique apparatus that operates analogously to application-specific logic circuits.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A data storage device, comprising:
a random access memory, having a cache area; and
a controller, loading a part of data mapping sets of the data mapping table on a plurality of sectors of the cache area, wherein any of the data mapping sets that has been read less than a predetermined number of times is defined as an infrequent data mapping set, and any of the data mapping sets that has been read more than the predetermined number of times is defined as a frequent data mapping set;
wherein each of the data mapping sets corresponds to a set index;
wherein each of the sectors corresponds sequentially to a plurality of common indexes;
wherein the random access memory further comprises a sequential-order table, a reverse-order table and a cache-area-mapping table, wherein the cache-area-mapping table has a plurality of sector-mapping columns arranged to record the set indexes of the data mapping sets in the cache area, the sequential-order table is arranged to record the order in which the frequent data mapping sets are read from the cache area and the order in which the infrequent data mapping sets are read from the cache area, and the reverse-order table is arranged to record the opposite order in which the frequent data mapping sets are read from the cache area and the opposite order in which the infrequent data mapping set is read from the cache area;
wherein the sector-mapping columns of the cache-area-mapping table correspond sequentially to the sectors of the cache area, the sequential-order table has a plurality of sequential-order columns corresponding sequentially to the sectors of the cache area, the reverse-order table has a plurality of reverse-order columns corresponding sequentially to the sectors of cache area, wherein the sector-mapping column, the sequential-order column and the reverse-order column which are corresponding to the same sector have the same common index.

2. The data storage device as claimed in claim 1, comprising a flash memory including a plurality of pages, wherein each of the pages has a logical address and a physical address, the flash memory has the data mapping table arranged to record a plurality of mapping relationships between the logical addresses and the physical addresses of the pages, the data mapping table is divided into the data mapping sets, each of the data mapping sets has at least one of the mapping relationships.

3. The data storage device as claimed in claim 2, wherein the controller further sets up an infrequent index set to maintain the infrequent data mapping sets, and sets up a frequent index set to maintain the frequent data mapping sets, wherein the infrequent index set is constituted by an infrequent head index and an infrequent tail index, and the frequent index set is constituted by a frequent head index and a frequent tail index.

4. The data storage device as claimed in claim 3, wherein the infrequent head index stores the common index of the sector having the infrequent data mapping set that was last read, the infrequent tail index stores the common index of the sector having the infrequent data mapping set that has gone the longest time without having been read, the frequent head index is the common index of the sector having the frequent data mapping set that was last read, and the frequent tail index is the common index of the sector having the frequent data mapping set that has gone the longest time without having been read.

5. The data storage device as claimed in claim 1, wherein the sequential-order column corresponds to the same common index as the sector having the frequent data mapping set is defined as a frequent-sequential-order column, the sequential-order column corresponds to the same common index as the sector having the infrequent data mapping set is defined as an infrequent-sequential-order column, wherein each of the frequent-sequential-order columns is arranged to store the common index of another frequent-sequential-order column, the common index in the frequent-sequential-order column points to another frequent-sequential-order column corresponding to the sector of the frequent data mapping set which is read prior to the sector corresponding to the frequent-sequential-order column having the common index, wherein each of the infrequent-sequential-order columns stores the common index of another infrequent-sequential-order column, and the common index in the infrequent-sequential-order column points to another infrequent-sequential-order column corresponding to the sector of the infrequent data mapping set that is read prior to the sector corresponding to the infrequent-sequential-order column having the common index.

6. The data storage device as claimed in claim 1, wherein any of the reverse-order columns that corresponds to the same common index as the sector having the frequent data mapping set is defined as a frequent-reverse-order column, and any of the reverse-order columns that corresponds to the same common index as the sector having the infrequent data mapping set is defined as an infrequent-reverse-order column, wherein each of the frequent-reverse-order columns stores the common index of another frequent-reverse-order column, and the common index in the frequent-reverse-order column points to another frequent-reverse-order column corresponding to the sector of the frequent data mapping set that was read subsequent to the sector corresponding to the frequent-reverse-order column having the common index, wherein each of the infrequent-reverse-order columns stores the common index of another infrequent-reverse-order column, and the common index in the infrequent-reverse-order column points to another infrequent-reverse-order column corresponding to the sector of the infrequent data mapping set which was read subsequent to the sector corresponding to the infrequent-reverse-order column having the common index.

7. The data storage device as claimed in claim 1, wherein the controller obtains a first data mapping set of a first mapping relationship of the page indicated by a read command or a write command, and determines whether the first data mapping set is loaded on the cache area according to whether a first set index of the first data mapping set is in the cache-area-mapping table, wherein the first data mapping set is one of the data mapping sets, the first set index is one of the set indexes, and the first mapping relationship is one of the mapping relationships.

8. The data storage device as claimed in claim 7, wherein when the first set index is in the cache-area-mapping table, the controller reads the sector of the cache area according to the common index of the sector-mapping column storing the first set index to obtain the first data mapping set, and reads the data stored in the first data mapping set from the random access memory to execute the write command or the read command.

9. The data storage device as claimed in claim 8, wherein when the first set index is not in the cache-area-mapping table, the controller determines whether any of the sectors of the cache area is available, wherein when the controller determines that a first sector of the sectors in the cache area is available, the controller reads the first data mapping set from the data mapping table stored in the flash memory and loads the first data mapping set on the first sector.

10. The data storage device as claimed in claim 9, wherein when the controller determines that none of the sectors of the cache area is available, the controller determines whether the infrequent tail index is equal to any of the common index, wherein when the infrequent tail index is equal to one of the common index, the controller determines which of the infrequent data mapping sets is the one that has gone the longest time without having been read according to the infrequent tail index, and writes the first data mapping set into the sector corresponding to the infrequent data mapping set that is the one that has gone the longest time without having been read.

11. The data storage device as claimed in claim 10, wherein when the infrequent tail index is not equal to any of the common indexes, the controller writes the common index stored in the frequent tail index into the infrequent tail index, writes the common index stored in the frequent head index into the infrequent head index, and removes the common indexes stored in the frequent tail index and the infrequent tail index.

12. The data storage device as claimed in claim 1, wherein the controller further updates the sequential-order table and the reverse-order table according to the infrequent index set and the frequent index set.

13. A data storage device, comprising:
a random access memory, having a cache area; and
a controller, loading a part of data mapping sets of a data mapping table on a plurality of sectors of the cache area, wherein when all of the sectors of the cache area are filled and a first data mapping set needs to be loaded on the cache area, the controller selects a first sector from the sectors according to an infrequent index set and loads the first data mapping set on the first sector, wherein when the infrequent index set does not correspond to any of the sectors, the controller transforms a frequent index set to the infrequent index set, and selects the first sector according to the transformed infrequent index set.

14. The data storage device as claimed in claim 13, further comprising a flash memory having a plurality of pages, wherein each of the pages has a logical address and a physical address, the flash memory has the data mapping table arranged to record a plurality of mapping relationships between the logical addresses and the physical addresses of the pages, the data mapping table is divided into the data mapping sets, each of the data mapping sets has at least one of the mapping relationships, and each of the data mapping sets corresponds to a set index.

15. The data storage device as claimed in claim 14, wherein the infrequent index set is arranged to maintain a plurality of infrequent data mapping sets, and the frequent index set is arranged to maintain a plurality of frequent data mapping sets, wherein any of the data mapping sets stored in the cache area that has been read less than a predetermined number of times is defined as an infrequent data mapping set, and any of the data mapping sets stored in the cache area that has been read more than a predetermined number of times is defined as a frequent data mapping set.

16. A data maintenance method, applied to a data storage device having a flash memory, wherein the flash memory has a plurality of pages, each of the pages has a logical address and a physical address, and the data maintenance method comprises:
when the flash memory is turned on, loading a part of data mapping sets of a data mapping table on a plurality of sectors of a cache area in a random access memory according to at least one read command or at least one write command, wherein each of the data mapping sets has at least one mapping relationship between the logical address and the physical address of the page, and each of the data mapping sets corresponds to a set index, wherein any of the data mapping sets that has been read less than a predetermined number of times is defined as an infrequent data mapping set, and any of the data mapping sets that has been read more than the predetermined number of times is defined as a frequent data mapping set;
building a cache-area-mapping table to record the set indexes of the data mapping sets in the cache area in a plurality of sector-mapping columns of the cache-area-mapping table;
building a sequential-order table to record the order in which the frequent data mapping sets are read from the cache area and the order in which the infrequent data mapping sets are read from the cache area; and
building a reverse-order table to record the opposite order in which the frequent data mapping sets are read from the cache area and the opposite order in which the infrequent data mapping set is read from the cache area;
wherein each of the sectors corresponds sequentially to a plurality of common indexes;
wherein the sector-mapping columns of the cache-area-mapping table correspond sequentially to the sectors of the cache area, the sequential-order table has a plurality of sequential-order columns corresponding sequentially to the sectors of the cache area, the reverse-order table has a plurality of reverse-order columns corresponding sequentially to the sectors of cache area, wherein the sector-mapping column, the sequential-order column and the reverse-order column which are corresponding to the same sector have the same common index.

17. The data maintenance method as claimed in claim 16, further comprising:

setting up an infrequent index set to maintain the infrequent data mapping sets; and setting up a frequent index set to maintain the frequent data mapping sets, wherein the infrequent index set is constituted by an infrequent head index and an infrequent tail index, and the frequent index set is constituted by a frequent head index and a frequent tail index.

18. The data maintenance method as claimed in claim 17, wherein the infrequent head index stores the common index of the sector having the infrequent data mapping set that was last read, the infrequent tail index stores the common index of the sector having the infrequent data mapping set that has gone the longest time without having been read, the frequent head index is the common index of the sector having the frequent data mapping set that was last read, and the frequent tail index is the common index of the sector having the frequent data mapping set that has gone the longest time without having been read.

19. The data maintenance method as claimed in claim 16, wherein the sequential-order column corresponds to the same common index as the sector having the frequent data mapping set and is defined as a sequential-order column, the sequential-order column corresponds to the same common index as the sector having the infrequent data mapping set and is defined as an infrequent-sequential-order column, wherein each of the frequent-sequential-order columns is arranged to store the common index of another frequent-sequential-order column, the common index in the frequent-sequential-order column points to another frequent-sequential-order column corresponding to the sector of the frequent data mapping set which is read prior to the sector corresponding to the frequent-sequential-order column having the common index, wherein each of the infrequent-sequential-order columns stores the common index of another infrequent-sequential-order column, and the common index in the infrequent-sequential-order column points to another infrequent-sequential-order column corresponding to the sector of the infrequent data mapping set that is read prior to the sector corresponding to the infrequent-sequential-order column having the common index.

20. The data maintenance method as claimed in claim 16, wherein any of the reverse-order-columns that corresponds to the same common index as the sector having the frequent data mapping set is defined as a frequent-reverse-order column, and any of the reverse-order-columns that corresponds to the same common index as the sector having the infrequent data mapping set is defined as an infrequent-reverse-order column, wherein each of the frequent-reverse-order columns stores the common index of another frequent-reverse-order column, and the common index in the frequent-reverse-order column points to another frequent-reverse-order column corresponding to the sector of the frequent data mapping set that was read subsequent to the sector corresponding to the frequent-reverse-order column having the common index, wherein each of the infrequent-reverse-order columns stores the common index of another infrequent-reverse-order column, and the common index in the infrequent-reverse-order column points to another infrequent-reverse-order column corresponding to the sector of the infrequent data mapping set which was read subsequent to the sector corresponding to the infrequent-reverse-order column having the common index.

21. The data maintenance method as claimed in claim 16, further comprising:

when the cache area is filled and a new data mapping set needs to be loaded on one of the data mapping sets, determining whether the infrequent tail index is equal to any of the common indexes;

when the infrequent tail index is equal to one of the common indexes, determining which of the infrequent data mapping sets is the one that has gone the longest time without having been read according to the infrequent tail index; and writing the new data mapping set into the sector corresponding to the infrequent data mapping set that is the one that has gone the longest time without having been read.

22. The data maintenance method as claimed in claim 21, further comprising:

when the infrequent tail index is not equal to any of the common indexes, writing the common index stored in the frequent tail index into the infrequent tail index, writing the common index stored in the frequent head index into the infrequent head index, and removing the common indexes stored in the frequent tail index and the infrequent tail index.

* * * * *